United States Patent
Redlich et al.

(10) Patent No.: US 8,423,565 B2
(45) Date of Patent: Apr. 16, 2013

(54) INFORMATION LIFE CYCLE SEARCH ENGINE AND METHOD

(75) Inventors: Ron M. Redlich, Miami Beach, FL (US); Martin A. Nemzow, Miami Beach, FL (US)

(73) Assignee: Digital Doors, Inc., Miami Beach, FL (US)

( * ) Notice: Subject to any disclaimer, the term of this patent is extended or adjusted under 35 U.S.C. 154(b) by 360 days.

(21) Appl. No.: 11/614,186

(22) Filed: Dec. 21, 2006

(65) Prior Publication Data

US 2008/0154873 A1 Jun. 26, 2008

(51) Int. Cl.
*G06F 7/00* (2006.01)

(52) U.S. Cl.
USPC ............ 707/758; 707/769; 707/777; 707/778

(58) Field of Classification Search .................... None
See application file for complete search history.

(56) References Cited

U.S. PATENT DOCUMENTS

| | | | |
|---|---|---|---|
| 5,941,944 A | 8/1999 | Messerly | 709/203 |
| 5,960,080 A | 9/1999 | Fahlman et al. | 380/4 |
| 6,078,907 A | 6/2000 | Lamm | 705/40 |
| 6,253,203 B1 | 6/2001 | O'Flaherty et al. | 707/9 |
| 6,505,150 B2 | 1/2003 | Nunberg et al. | 704/1 |
| 6,594,654 B1 | 7/2003 | Salam et al. | 707/3 |
| 6,675,161 B1* | 1/2004 | Suchter | 707/101 |
| 6,704,729 B1* | 3/2004 | Klein et al. | 707/5 |
| 6,922,696 B1 | 7/2005 | Lincoln et al. | 707/101 |
| 6,978,262 B2 | 12/2005 | Tsai | 707/3 |
| 6,999,959 B1 | 2/2006 | Lawrence et al. | 707/5 |
| 7,007,008 B2 | 2/2006 | Goel et al. | 707/3 |
| 7,031,961 B2 | 4/2006 | Pitkow et al. | 707/4 |
| 7,043,492 B1 | 5/2006 | Neal et al. | 707/101 |
| 7,085,766 B2 | 8/2006 | Keith, Jr. | 707/101 |
| 7,113,954 B2 | 9/2006 | Vogel | 707/101 |
| 7,120,625 B2 | 10/2006 | Kagimasa et al. | 707/3 |
| 7,149,983 B1* | 12/2006 | Robertson et al. | 715/810 |
| 2002/0046209 A1* | 4/2002 | De Bellis | 707/10 |
| 2005/0010458 A1* | 1/2005 | Holloway et al. | 705/7 |
| 2005/0138109 A1* | 6/2005 | Redlich et al. | 709/201 |
| 2007/0078889 A1* | 4/2007 | Hoskinson | 707/102 |
| 2007/0110044 A1* | 5/2007 | Barnes et al. | 370/360 |

FOREIGN PATENT DOCUMENTS

CA 2 345 148 6/2000

OTHER PUBLICATIONS

"Processing of confidential information in distributed systems by fragmentation" by J. Fabre, Computer Communications vol. 20, pp. 177-188 (1997).

(Continued)

*Primary Examiner* — Debbie Le
*Assistant Examiner* — Hasanul Mobin
(74) *Attorney, Agent, or Firm* — Robert C. Kain, Jr.

(57) ABSTRACT

Search engine process operates on data collections to expand a user's knowledge about select content (SC) words, data objects, etc. A prioritized hierarchical taxonomic system (H-tax-sys) encompasses some SC is set, input data is classified thereto, and non-matching data (non-SC) is identified. The non-SC are used as a search terms. Additionally-optionally, the process identifies input data as SC per n priority H-tax, and uses these as search terms. Additionally-optionally, input data matching SC is added as search terms. Additionally-optionally, search terms are extracted from the input based upon H-tax. Supplemental documents are gathered, H-tax classified, mapped and represented with and without mapped search terms.

119 Claims, 19 Drawing Sheets

OTHER PUBLICATIONS

"Secure External References in Multimedia Email Messages" B. Wiegel, ACM, pp. 11-18, Mar. 14, 1996.

"Element-Wise XML Encryption" H. Maruyama et al., IBM Research, Tokyo Res. Lab. Ap. 19, 2000.

"Secure External References in Multimedia Email Messages" by B. Wiegel, German National Research Center, Mar. 14, 1996.

"Process of Confidential Information in Distributed Systems by Fragmentation" by J. Fabre, Computer Communications 20:177-188, 1997.

Canadian Patent Publication by S. Lanis, CA 2345148, Apr. 6, 2000.

* cited by examiner

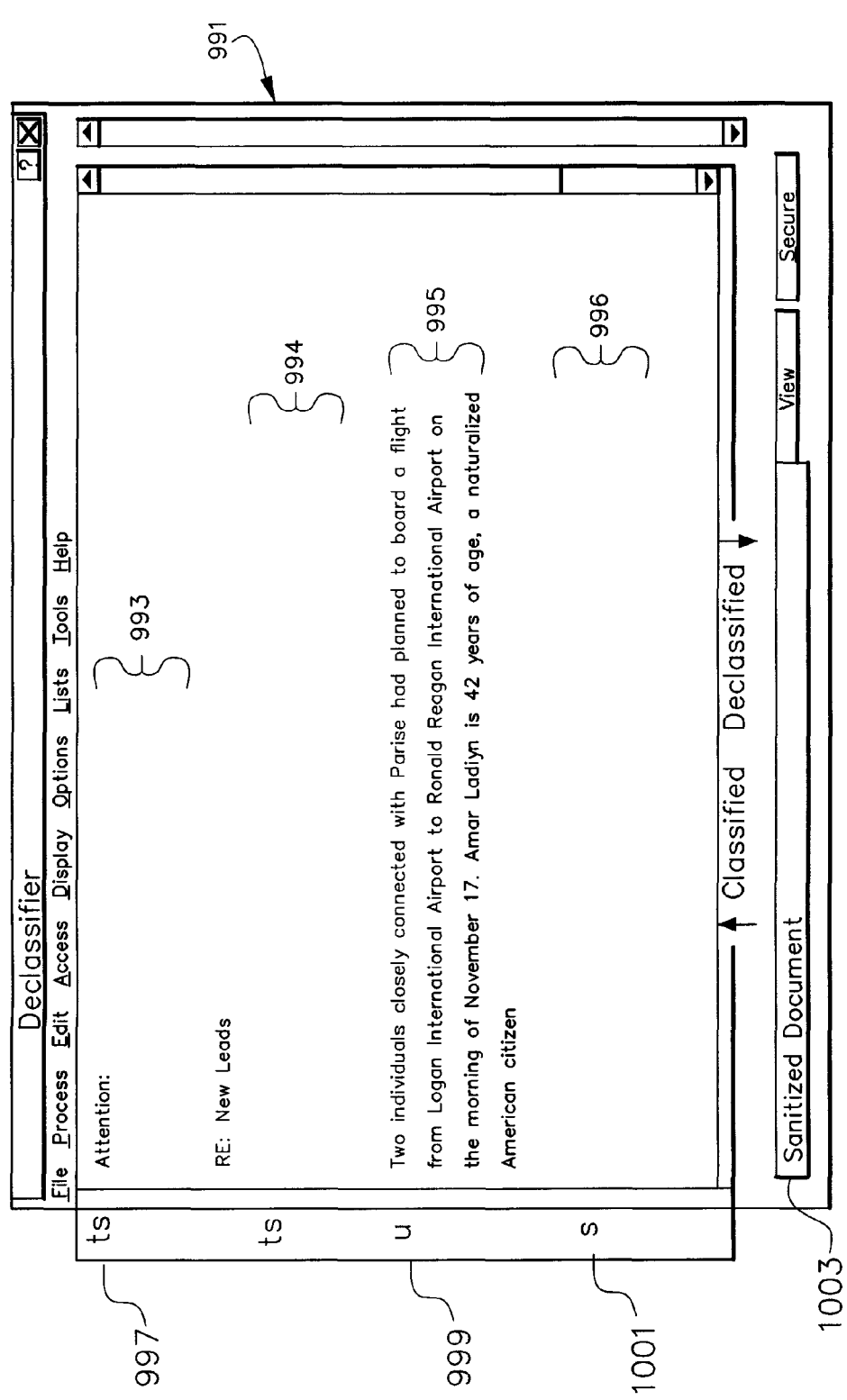

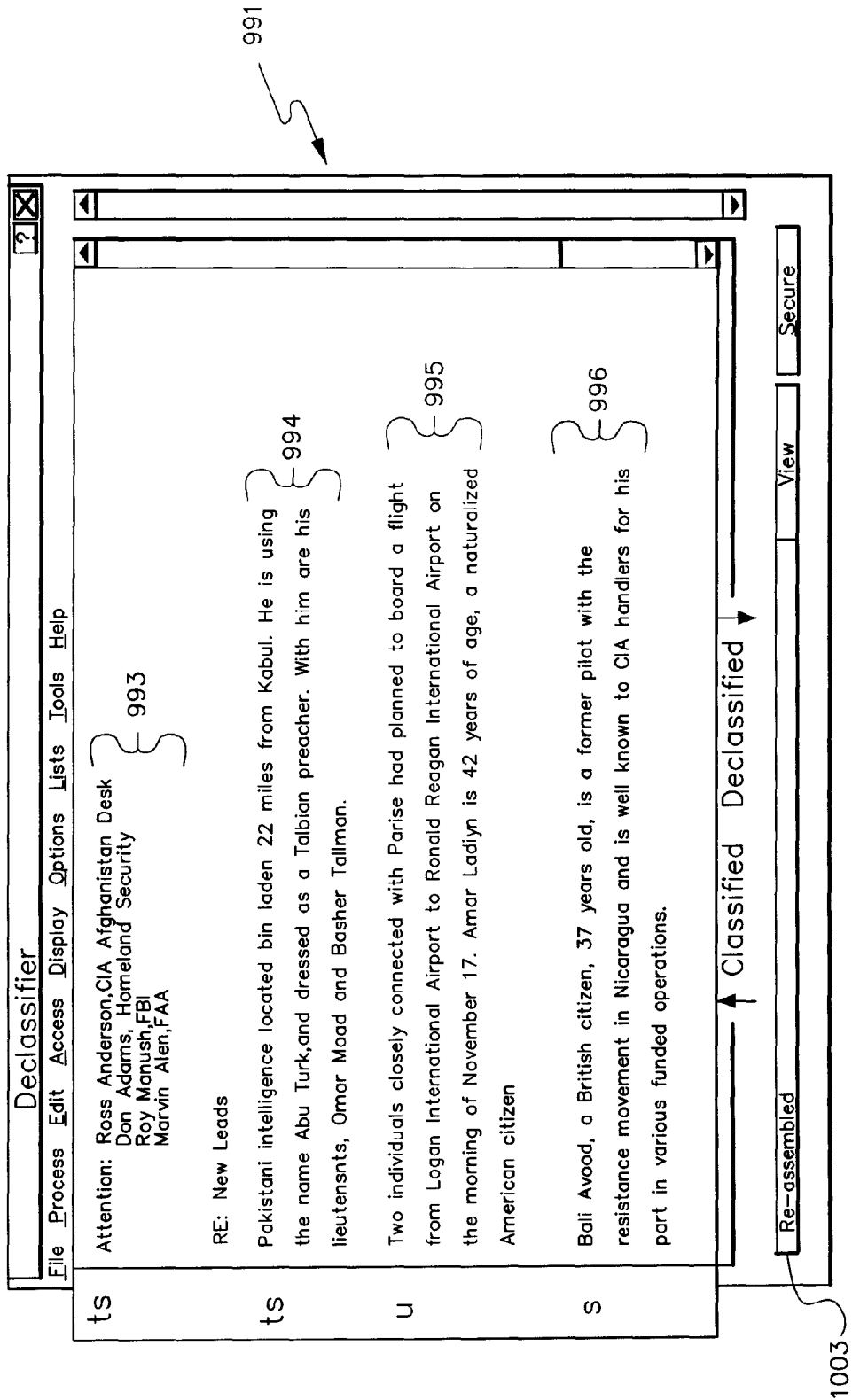

INFORMATION LIFE CYCLE SEARCH ENGINE AND METHOD

The present invention relates to an information life cycle search engine and method to process, search, expand and secure information and data objects in an electronic format from and in computer systems and networks.

BACKGROUND OF THE INVENTION

The extensive use of computers and the continued expansion of telecommunications networks, particularly the Internet, enable businesses, governments and individuals to create documents and data streams (whether text, characters, icons, images or a combination thereof, sound, video, and data objects in general, sometimes referred to generally herein as "data objects") and distribute those documents and data streams widely to others. Although the production, distribution and publication of source documents (which includes data streams and other input data) is generally beneficial to society, there is a need to expand the user's knowledge relative to certain select content ("SC") such as critical words, terms, images, characters or security sensitive words, characters, images or sound. Concerns regarding SC and security sensitive items (for example, an individual's social security number, credit history, medical history, business trade secrets and financial data) is an important issue in society. In another words, individuals and businesses have a greater concern regarding maintaining the secrecy of certain information in view of the increasing ease of distribution of documents through computer networks and the Internet. Equally, the user may want to increase his or her knowledge about SC beyond the common input of search terms into a search engine such as Google.

The Etiology of Information

Security, privacy and information sharing is predicated by the representation of the structure information. The structure has evolved in usage over time from simple linear formats to complex hierarchical trees typified by tags, metadata and modifiers. Although the predominant information delivery and information storage format is in a linear data stream, the internal structure or representations include all possible linear, field defined, metric, tree, compound and combined layouts. In other words, while data is delivered in a linear stream, the complexity of internal structure resolves into specific documented patterns, self-documenting meta data formats like HTML or XML, defined utilitarian and purpose-oriented formats like database management system (DBMS), ODF (open document format) or proprietary document object models (such as the Microsoft DOM model). The combination and recombination of metadata in source documents or data streams complicates finding, location, and expanding one's knowledge base of SC. The issue of the internal format is important to the regulation, interpretation and application of information.

OBJECTS OF THE INVENTION

It is an object of the invention to provide an expansive search engine which can be used to gather additional documents to expand the user's knowledge about select content, terms, words, ideas and data objects.

It is another object of the invention to provide a number of search engine tools which can be selected and built up into a lego-type search engine to gather information.

It is an additional object to employ convergent search tools, divergent search tools, no-match searches, select content tools, content, contextual and hierarchical taxonomic system tools in a search engine.

SUMMARY OF THE INVENTION

The computerized search method operates on electronic data collections, represented by databases or data structures, to expand a user's knowledge about select content represented by one or more predetermined words, characters, images or data objects. The method or engine uses a prioritized hierarchical taxonomic system encompassing some select content. The SC falls within the taxonomic classification system. Input data is gathered, data elements therein are identified and classified with the hierarchical taxonomic system and non-matching data elements which do not match the select content (SC) are identified. Data collections are searched, in one embodiment, with the non-matching data elements. In another embodiment, or as an adjunct to the knowledge expander (KE) search engine process, the system identifies input data elements as supplemental select content search terms which supplement (supple) SC corresponds to said n number of SC, preferably n top priorities from the hierarchical taxonomic system. In a further development, certain SC, particularly n top prioritized SC from the hierarchical taxonomic system, are added as search terms to the no-match search and supple SC search. Therefore, search tools of no-match, SC from input data and SC from the taxonomic classes are employed. As another search tool, the hierarchical taxonomic system is applied on the input data and the process extracts n top priority search terms from the input data, without reference to the SC. Supplemental documents are gathered from the data collections, are classified with the hierarchical taxonomic system and mapped represented or charted based thereon. To compliment the KE search process, contextual rules or algorithms operating on the SC in the input data are employed and the hierarchical taxonomic class priority for the supple SC is incremented, decremented, or otherwise tagged as being important to the search, which search is then automatically processed by the system. A computerized medium carrying programming instructions is also discussed herein.

BRIEF DESCRIPTION OF THE DRAWINGS

Further objects and advantages of the present invention can be found in the detailed description of the preferred embodiments when taken in conjunction with the accompanying drawings in which:

FIGS. 8A, 8B, 8C and 8D diagrammatically illustrate extraction of select content (SC) and a hierarchical taxonomic system based upon TS, T, C and UC security code classifications.

DETAILED DESCRIPTION OF THE PREFERRED EMBODIMENTS

Figure 1:
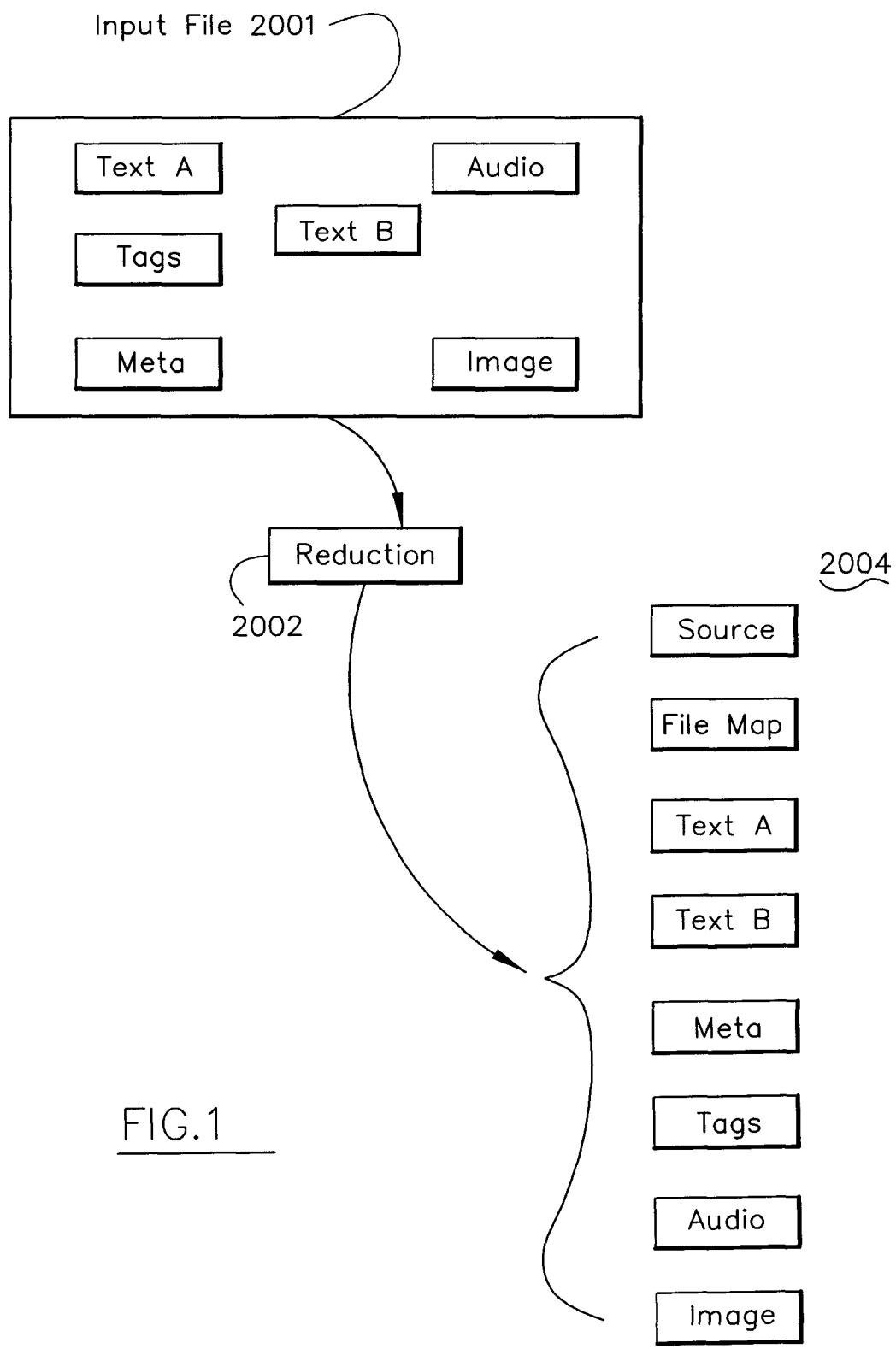
FIG. 1 diagrammatically illustrates deconstruction of an input document into segments.

As discussed above, the etiology of information involves a complex hierarchical trees of various types of data such as tags, metadata, and modifiers. Specifically to the issue of semiotic (words and objects in language) and pragmatic (words relationship to user) meaning, the internal format of information is important to its regulation, interpretation and the further use and application of the information. A discussion of the differentiation of the data as to content, context and concept is discussed later herein. The abstraction of information is also relevant here. For example, the database scheme DBMS and the DOM style sheets and the internal metadata all modify the encoding, format, structure, purpose and usage of the information. Links and references establish contextual meaning, just as the environment establishes meaning relevant to the multiple granular data in the information stream or document. Metadata can validate or invalidate meaning in the text of the data, for example, a format or a replace meta data element could indicate the complete deletion of material, the connection between topic and footnote, or modification with non-usage of the data. To perceive data only in context without the effects of format, purpose, reference and access rights, potentially misinterprets the importance of context and concept which may result in a misunderstanding of the information.

Metasearch Engine for Knowledge Discovery: Search Convergence and Divergence As an overview, the system's metasearch engine is a novel and useful service to uncover unknown or concealed relationships, delivery of higher relevancy search results and connecting the dots. Although metasearch is derived from the technology for security and information sharing, it is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept. The system is a standalone system or can be integrated to process results of other search engines. Presented is a process and a technology for knowledge discovery, security and information sharing that is based on management and control granular data content to secure information while also providing interdomain information sharing. The basic assumption is that all data/content must be monitored, analyzed and categorized at the granular data level for basic security risk management and control. Risk measurement is driven by information recognition, multi-tier overlapping hierarchical meta-tagging technology, and granularization. This same technology, as a standalone deliverable product or service-oriented architecture, is applicable to knowledge discovery, uncovering unknown or concealed relationships, and for connecting the dots. The metasearch process is a serialized and repetitive process of knowledge discovery, usage of the innovation's secure engine, and the application of granular data content, as a standalone service for knowledge discovery. Because the risk measurement is driven by 1) content, 2) context, and 3) concept, it is essential that the system recognize content not only in isolation to itself as a data stream or document but also its value when combined with other private and public sources through aggregation, inference and data-to-data interaction. The metasearch is useful to augment standard Internet search engines because it enables both: (1) search divergence for knowledge discovery and (2) search convergence for assessing information integrity. It completes the process necessary for discovering new knowledge to connect the dots.

Initial Process—Metasearch Engine and Knowledge Expander

The automated metasearch KE search engine takes as source any data stream or document.

The metasearch engine automatically parses the source for content recognition and assessment of granular content. This granular content is automatically metatagged by the search engine—system for range (contextual relevancy), sensitivity level (prioritized), compartmentalization (sensitivity levels at the same hierarchical level, but laterally or orthogonally disposed to one another, see TS-Navy compared to TS-Army wherein the Navy and the Army are compartments), categories (hierarchical taxonomic classes), relevancy (a type of sensitivity), and other multi-tiered overlapping hierarchical factors. The granularized data content becomes the search terms, while these metatags become metafilters for the knowledge discovery process. These search terms are submitted to any number of extant tools and services (other search engines, such as Google, Yahoo), for locating other relevant supplemental data streams, documents, databases, local, Intranet, Internet, and public or private data stores. Likely tools include Internet search engines, data mining tools, database query engines, data collections, indices and other knowledge management (KM) applications or services, which are generally classified as data structures or data collections herein. Inductive and deductive tools are advantageous too. Most tools can be easily integrated with the system, linked through service-oriented architectures (SOA), or their results piped into the source data steam or document (through Web 2.0 mashups). The metasearch engine also works with standard—a priori—search terms or keywords, like any desktop, web-enabled, or Internet search tool. This search operation may bypass the system's secure assessment of a relevant or representative source data stream or document.

Simple Metasearch Engine

The results from the extant tools (the results sometimes called supplemental documents or supple docs) are logged for auditing, dispersed to maintain a legal chain-of-custody, and aggregated into a single collated result. A List of Abbreviations is set forth in a later section. This collated result (the source, results, reports and links or references) is automatically submitted into the metasearch engine. Inputs include the configuration for either 1) search convergence or 2)—search divergence. Search convergence conforms to the standard purpose for using Internet search engines like Google or Alta Vista because it defines, authenticates, and validates the search terms. The first level search results provide for an integrity check for the initial information results in that it does not aggregate or inference the information therein.

The divergence function, on the other hand, is all about aggregation, inference, and data-to-data interaction because it specifically searches for links, references, relationships, outliers, and social networking associations to the search terms. The divergence function will likely ignore anything overlapping the search terms in order to expand the search. In other words, convergence increases the depth of knowledge where divergence increases the breadth of knowledge represented by the collated result. The divergence function explores new, novel, unknown, and hidden connections. If you want to connect the dots, divergence dredges new but factually uncertain information where convergence thereafter authenticates.

The system is automatically run. The source (which is now the aggregated result from the extant tool processes) is automatically parsed by the metasearch engine with secondary recognition and assessment of granular content.

Automatic Metatagging

This granular content of the source doc is automatically metatagged for: (1) Content categories, (name, location, date, dollar amount etc); (2) sensitivity level, ("Top Secret", "Private", "level 9"); (3) compartmentalization, ("top secret—Finance" "Top secret logistics"); and (4) relevancy, and other multi-tier hierarchical factors.

Automatic Secondary Tagging of a "Range"

A secondary level of metatagging may be created to define the "range" or "the area within the document" from which the keywords for the search will be selected. This is a simple contextual select content (SC) operation. To create a higher level of relevancy in the search results the system controls the granular data within the document. Only "areas"/"ranges" with a high relevancy will become the basis for locating keywords for the next search. Range defines the area or areas within a document (characters from the target selected content, lines away, within the same paragraph, on the same page, etc.), which will be the base and platform for locating key words for the next search cycle. An analogy is the defining the range/area for oil drilling in a suburb of the city of Houston. All the drilling will take place only in that location. As an example of defining a "range," we present the system's creation of automated tear lines.

Each paragraph (the "range" can be also configured to a "sentence" or "line" or "page") is automatically tagged based on an algorithm. The algorithm may be "tag the paragraph based on the highest sensitivity level assigned to any of its words; or if a group of specific words appear in a paragraph," ("ATTA", "Hamburg" "New York" all tagged as Secret "S" security level or importance) and tag the paragraph at a higher sensitivity level than those words (i.e. Top Secret "TS").

The granularized selected content becomes the search terms and the metatags become the metafilters for the systems meta search. The automated results of the meta search process is an augmentation of existing knowledge or a breakthrough to unknown or covert relationships. The convergence search vets the integrity of a priori search terms, while the divergence search generates new search terms and new references. The metasearch is repeated, as configured, for a fixed number of times, for a fixed period of time, until results reach an asymptote, or indefinitely. The metasearch inputs also include the metafilters created prior to the presentation of the aggregated search result. These metafilters define the direction of the search by introducing "fine adjustments" to the search process. In essence the metafilters narrow the scope of all subsequent and serial submissions to the extant tools and services. The search may be configured to include one or a combination of filters as follows:

(1) Selection of keywords for search based on their categories. The system automatically categorizes each word and character. In one embodiment, there are over 50 different categories or hierarchical taxonomic classes. Categories may include name, location, date, dollar amount, credit card number etc. As an example the system may be configured to feed the search engine with words that where automatically categorized by the system as "locations" and "people" in such an example "Rome" "London" and "Muhammad Atta" may be selected automatically as the keywords for the next search cycle.

(2) Selection of keywords for search based on their sensitivity level or important or assigned weight. This is the sensitivity level of the hierarchical taxonomic classes. The system may be configured to select as keywords for its next search only data elements that where classified/tagged with a specific sensitivity classification/tagging. A possible example, is an instruction to use as keywords only words that where given "Top Secret" classification, or "private" classification or assigned with a specific weight (select words that where assigned weight 9 out of 10).

(3) Selection of keywords for search based on the specific importance of their content. For example, use as keywords, words that belong to a list of specific grouping of words. A list of associated words that convey a concept or a contextual relationship and other features and compartmentalization. Metafilters for standard search terms, which bypass the initial system's automatic review of a source, are optional.

MLS, Multi-Level Security-Compliant Search and Distributions

Because the system and all the extant knowledge management tools may run in a secure system high environment, results are likely to be system high too. However, the point of any search or knowledge exploration is to share information and distribute it to the users at the edge. The advantage of the system is that the new search terms, the aggregate result, and all intermediate reports and documents are processed for Multi Level MLS-compliant security and information sharing. Each user will get a result based on his security level (for example, TS or S or C or UC). Specifically, the list of new words, phrases, and other content is either automatically assessed or manually reviewed for addition to the system's dictionaries. Ownership sensitivity level, compartment, group, categories, mission, relevancy, and other multitier overlapping hierarchical metatags are applied to each discovery and distributed to users subject to MLS compliance. The aggregate result are secured with multiple MLS-compliant versions and distributed to the edge on a: (1) per sensitivity-level basis version, or (2) a base redacted document with objective security compliance for universal distribution and pushed to the edge with the system's reconstitution services. In other words, information sharing is implemented either through the delivery of: (1) Multi Level Security—MLS-compliant versions, or (2) Through a base redacted document with objective security compliance for universal distribution with reconstitution.

Reconstitution is supported in whole or in part as: (a) MLS-compliant results, or as (b) Step-wise reconstruction, with defenses-in-depth MLS-compliant results i.e. controlled release layer by layer.

These two options are also applied to all intermediate results, reports, lists, linked or referenced sources. Of note, all links and references, even access to public data sources can be optionally restricted to minimize subsequent risks from aggregation, inference, and data-to-data interaction. An agency with specific intent and knowledge is able to use aggregation, inference, and data-to-data interaction on public sources to create classified results. For example, if unclassified search terms including "president assassination British visit" returned news clippings and RSS feeds of a forthcoming presidential visit to 10 Downing Street, these public results are still unclassified but the context is clear and may be classified.

The systems metasearch is a novel and useful standalone service to uncover unknown or concealed relationships, and connect the dots. It is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept.

One of the main tools in the present knowledge expander (KE) engine is its ability to control granular data with automatic content analysis/filtering and tagging of all the select content SC data and unknown data elements in every document, data stream or input document.

The knowledge expander engine: (1) automatically creates a list of search terms; (2) automatically cleans the noise from the search term list; (3) automatically selects from the list of search terms those that will be sent to the next search cycle (preexisting rules for doing the selection)—example: select for search only the items found which are in the "names category" and "locations category"—from the list of search terms—for example the names "Redhouse," "Kohn," "Miami Beach," and "Ft Lauderdale" will be sent to the next search cycle; (4) conduct a divergence search—limit set at 200 supplemental documents (supple doc). Each supple doc goes through an automatic content analysis/filtering and tagging of all the data elements in the document. Key words are located in the supple docs by filtering of categories. The process cleans noise from the extract key words from the supple does. Rules select which key words will be fed into next search cycle. For example, if 1 of the 200 documents had the name "Bob Smith" location "Sarasota" (as long as the rules for selection were not changed the next search will be fed with search terms—"Bob Smith" and "Sarasota") search is expanding—a diverging search. The last process wherein Bob Smith is added to the KE engine is a convergence filtering process because the search results will converge on Bob Smith.

Benefits of the Metasearch—Knowledge Expander

Typical search and data mining tools presupposes that the user already knows part of the answer. The user must know how to phrase the question (search terns ir query) in order to get a proper answer. However, this is only partial solution to knowledge management in that does not begin to address the real issues needed to connect the dots. This knowledge management technique as called herein "convergent" because the operator starts with a known entity and the search confirms or denies the basic entity or gathers additional information in depth on the entity topic. The present knowledge expander search, with various modules operating together, automates the convergent process until no additional information is found on the topic.

The present system and process allows knowledge management as a divergent exploration. The basic starting point is any data stream (RSS, blog, documents, a fire hose of data) or multiple data streams, or a collection of search terms for an automated process. A single term defines a manual process with a primary search term. The automated process redacts the data stream(s) and looks for content and context of importance creating a list of primary search terms, metadata contextual filters, and noise reduction tools in order to expand the breath of knowledge with new links and references. Alternate spellings, misspellings, partial matches, duplicates, and other fuzzy technology is used to graft depth to a convergent search or prune a divergent search. In the case of a divergent search, the process is specifically exploring for secondary search terms and information that is not part of the primary search terms. Noise and duplicates are pruned. All hits and information located with URLs, X-links, or other pointers is retained for a chain-of-custody source-indicating data, reproducibility, and human intelligence analysis. Consolidated results are insufficient for legal exploration, search warrants, or plans of action, so the retention is critical to build a rationale for action and review the relationships, connections, and networks of people.

The search is extended with the primary search terms, the secondary search terms, and combinations and permutations thereof. Duplicates and non-duplicates are pruned per the selection of convergence or divergence. Tertiary search terms and information is aggregated in the same manner as the secondary search terms and secondary information. This process would repeat unless manually interrupted, terminated by a timer, manually reviewed midstream and grafted or pruned, or terminated by repetition or lack of new information. When no new information is found both the convergent and divergent search are stopped. The termination rationale is inverted. In the case of convergence, the latest results are only new information that is not wanted and adds no depth to the knowledge. In the case of divergence, the latest results are only old information and represent no new breadth to the knowledge.

Information Life Cycle Engine

The information life cycle engine has an input configuration which is saved, an indication of the source of the information and text, metadata, data streams, blogs, RSS (Release Simple Syndication or Rich Site Summary), or a compound document. The process is a reduction of the information input into the system into its major elements by format, style, type and data type. Compound documents must be taken apart to basic identified types with tags and metadata separated out.

FIG. 1 shows an input file 2001 having therein text A, Text B, various tags relative to the information in the text (such as paragraph numbers), metadata associated with items and data objects in the document and image elements. The input file is subjected to a reduction or deconstruction step 2002 which creates an expanded information document which includes source data, and file map of the various elements, text A, text B, metadata, tags, audio and image. Of course, multiple audio files, image files, metadata files, tags etc. may be included in the expanded information document represented at 2004. The Editor as an Information Expander section and following sections provides greater detail of the reduction step 2002.

Further defining the source as an information file or data stream is important. "Text" is a basic defined type. The information life cycle engine automatically processes the information document. The process includes selection, extraction and categorization. For example, a document having security sensitive words or selected content (sel. cont. or SC), phrases, images or sounds, identified as secured content by Department of Defense pre-classification must be processed with a step of filtering, identifying tear lines between classified material (contextual filter or parsing technique) and ultimate identification to a base level of classification. Words, phrases, user defined words and a group list of words, phrases, combination and occurrences within a defined range are employed to identify the security (priority) level of the information document being processed. Pattern and categorization, dictionary categorization, and syntactic categorization is employed.

The information document is also parsed or separated apart by syntax, that is, words, sentences, quotations, parenthesis, other types of textual delineation, and instruction. Complex phrases are resolved for overlapping security levels and complex meanings. Categorization is employed to determine the level of security of the information. Multi tier-overlapping and hierarchical tagging is employed. Any dispute automatically identified by the system upgrades the entire information document 2004 to the next highest security level.

The next step in information life cycle engine is to extract and disperse various versions of the document 2004 elements along tear lines or other types of delineation specified by the operator.

Extracted data objects or elements may be replaced by tags, codes, or null field indicators. The system may create various versions of redacted output documents. The base document, redacted of all critical or security sensitive information, should be stored along with a recovery file. The recovery file may include maps to permit a party with a preferred security clearance to recover completely the base or original source document. A metadata table is created with an intermediate resultant document. Reports are generated showing encoding, dispersion of the data and storage location. Lists are also created showing selections of data redacted from the source document, encoding of the data and synopsis of the data. Additional outputs include a recovery file and a categorized meta search file. Displays are permitted either locally or to test the discovery results.

Figure 2:
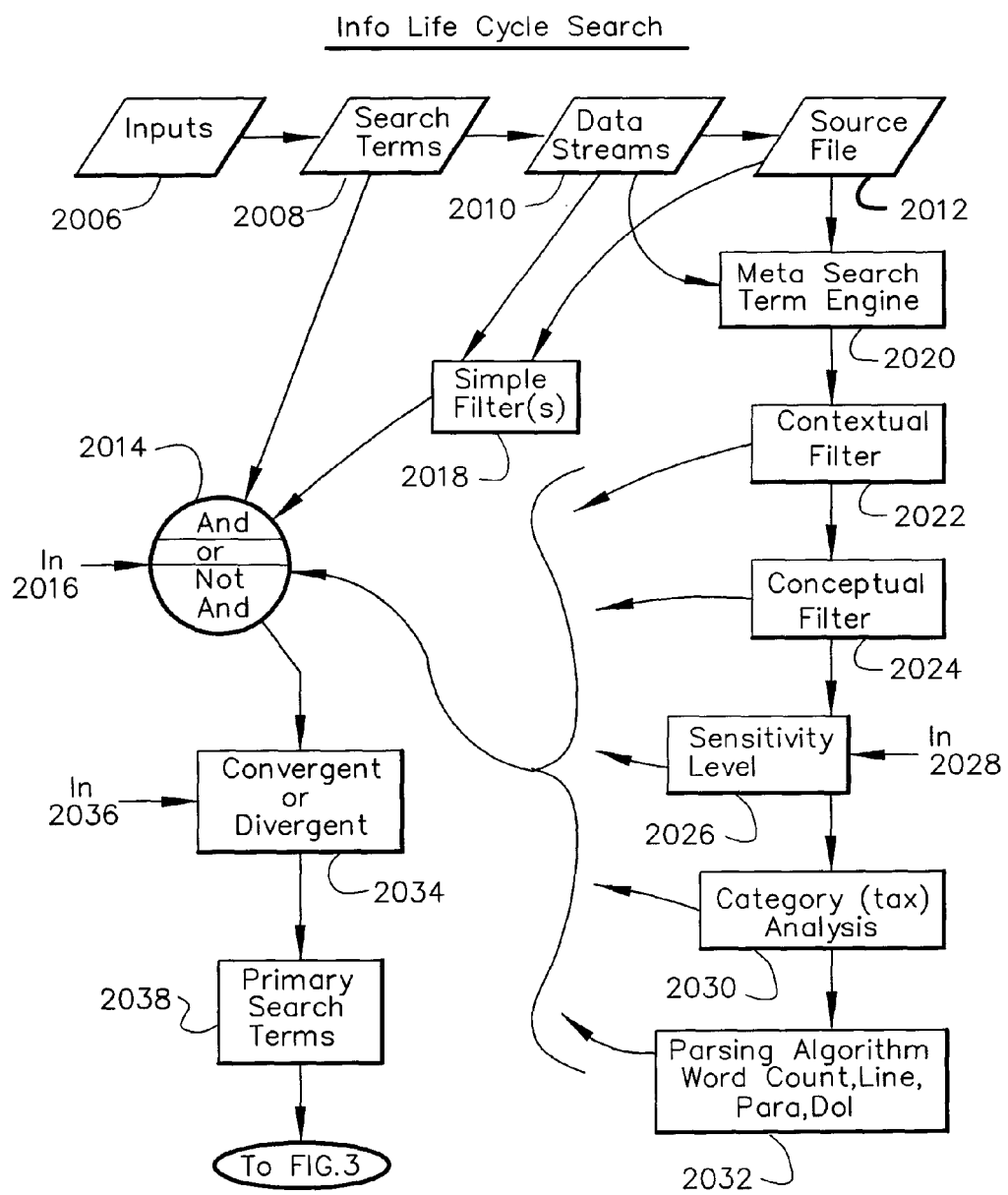
FIG. 2 diagrammatically illustrates the information life cycle knowledge expander (KE) search engine process.

FIG. 2 shows information life cycle search. At the beginning of the program flow in FIG. 2, an input function 2006 is noted which includes information regarding the source of the information document or "source document" which source doc may, at the operator's discretion, include search terms 2008, data stream 2010 or a source information document file 2012. The search terms may include one or more SC or select content which is of interest to the user. If search terms are input, these terms are supplied to a summation or discrimination function 2014 (AND, OR or NOT AND operator). In other words, the operator (or the system automatically by default) could conduct an AND conjunctive search obtaining additional information from other documents or an OR exclusionary search showing and processing only the items that are identical are substantially similar from source doc and filter outputs. The AND operation may operate on the terms applied to discrimination function 2014 (e.g., the terms from input 2008 must match one output of the simple filter 2018) or may refer to a summation of all terms from input 2008 and simple filter 2018 and metasearch term engine 2020. The OR function has the same options. The NOT AND discriminator operates only to extract and use terms output from metasearch term engine 2020 which do not match search terms 2008 and the output of simple filter 2018. Some select content SC must fall within the prioritized hierarchical taxonomic class or classes function 2030 in the NOT AND search. The non-matching search term engine is discussed later in connection with the Expansive Unknown Search Engine. A substantial similarity test, as a subroutine in the discriminator 2014, may ignore duplicates and may truncate search terms by eliminating suffixes (and possibly prefixes) from the search term processor. Input IN 2016 recognizes that the operator may provide a manual input into discrimination function 2014. If data stream 2010 or an information source file or document 2012 are input, these information documents may be processed through one or more simple filters 2018 extracting white list terms or black list terms or terms not found in dictionaries, the result of which is supplied to the summation-differentiation function 2014. See the Simple Filter and Complex Filter sections below. In addition, data stream 2010 and document source file 2012 are submitted to a metasearch term engine 2020. The more highly organized metasearch term engine 2020 filters the data stream or source document with a contextual filter 2022, a conceptual filter 2024, a sensitivity level filter 2026, a hierarchical taxonomic or category analysis 2030 and a parsing algorithm for word count, line, paragraph, or DOL 2032. The order of these metasearch filters may be changed. The filters are contextual, semiotic and taxonomic. Semiotic include syntactic, semantic and pragmatic features (discussed later). Sensitivity level 2026 contemplates potential manual input IN 2028 which establishes the depth or expansive nature of either the contextual filter or conceptual filter. The sensitivity filter and the hierarchical taxonomic filters are used to focus the search in that the operator can select hierarchical taxonomic levels or concern, for example, names of terrorists—priority 1, terrorist location—priority 2, date of source doc—one week—priority 3, temporal (date)—1 month—priority 4, terrorist organization—priority 5. Each "priority" is a SC selection sensitivity factor and the class of the information is a taxonomic analysis, the result of which is a prioritized hierarchical taxonomic classification system and filter for the search. The result of this meta or more highly organized search term engine 2020 is supplied to the summation-discrimination function 2014.

The system then operates on convergent or divergent function 2034 which includes, optionally, input IN 2036 from an operator. The convergent or divergent function 2034 enables the operator to only search for converging search terms or select a more divergent search routine. Function 2038 results in a primary set of search terms.

A major element of the information life cycle engine is parsing the original source document. The structure of the source document DOM metadata and compound file format must be simplified and the source document must be broken into its atomic types such as markup data, tags, metadata, links, hyperlinks, references, comment, differing data types, purpose and format. This parsing is discussed later in connection with the DOM data structure. Categorization is applied as a resolution or coding to a single overriding security level. Priority is given to the most complex or highest security level. For example, a document with "Bin Laden" as compared with "Bin" next to "Laden" results in "Bin" being identified at the secret "S" level and "Laden" being identified at the classified "C" level wherein "Bin Laden" is classified at the top secret "TS" level. (The security classes including TS top secret, S secret, C classified and UC unclassified). The resulting document would be identified as top secret TS because "Bin Laden" represents the highest level in that paragraph (format or contextual indicator). Adjacent permutations of a linear nature could also be employed. For example, "Khalid Sheik Mohamed of Syria" results in unknown [Khalid], Sheik [title of middle eastern person], and Mohamed [name] "of" [preposition] and "Syria" [geographic territory]. The resulting analysis results in an up coding of categorization to a next higher security level (e.g., S to TS) due to the contextual range grouping of the SC.

The system may employ a "My Group" list or profile which identifies key items and triggers a certain result based upon the "My Group" pre-set profile list.

The My Group list would include a profile name such as "first strike capacity" and a list of key terms under that profile such as "nuclear, ballistic, submarine" and a "range" such that anytime that key word is found in a paragraph, a certain classification is assigned. The "range" being the paragraph in the source document. The Profile Name could be used as a search term for a divergence search (discussed later) or a link to a dictionary of search terms. The search terms are either content-derived in nature or conceptual in nature. Certain contextually-derived results, see Bin Laden example above, may automatically trigger use of a specially designated My Group search profile. Further, the Profile Name can be linked to another list of synonyms associated with the specific terms nuclear, ballistic, submarine. Contextual and conceptual terms are employed in this manner.

Information Life Cycle Searches

The input into the information life cycle search (FIG. 2) may be one or more search terms, a data stream such as a blog, RSS, or a string of data, or information document (DOM). FIG. 2 graphically shows the procedure for the information life cycle search. The system pre-processes the input and obtains metasearch terms both in a contextual manner and conceptual manner. These are identified with filters discussed later on. Sensitivity levels are set and the information is categorized both in a contextual manner and a conceptual manner. Ranges of data representing format choices are used such as lines, sentences, DOL's (lines of data) and paragraphs. Thereafter, the information life cycle search engine modifies the search terms and the user inputs either a convergent instruction or a divergent instruction. The resulting search terms are then supplemented according to the convergent or divergent system.

The search for the primary search terms (convergent or divergent) results in a federated or confederated as well as a distributed supplemental search term group. Hyperlinks, URL, network references, SQL are submitted to one or more of the following: search engines, databases, data warehouses, addressable data elements, artificial intelligence, data mining sources, text storage, method data storage, indexes, libraries, catalogs as well as other data structures.

The next step involves ascertaining the depth of the search by identifying the number of hits for the first search term and the last search term, the time involved to compile the search, the time involved until no changes, the number of iterations involved as based upon a divergence search as separate from a convergence search. The output is a consolidated search result list.

Figure 3:
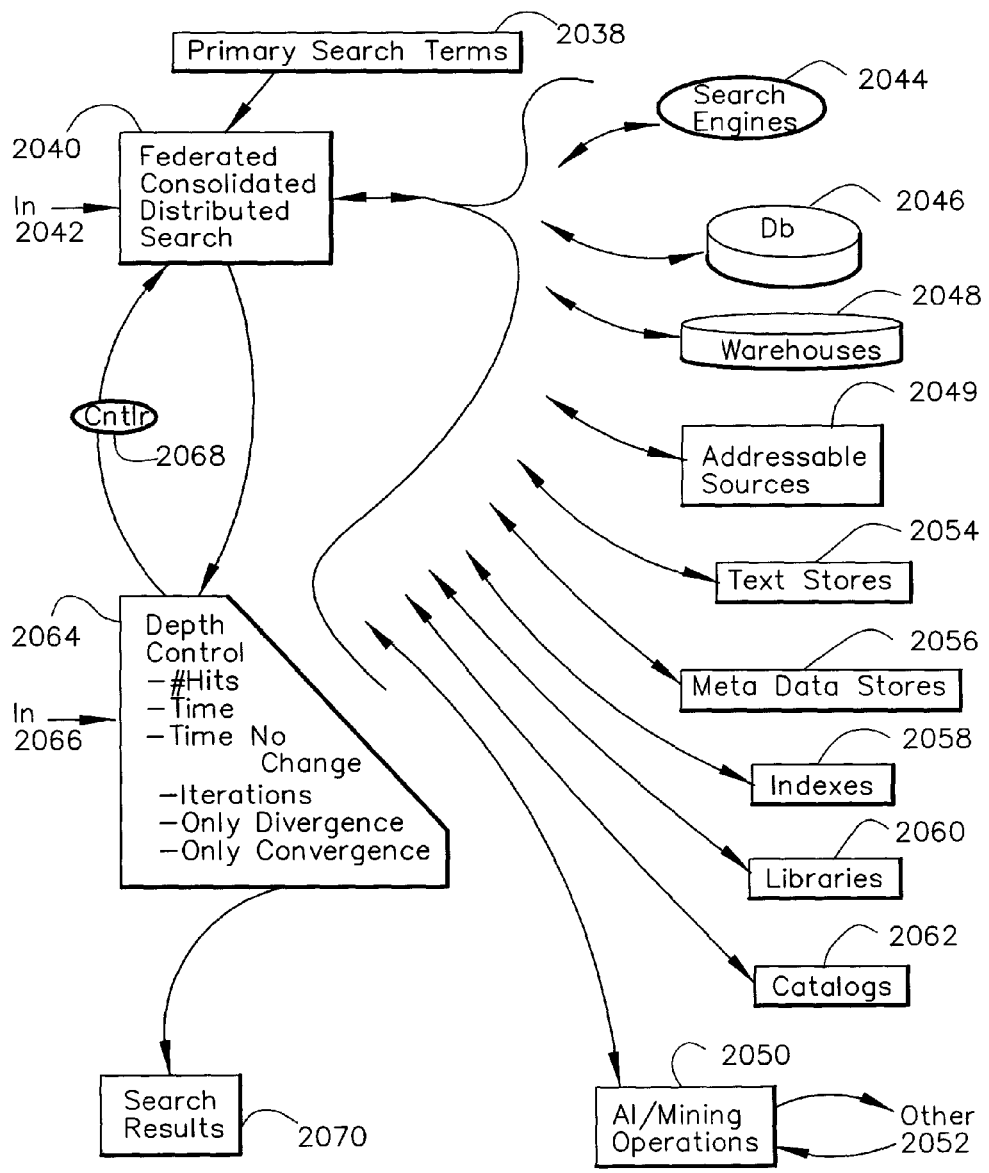
FIG. 3 diagrammatically illustrates the KE process of using search terms, data collection and depth-of-search control.

FIG. 3 starts with an input being primary search terms 2038. The search engine then executes function 2040 which is either a federated, consolidated, or distributed search. A federated search unites the search terms and additional supplemental documents generated and located from those search terms together. A consolidated search is simply a composite of all the search documents obtained without any relationship or affiliation. A distributed search seeks to widely engage a large number of data structures for the search. Operator input IN 2042 directs the selection of the search function 2040. Search function 2040 operates by sending the primary search terms to additional data collection targets such as search engines 2044 (Google, Yahoo, etc.), databases 2046 (representing a plurality of databases), data warehouses such as dictionaries or other sources 2048, addressable data structures 2049, artificial intelligence or mining operation functions 2050 and other data collections, data structures, indices, etc. The mining operation 2050 may access further tertiary data structures 2052. The search function 2040 applies these primary search terms to text stores 2054, metadata stores 2056, indexes 2058, libraries of words, terms, images, data or data objects 2060 and catalogs 2062. The results are compiled back to search function 2040. Step 2064 is a depth or search depth control in which the operator by input IN 2066 delineates either as a pre-set or a default or an active real-time control the number of hits needed from each of the data structures accessed by search function 2040, the amount of time for the search, the amount of time when no change is found from the retrieved documents, the number of iterations (repetitions), and whether the primary goal is a divergent search or a convergent search. Search depth control 2064 provides control information CNTLR 2068 back to search function 2040. The search results 2070 (supplemental documents or supple docs) are obtained either from output of search 2040 or after the depth control 2064 is applied to the search.

The third step is to take the secondary search result or the consolidated search result and apply them in a convergence manner or divergence manner. The output is either a convergent compilation of documents which are obtained via the supplemental search terms (adding known SC to the search term group) or a divergent compilation of documents employing the same search terms. A similar output result can be obtained by using hyperlinks, URLs and other metadata aspects.

Figure 4:
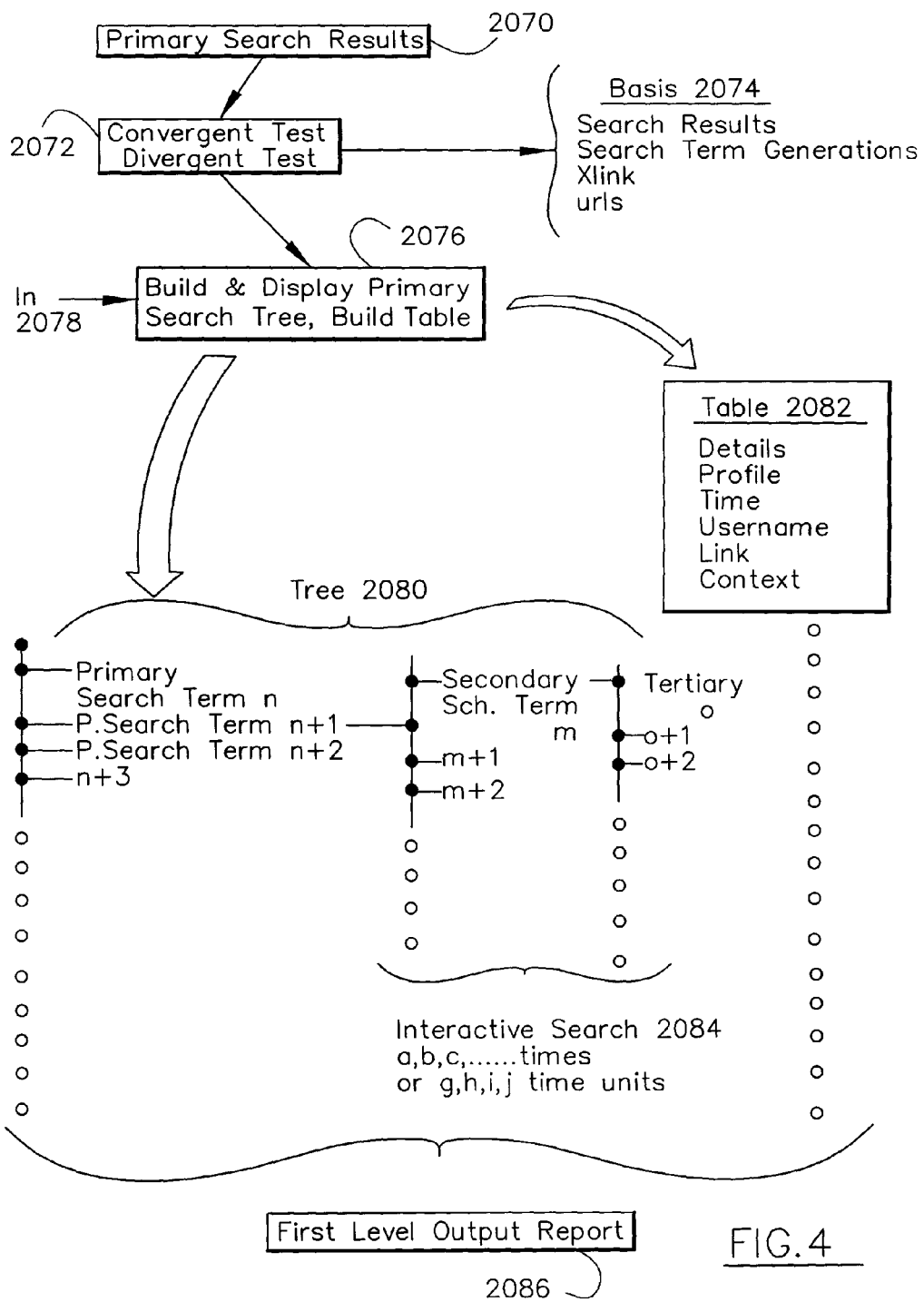
FIG. 4 diagrammatically illustrates the KE process for the primary search results.

The fourth step (see FIGS. 4 and 5) is to build a tree or a table listing the details. The tree shows the hierarchy of the data retrieved in the convergent or divergent search and the table lists the items such as profile, time, username, link, context, etc. FIG. 4 shows that the primary search term generates a certain supplemental group of documents whereas the secondary search results in a different group of documents and the tertiary search generates a third level group of documents. The number of searches is keyed to the time involved and the criticality of the information sought to be searched. The object of the tree building and table building (FIGS. 4, 5) is an exploration of information linked or associated with the initial information provided. Further, a social relationship or connect-the-dots matrix display can be obtained based upon this iterative information life cycle search.

The output or yield of the information life cycle engine results in a convergence search wherein additional supplemental information data is obtained to corroborate or validate the initial search terms and initial information document supplied. A divergent search yields more data which is loosely associated or related, coupled or referenced to the initial information document. Initial search terms result in a divergent documents can be expanded upon by the hierarchical tree with a list of details.

At some point, the operator must prune the hierarchical tree, reduce unnecessary items and augment others. Some of this pruning can be automated with an inference engine or artificial intelligence module. Otherwise, the operator may manually engage in the information life cycle engine.

Figure 5:
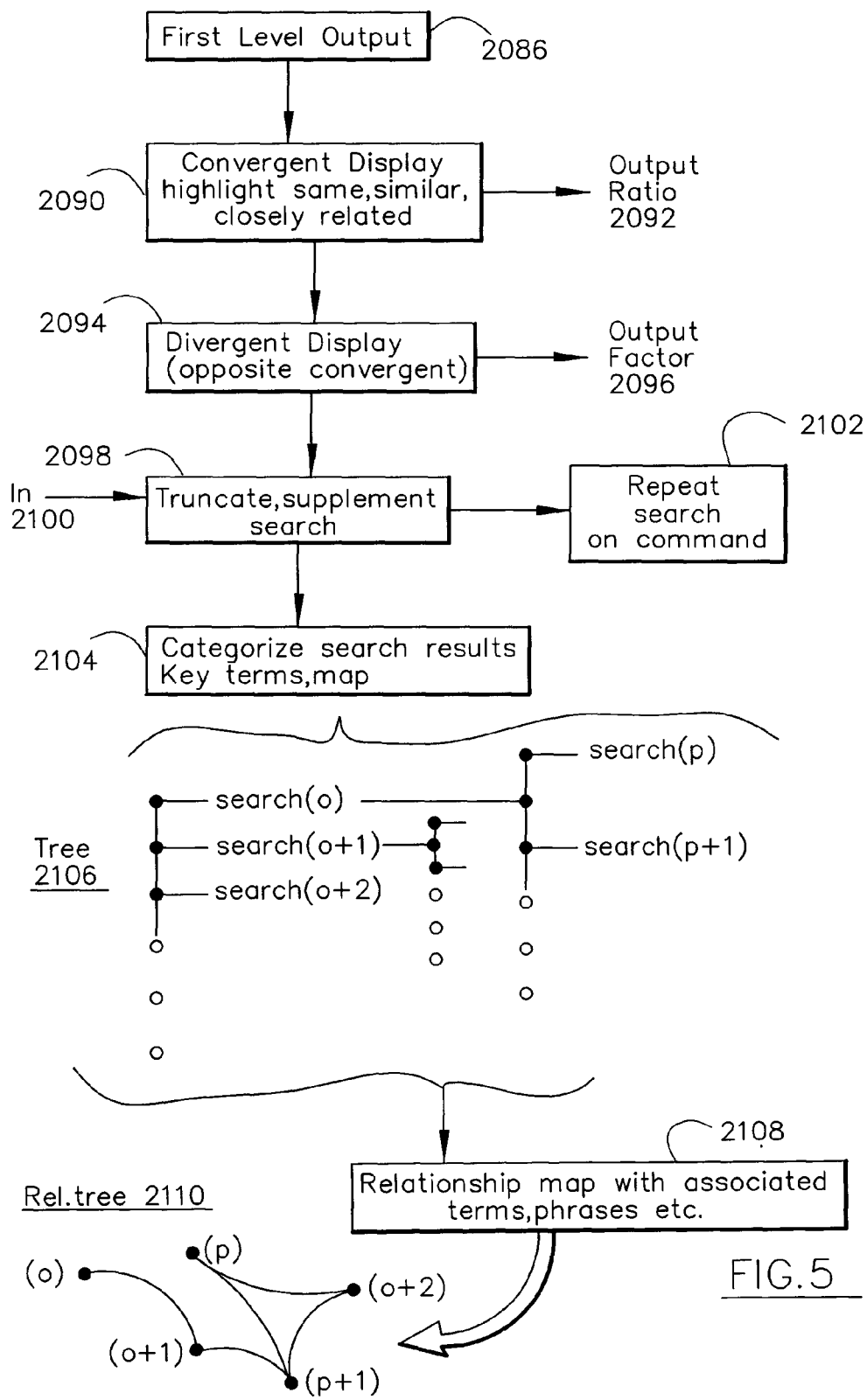
FIG. 5 diagrammatically illustrates the KE process for the output representation of search term data and search result data of supplemental documents.

The last step is a relationship map between the initial document and the supplemental documents generated through the convergent or divergent search. The final result is a map of the hierarchical search terms at various levels source, search 1, search 2, search 3 . . . search n. See FIG. 4. A further result is shown in FIG. 5 wherein a social relationship or process relationship between the various documents is established. Some people would call this connecting the dots or relationship mapping. The relationship mapping changes the degree of separation or similarity between each information document.

FIG. 4 begins with the primary search results 2070 and function step 2072 executes a convergent test and a divergent test on the primary search result. The basis 2074 could either be the search results themselves, a search term generation which is search terms extracted from the documents located during the search, hyperlink or x-link and URLs. The convergent test determines whether the search and recovered documents converged into a certain pattern whereas a divergent test shows that the documents, search results, hyperlinks or whatever spread to wider results. The build and display function 2076 takes the primary search terms and builds a search tree and builds a table. Operator input IN 2078 optionally enables the operator to set the scope and format of the search tree and the table. Tree 2080 is a display showing the primary search terms n, n+1, n+2 and secondary search terms m, m+1, m+2 and tertiary search terms o, o+1, o+2, etc. Iterative search function 2084 establishes how many paths or branches are executed in building the primary search tree. This may be one of the input IN 2078 functions for build and display function 2076. The iterative search 2084 may be a number of times counted in branches or may be certain time unit g, h, i, j. Table 2082 is a detail showing the search term including profile, time, username, link and context of the search term. Function 2086 is this first level output report showing the search terms for the information life cycle engine.

FIG. 5 begins with the first level output for the search term 2086. Function 2090 is a convergent display which highlights the same, similar or closely related documents. Also, an output ratio 2092 may show how many of the documents are related by word, term, image segment, hyperlink or metadata factors. Step 2094 is a divergent display which is the opposite of the convergent display. Output factors 2096 may show how many divergent documents having little or no connection to the primary search terms have been discovered by the search engine. Function 2098 permits the operator by input IN 2100 to truncate the search or supplement the search. Function 2102 repeats the search on command of the operator. Step 2104 categorizes the search results by key terms (taxonomic classification) and generates a map. One map is shown by tree 2106 which shows the search results or information documents as document o, o+1, o+2 as well as secondary documents p, p+1. Step 2108 develops a relationship map with associated terms, phrases, documents or hyperlinks. Relational tree 2110 shows that point or document p+1 is related to document o+1, p and o+2. In contrast, document o is not related to any document other than o+1. The relationship tree 2110 is sometimes called a "connect-the-dots" map.

Search with Prioritized Classifications

FIG. 2 shows that the operator or user can input search terms, source document or a data stream 2006 into the system. Search terms function 2008 represents the use of a search term string, document or data stream into the metasearch engine 2020 and through the classification or category analysis filter (hierarchical taxonomic system) function 2030. The sensitivity function 2026 permits the operator or user to preselect the priority for the hierarchical taxonomic or class system. Alternatively, "My Profile" or pre-set prioritized classes may be used. The user may also select the priority and the class/subclass of the search terms immediately prior to the search. The process, in FIG. 2, extracts search terms from input data represented by a source document or a data stream, and identifies data elements in the input data with the classification system corresponding to n priorities therein. In one embodiment, the operator selects either a convergent search or a divergent search in function 2034. Optionally, the convergent-divergent search function 2034 may be omitted. The process then applies the prioritized and classified search terms as primary search terms in FIG. 3, term function 2038, gathers documents and then resets n priorities in said classification system to m priorities in said classification system. This is part of the depth control function 2064 and control function 2068. Secondary search terms from the input data elements (terms 2008), classified corresponding to m priorities are again used in function 2040 and the search is repeated to gather secondary supplemental documents. The system then applies convergent-divergent test function 2072 (FIG. 4) on all supplemental documents to find convergent or divergent characteristics of the gathered documents. The search repeats until a search end parameter is met, such as all supplemental documents exceed a predetermined number, a predetermined number of data elements from all supplemental documents fulfill a predetermined number of priorities in said classification system, a lapse of a predetermined time, a predetermined number of data elements from all supplemental documents fulfill a predetermined number of priorities in said classification system, among other search end parameters discussed herein.

Optionally, the system and process may omit convergence-divergence function input 2034, 2036, and select n priorities from the prioritized hierarchical classification system, extract search terms from input data (functions 2006, 2008, 2010, 2012) represented by a source document or a data stream or a search term string, and identify data elements in said input data with said classification system corresponding to the n priorities. The process then searches data collections with said search terms and gathering supplemental documents based thereon. FIG. 3. The process then extracts secondary search terms as data elements from the supplemental documents with the classification system corresponding to n priorities and repeats the search of data collections with the secondary search terms. Secondary supplemental documents are then gathered. See FIG. 5, truncate, supplement and search function 2098, and repeat search function 2102. Such an optional search ends as described above.

Simple Filters

The user, prior to initiating the knowledge expander select content (SC) engine, may be given a choice of filtering out or identifying all SC data objects with white lists or black lists or a combination thereof as a content filter. Uncommon words, terms or data elements not found in the dictionary, geographic term lists or name lists and other lists are located with a negative content filters used to discover unknown data elements. The negative content filters can be added to the metasearch term engine such that these unknown words, terms or data elements are tagged "unknown" and assigned to the hierarchical taxonomic class as an unknown data element at the hierarchical taxonomic classification level (assigned to a class of words, terms, etc., and assigned an SC sensitivity level—that is—a hierarchical marker). The search terms extracted from the source doc are supplemented with white lists or black lists words, terms, etc. (content filters additions) and the supplemented SC or select content words or terms are filtered out to identify the uncommon or unknown words. Of course, the user may be required to manually input all SC words or download the SC word filter from the Internet or another secure network system or LAN. A "profile" of SC with the hierarchical taxonomic markers can be employed by the user-operator. For select content systems having multiple levels of importance (which may be multiple security levels or multiple levels of SC importance in an organization or related to the organization, for example, primary competitors compared with secondary competitors), a plurality of filters would be created, each filter associated with a different SC level. Further, multiple SC levels may require, remainder SC document or data stores (unknown data stores) and a plurality of extracted data stores.

The ability of the program to locate select content or SC words or characters can be enhanced by using a telephone book, properly dissected, to identify a collection of last names. Cities and towns and street names can also be identified in this manner. The compilation of last names and cities, towns and streets can be used as a list of critical, SC words. The filter is represented by this compilation of words. Similar techniques may be used to create filters for scientific words, or words unique to a certain industry, or country.

Complex Filters

There is a need to construct filters which supplement the initial list or compilation of SC words, characters, icons and data objects (herein "word" or "data object" or "word/object"). The need arises either due to the fact that the initial SC search term word/object list is incomplete, or that the author of the initial list is concerned that the list is too limited or in order to defeat an attack or an inference engine "reverse engineering" at the resultant expanded SC document. Further, the incorporation of a filter generator for SC search terms enhances the user friendliness of the program. In one embodiment, the program is configured as an editor compiler to screen and build enhanced SC doc or doc collection from a source document. The user selects, at his option, functional aspects which include: compliance with laws (an application of a type of filter, e.g. HIPAA, GLB, Oxley-Sarbanes, EU privacy, executive orders); privacy (another type of filter which locates SC terms, for example, social security numbers, see also, EU policy); search for and supplement filter; pay per view (which enables the user to buy missing sensitive information (for commercial purposes); survival (which creates a distributed and dispersed copy of the user's source document and other stored documents and items using predetermined storage facilities); security (which triggers the various security routines); and storing (which permits the user to select which of the several storage options the extracted SC data/objects should be employed in the dispersal.

Figure 6:
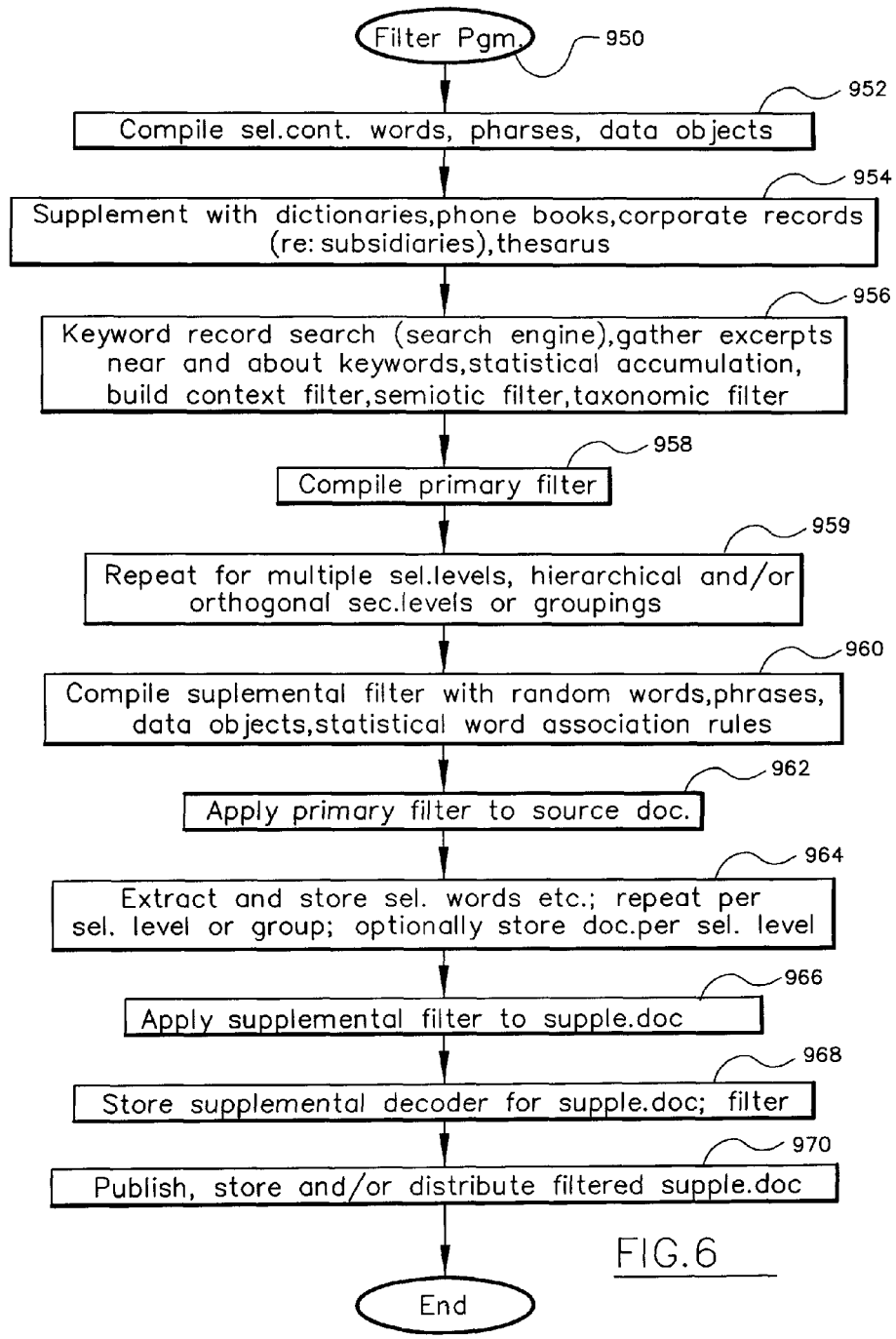
FIG. 6 diagrammatically illustrates a filter program.

The filter routine diagrammatically illustrated in FIG. 6 is useful in compiling a SC search term filter which separates both the sensitive word/objects and contextual and semiotic and taxonomic aspects of the initial list of SC word/objects. The filter works in conjunction with a compilation of data, typically located on a network which could be private or public. In low level SC situations, the filter may access Internet databases to gather additional data for the filter. In more robust SC systems, the filter could access private data bases (one located at the same organization level as the user) and build or compile the additional SC word/objects. The filter program 950 in FIG. 6 begins with step 952 which compiles the initial list of SC word/objects. In 954, the initial list is supplemented with dictionaries, phone books, corporate records (to obtain subsidiary data and trade names) and thesaurus data. This is a content filter. Each of these represent different compilations of data and the added data is added to the initial list of SC word/objects. In 956 a search is conducted on a network, usually through a search engine, to gather excerpts near and abut the keywords. This is a range or contextual filtering aspect. These keywords are the initial SC word/objects. Statistical algorithms are applied to gather non-common word/objects which are associated with the keywords as found in the additional data compilations. The goal of the adaptive complex filter is to obtain contextual, semiotic and taxonomic words, characters or data objects from the compilation of additional data related to the SC words, characters or data objects. Semiotic is a general philosophical theory of signs and symbols (read language and words and objects) that especially deals with their function. Semiotics include syntactics, semantics and pragmatics. Syntactics is the formal relationship between signs. Semantics is the meaning of signs and pragmatics is the relationship between signs and their users, such as the relationship of sentences to their environment. Taxonomy is the scientific classification and categorization of items. Therefore as an example, a search through the Internet on Google search engine under "Bin Laden" may show a number of uncommon (non-dictionary words)(content filter-based search) within 200 words of the target "Bin Laden" (a contextual filter-based search). This search string would gather documents from the Google search and copy 200 words on either side of "Bin Laden" and then extract only non-dictionary words into a supplemental SC term list. This type of filter algorithm looks for contextual matters close or near to the target. The search is semiotic and statistical in nature. Additionally, the initial supplemental list would identify the Bin Laden is an Arab and this classification (a taxonomic aspect) can be used to expand the list for the filter. The algorithm may include a simple command to gather all 10 words on either side of Bin Laden. This is a pure contextual search and the "10 word" range or format aspect is a statistical number. From the supplemental list, all pronouns, prepositions and conjunctions may be eliminated. Spiders or robots may be used in the gathering of the contextual and semiotic filter data. The contextual, semiotic and taxonomic words, characters or data objects from the compilation of additional data are all related to the initial list of SC words, characters or data objects.

Step 958 compiles the adaptive or complex filter. The above noted contextual, semiotic and taxonomic filter is adaptive since it can be used to expand (and potentially contract or reduce) and adapt an existing list of SC word/objects to a larger list which better expands the information content of the source document and supplies SC term data to an inference engine. Step 959 repeats the filter gathering and compilation for various levels of SC inquiries. Higher SC inquiries require a broader search (1000 uncommon words near Bin Laden and add all Arabic and sub-Asian continent cities). Orthogonal SC groups (those groups having the same level, e.g. S Secret, with each other but being different organizations, e.g, Department of Defense compared to the FBI) often have different methods to keep SC data separate between compartments.

The adaptive filter can be set to automatically gather additive SC word/objects. The system, with a basic filter, may identify a SC word in a paragraph being scanned by the initial filter. This SC word may be a special word in the existing filter or may be a non-common word not found in the initial filter. The adaptive filter system may then obtain this "unknown" or "special" word (a negative filter in that the word-object is not matched to a word-object having the same content), and conduct a search through a compilation or data base of additional words, etc. Any new word/objects falling within the contextual, semiotic and taxonomic SC words, characters or data objects from the compilation of additional data (database) related to said SC words, characters or data objects are then added to the filter. The expanded filter is then used to supplement the source document.

Step 960 compiles a supplemental filter with random words, phrases, etc. in order to further defeat an inference engine reverse engineering assault on the SC supplement document matrix. In some sense, the production and use of a random filter is an encryption technique since the resultant filtered product, in order to be understood by others, must be reverse filtered or decrypted to reveal the source doc and enhanced doc matrix at the appropriate SC level. Nonsense words may be added to this supplemental filter. Step 962 applies the primary filter (with the SC word/objects and the additive word/objects from the contextual et al. filter) to the source document. Step 964 extracts the SC word/objects per SC organizational level. It is noted that several filters are used, on one for each SC level, whether hierarchical or orthogonal. The extracted SC word/objects are stored as a supplemental search term doc and the system gathers supplemental documents (supple docs) which expand the knowledge base about the SC word/object. Step 966 applies the supplemental filter to the supple docs returned per search level 1 with SC search terms. The system then repeats the process of SC search term generation on primary retrieved supple docs level 1, generates SC search terms per level 2, and retrieves SC level 2 supple docs. A tertiary search term generation and supple doc retrieval is possible based upon the operator's initial set-up or upon operator input at steps 964, 970. Step 968 stores the supplemental doc to permit information enhancement of the source doc. Step 970 publishes, distributes or pushes the source and all supple docs and search term data to others having a need to know.

The Editor as an Information Expander

Figure 7:
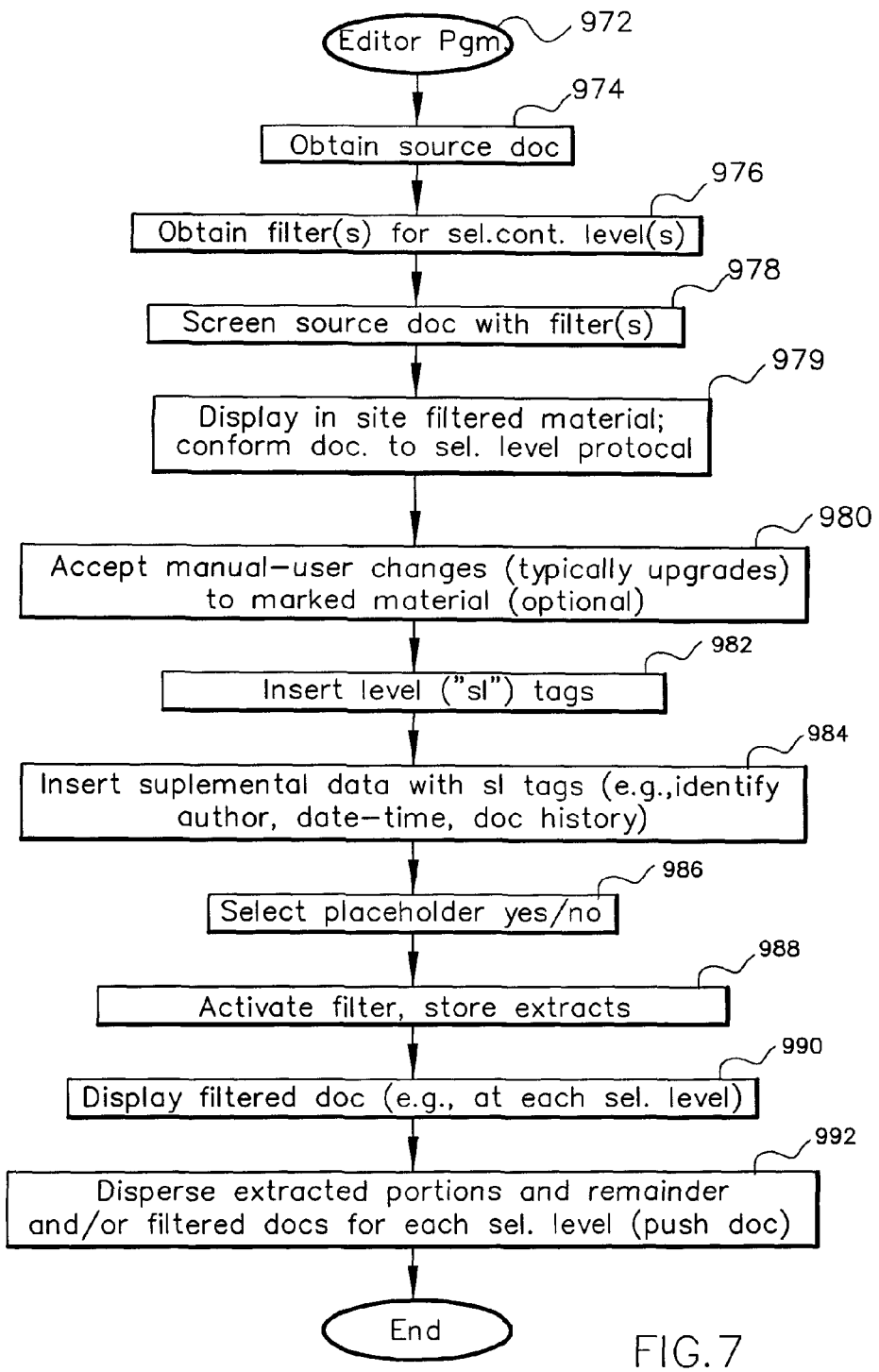
FIG. 7 diagrammatically illustrates an editor program.

FIGS. 7-8D diagrammatically illustrate an editor which may be employed to locate SC word/objects in a source document and expand the knowledge base with supple docs. In one embodiment, the editor is a standalone application or a module to add onto other applications for plain text and media creation, editing, and sensitivity SC level tagging. Other types of tagging, wherein the editor supplements the initial group or subset of select content SC sensitive words, characters, icons and data objects by categorization, taxonomy classification, privacy, security, compliance, and semiotic meaning, are also available. The editor supports a full range of document management and can be integrated into a unified infrastructure, from creation, editing, document markup, tagging, tag conversion, tag removal, context sensitivity level redaction, context reconstitution, support for complex process work flows, and expanding the knowledge base by adding supplemental documents (supple docs) to the initial collection of source doc. The architecture assures separation of data from metadata so that no security lapses are introduced into the traditional word processing and document management cycle.

From the user's standpoint, the Editor is not much different from other information processors such as Vi, Word, Notepad, and other desktop tools. However, behind the scenes (that is, automatically and with nominal operator input (after the editor is initialized)), this application separates the data stream from all markup and tagging word/objects for SC knowledge generation purposes.

The interlacing of user content with metadata creates significant process, storage, distribution, and workflow security failures that are not resolved with current technologies. Current technologies include encryption, firewalls, intrusion detection, perimeter guards, and locked distribution packages.

The Editor enables text and media creation. However, all additions, deletions, changes, insertions, and reorganizations and reordering are tracked as metadata that does not become part of the document. The document as seen and shown to the user represents the deliverable format. Since formatting is metadata, it is not included in the representation. Formatting, such font sizing, colors, font selection, footnotes, headers, subscripts, superscripts, line numbering, indexing, and other features characteristic of standard document preparation can be supported but are represented only as metadata. Tagging, including SC sensitivity level, categorization, taxonomy classification, privacy, security, compliance, and semiotic meaning are also represented only as metadata. This separation of representation from meta-representation is critical for creating the infrastructure for SC knowledge expansion, secure information sharing, privacy, security, and compliance.

The editor is currently set in a WINDOWS environment. Pulldown menus provide access to formatting and tagging features. The document, from source, precursor (marked and tagged but not yet filtered or extracted) and resultant final versions for each SC sensitivity level, as seen and represented to the user as is distributed in is resultant final form, thereby assuring SC knowledge level compliance. No hierarchical, hidden, encapsulated, linked, associated, or referential information is part of the data stream, file, or storage.

Metadata (such as formatting, such font sizing, colors, font selection, footnotes, headers, subscripts, superscripts, line numbering, indexing, and other features characteristic of standard document preparation) is usually hidden from the user. This supplemental metadata information contains all markup, tagging, formatting, and process support information for the editing process and enables immediate granular distribution of the data stream subject to the needed SC compliance rules. In other words, the data stream can be automatically processed with other functions to satisfy multiple competing requirements and SC sensitivity levels.

Figure 8A:
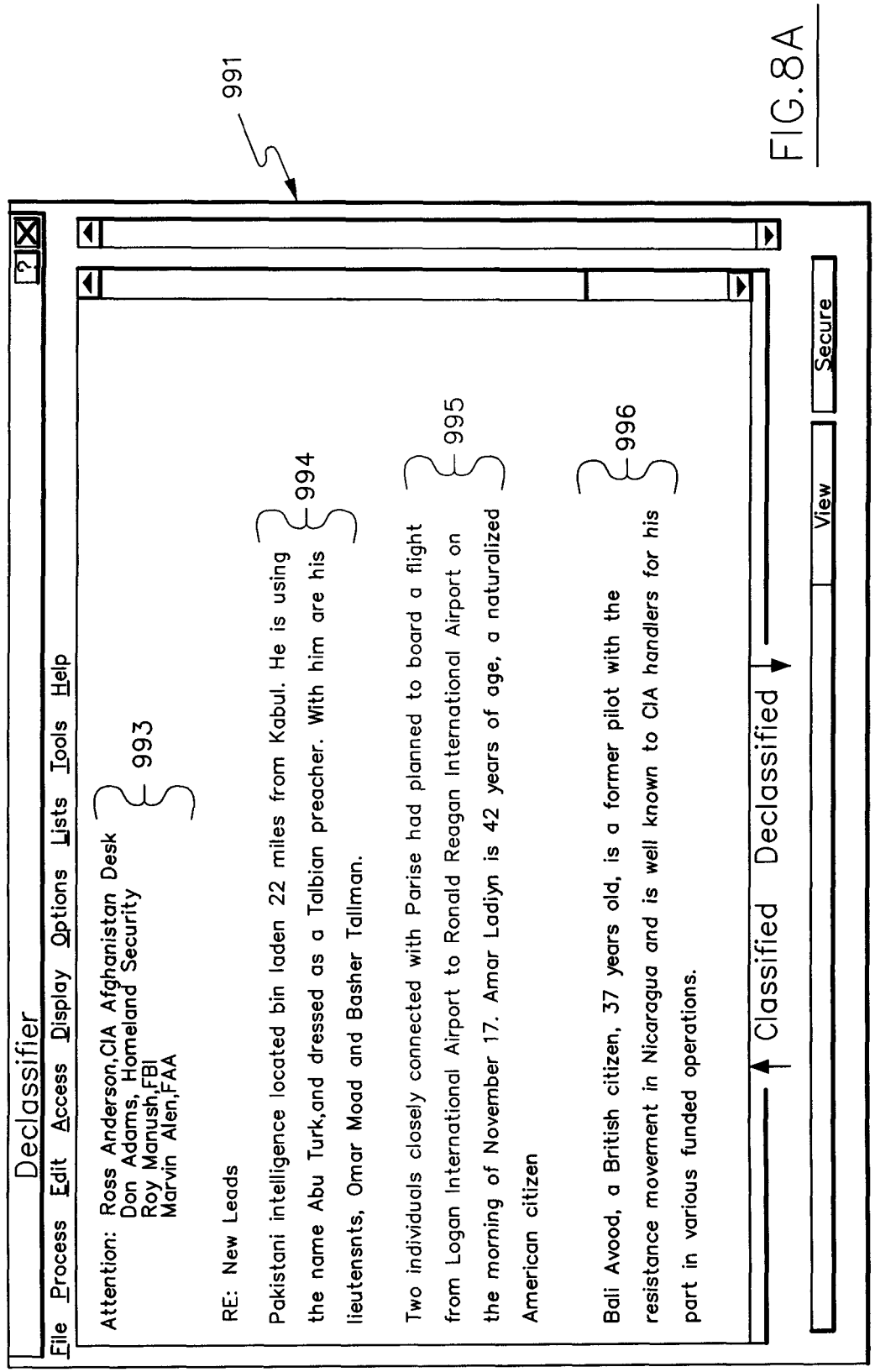
Figure 8B:
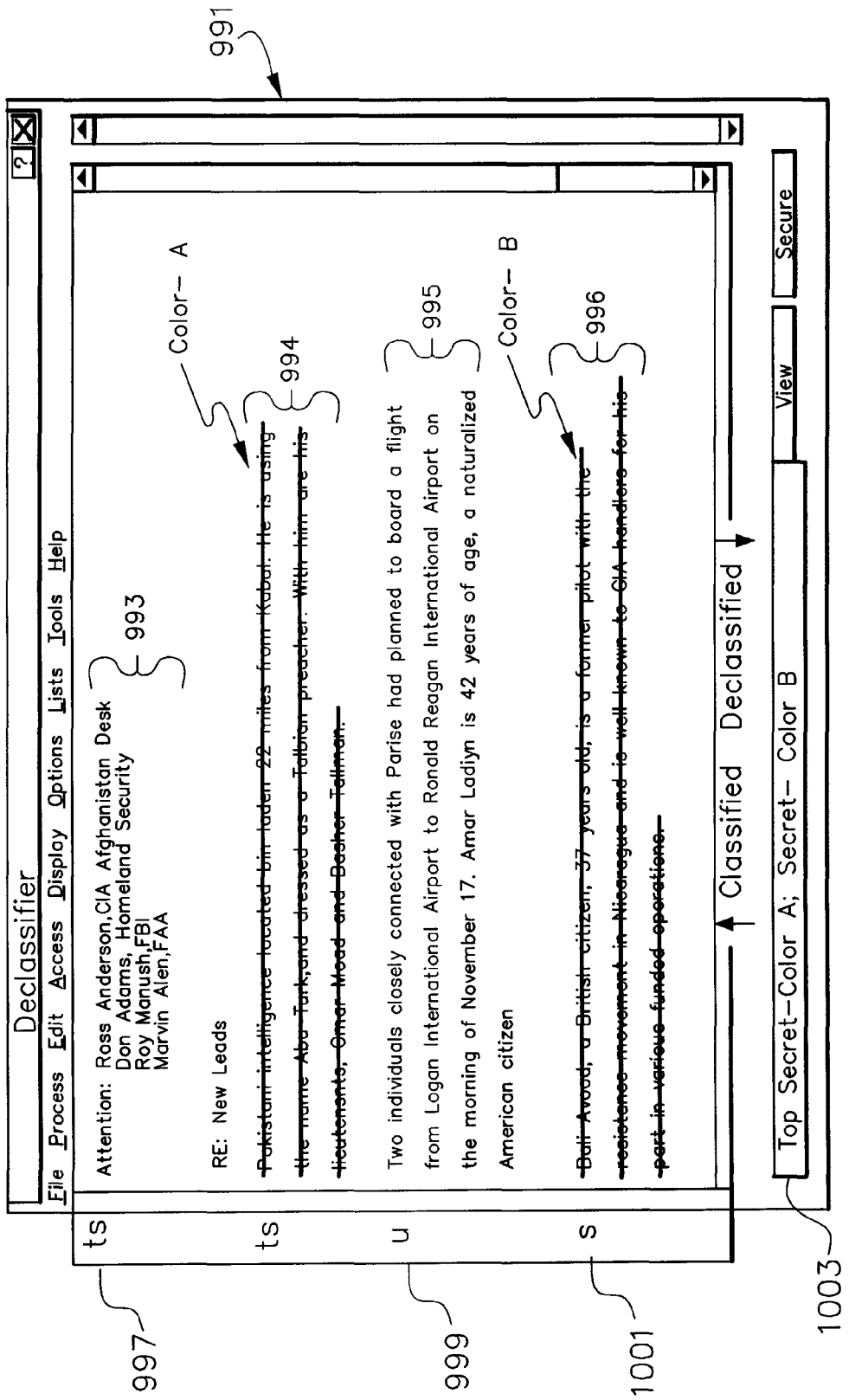

FIGS. 7, 8A-8D are discussed concurrently herein. FIG. 7 is a basic flow chart for one embodiment of the Editor. Editor program 972 begins with obtaining the source document 974. Of course, the source document may be any type of document or may be a data stream. Of course, the data stream is typically delimited by start and stop characters or codes. Hence, the term "data stream" is similar to "source document" herein and in the claims. Step or function 976 obtains one or more filters for one or more SC security or sensitivity levels. Step 978 screens or processed the source document with the filter(s). For example, the source document in FIG. 8A in window 991 has text regions 993, 994, 995 and 996. In step 979, the Editor displays, in situ (in the displayed document), the filtered identified SC material and conforms the precursor document to the SC sensitivity protocols. As shown, the SC sensitivity protocols are security level protocols for the system within which the Editor is employed as an information processing tool. SC sensitivity levels 1, 2, 3, etc. correlate to security levels TS, S, C and UC for top secret, secret, classified and unclassified. FIG. 8B shows that the address data 993 is marked TS (top secret), region 994 is displayed in color A for TS coding (please note that the addressee data may also be so marked) and is "red-lined" or struck out. In an information-expansion system, the process marks, labels or tags each word. This is a content filter and tag regime. The user may manually upgrade or downgrade SC levels. Region 995 is displayed as presented in the source document and is labeled U (unclassified) and region 996 is shown in color B, is redlined and is labeled S. Labels TS, S, C (classified) and U are the established security labeling protocol used by the organization employing the Editor. The same tagging for each word or character in the source doc can be used. Other labeling schemes for SC elements may be employed. Color is used to assist the user to select (and in some non-standard cases, deselect) the SC data marked by the editor. Redline is used to inform the user that the filter(s) will tag and extract the marked data. Labels are used to permit the entity using the editor to employ standard tear line protocol. Tear line protocol is a contextual tool. Any data beneath a security classification of the user is under the tear line and the data is permitted to be distributed to the lower security cleared user. Of course, electronic distribution of secure data need not use the hard copy or print version of the tear line. However, this nomenclature referring to the tear line is used in the prior art systems.

Step 980 accepts the user's manual changes (typically upgrades) to the precursor document. These manual changes are displayed, redlined, colored and labeled. Step 982 inserts the SC tags (or security label TS, S, C and U for the sample doc in FIGS. 8A-8D) as discussed above. Step 984 notes that the system takes certain meta data such as author, date-time, version history, change history, etc. and converts this meta data into ordinary text, marks that data at the necessary security level or SC sensitivity level and labels the meta data. Step 986 permits the user to add (or omit) placeholders into the final document. FIG. 8C shows placeholders as black lines or as XXXXX symbols (or other symbols) wherein the sensitive SC text is not shown but some replacement markers are shown. The byline in region 1003 show "sanitized document." The byline 1003 in FIG. 8B lists the security level (SC level of priority) and the color representation.

In a specific knowledge expander engine, each word, term and character is labeled or tagged with a content filter to show data object type (name, town, credit card number, etc.) and an SC sensitivity level (a "tax" or taxonomic classification and sensitivity level). See step 982. The user may add tags (step 979, 980). Meta data is also tagged or labeled.

Step 988 activates the filter, extracts the sensitive SC data and temporarily stores the extracted SC data. The expansive knowledge engine also stores negative filter results which are those words, terms or characters, images, not found in the context filters. Step 990 displays the filtered document and the user may view the filtered document at each SC level. Therefore, the user, before transmitting a secured email (or letter) doc may look at the source (FIG. 8A), may look at the TS level (FIG. 8A) without the redline strike out but with security labels and colors, may look at the T level revealing regions 996 and 994 but not regions 993 and 994 (which are TS coded regions), and look at U versions as shown in FIG. 8C. Step 992 disperses the extracted data and the remainder data or disperses partial versions of the document (those partial versions formatted and containing only data at or above the target security level (all TS level data (which includes TS, S, C and U data), or all S data (comprising S, C and U) or all C data and U)).

In step 979, the SC level protocol determines whether single words are granularly classified (TS, S, etc.) or whether a line is classified (context filter), or whether an entire paragraph is classified (see FIG. 8B). If a commercial/privacy filter is used to exclude all social security numbers, the organizational protocol is set at a granular level to exclude just social security numbers. Different group protocols use algorithms to mark, filter and extract adjunctive security sensitive words, characters, icons and data objects near the target SC sensitive words, characters, icons and data objects. The SC words may be security sensitive words, characters or data objects defined by compliance with law, regulation or policy, privacy, national, organizational or private security concerns. For example, Bin Laden is the target sensitive word in FIG. 8B and this classifies the entire paragraph as TS level. The other words in the paragraph are adjunctive word/objects.

In a knowledge expander mode, the SC filters are applied in a negative manner in that the following process is noted: (a) in the user set-up, the user establishes taxonomic categories or classifications and sets the selection priority of the classes; (b) the source document or source data stream is broken apart to separate all metadata; (c) the source document (may be a data stream) is processed by a taxonomic filter which tags or labels each word or data element with the taxonomic classification and the sensitivity or priority label (multiple "tax" tags, overlapping "tax" tags and "unknown" tags are possible); (d) after labeling, a content and contextual filter is used to separate out the unknown words or data elements (a negative filter). The resulting negative list of search terms is used in various search engines for both public and private data sources, to compile a compilation of supplemental documents (supple docs) and, thereafter, the supple docs are re-cycled through the H-tax and priority filter, then the content and contextual filter and a secondary supple doc collection is obtained. The primary and secondary supple doc collection represents the expanded knowledge search not typically found with commonly available search engines and processing techniques.

Document Object Model (DOM)—Protection and Processing

The search for expanding the knowledge base from a single source document to a larger compilation of docs has changed from locating content (see the prior art GOOGLE search engine) to the battle for expanding concept and context. Sequential text files are the exception rather than the norm. Flat, plain, and sequential files would have disappeared entirely from all but transitional processing steps except for the recent success of HTML web sites and the desire for storage of complex data into sequential XML formats. In spite of the apparent linearity of HTML and XML, in practice these flat files participate in a greater complex hierarchy of structured data mapped by object models. The object models blur the lines between content, concept, and context such that effective security requires a broader stroke than merely encapsulating content with encryption and limiting access with tokens or encrypted certificates.

Linkages to external files, style sheets, and embedded applications or scripts undermine the simplicity of HTML and XML flat formats and compromise point security. Even structured field or line and record-oriented file formats have given way to more complex data storage models. It is insufficient to view security of content and files in terms of encryption and encapsulation alone. Structured object models mix content with metadata and methods such that non-granular access—that is, either/or barrier-based access through encryption keys, dongles, and passwords—undermines any concept of effective security.

Furthermore, simplistic document management and access control overlook the multiple purposes for each compound data document and the adverse impact on organizational processes and work flows. Barrier-based security also fails from any Pacman-style attack, where the barrier, once breached not only provides full access to the once-protected interior also interferes with analysis of the attack and observation of how to prevent the ongoing attack. Granular multi-level control of user data, metadata, data stored through the specifications of a hierarchical data object model, and methods underscores the new security paradigm. This transition is most pronounced in Microsoft Office documents, such as Word, Outlook, or Excel given the indiscreet distribution of source files. Office document publishing and Adobe PDF creation represents a minimal solution to the object model and metadata security risk.

All data sources important to data process workflow are non-linear, non-sequential, and not standalone in that the data sources are interconnected to or required by other data sources. This includes databases, structured documents, desktop application user files, hierarchies of data structures, and work flows. The most advanced data workflow and the focus of attention is the object-oriented models used in data processing today which comprise a cascade of events rather than a single point operation. This complicates SC data expansion activities to promote security, survivability, privacy, confidentiality, and anonymity. The present invention improves the security of complex document object models and interdependent workflow by expanding the knowledge base form a source document, thereby testing the classifications levels and generally expanding the knowledge base of a user form the simple source doc.

There are only a handful of counterexamples to complex data structures, mostly monolithic file structures and simplistic processes. This includes text files, raw binary image files, and lists. These are typically inputs to older or uncomplicated computer activities; they do not reflect the complexity and interrelationships consistent with and necessary for most critical networked data processing activities. Examples of flat files are text files, binary images, and lists. Plain-text documents are used only as temporarily or as conversion paths for other activities. Binary graphics are employed for their specific simplicity, speed of display, and small size. It should be noted that they (BMP, GIF, and other formats represent the bulk of web images) are usually stored in an inverted backward last-to-first sequence. List files are rarely important and standalone files are often a temporary part of another process. One of the most ubiquitous of plain-text files, the HTML web page, is rarely a simple text file, but a circular connection to many other like files and one part of a more complex hierarchy. A relative of lists is the field-oriented record structure. This is web page usually a grid-like storage of linear data. However, even a table grid, multi-dimensional indexing, SQL query concept is giving way to object-oriented post-relational database storage methods based on object models in order to augment functionality, speed of performance, cross-platform and application functionality, and compete with easier to use user and developer products. Even the image files are becoming increasingly complex. Hierarchical images formats with vector graphics compress motion and curves into small packages. Examples include Corel Draw, Macromedia Flash, Adobe Photoshop, and Microsoft Photo. These of course contain proprietary and unintentionally-distributed information. Increased reliance on reliable data storage infrastructure and networked storage technologies is enabling the transition to data storage based on object models.

Figure 9:
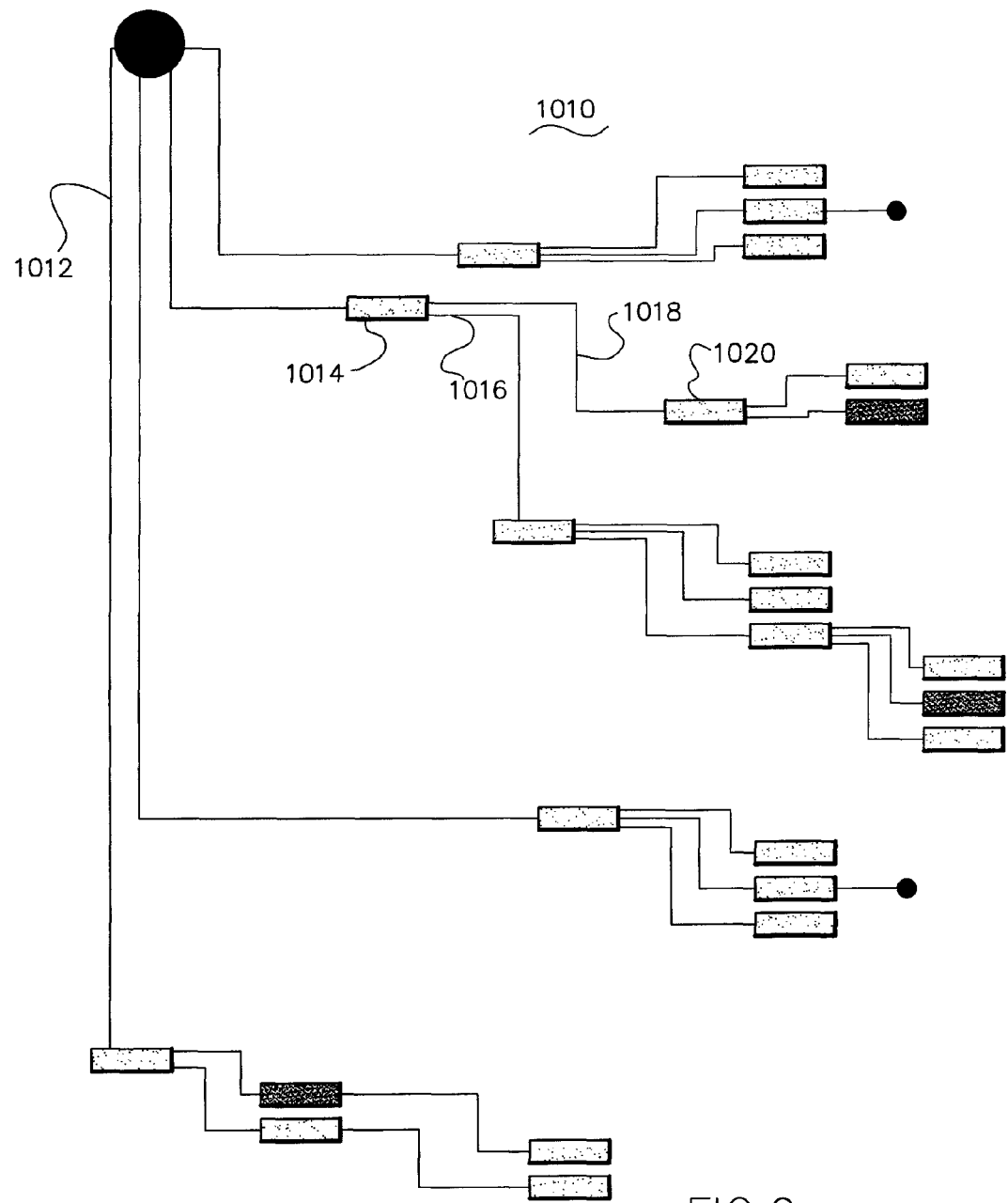
FIG. 9 diagrammatically illustrates a data object tree or map for a document model (DOM).

FIG. 9 shows the root, branch, and leaf paradigm of this principal data storage structure. See root 1012, content leaf 1014, branches 1016, 1018 and leaf 1020. The object model refers to the layout or the map (a blueprint supplied by the document object model (DOM) vendor) of how the data is potentially stored in what is definitely a linear file. The stored file is the document object structure containing the data whereas the model is the schema representation. The model FIG. 22x is just a blueprint for an empty data structure.

The data structure is stored as a binary file populated with data representing a subset of that blueprint. The data file is often referred to as the document binary file so as to make clear that it is not a plain-text file, not in user-friendly format, and generally readable by an ASCII reader only in discontinuous chunks. The model and the structure are not the same. The model (FIG. 9) does not represent a security threat in itself, it just represents how to find and define data stored within an actual data structure. It is the data structure in memory (the source document) or stored as a file that is the security threat. Usually, the file containing the data structure gives enough clues to the purpose, methods, and sources unless addressed by a multi-level security scheme attuned to the complexity of the object model. Although this "file" is stored as linear flat file, the extended structures is dependent on the hierarchical collection of potentially infinite branch and leaf references. Despite this complexity, there are clear reasons based on simplicity for this hierarchical structure, not the least of which is flexibility, self-documentation, and backwards/forwards compatibility.

The subtle differences between a plain-text file, a file containing lightly structured data, the schema, and a file containing data within an object structure becomes very important for security. When files are distributed and those files each contain data within object structures, workflow is complex and cannot be effectively protected with barrier-based security without complicating or disrupting operations. For these reasons, internalized security reflecting leaf content, structural paths, and the mesh of inter-relatedness among the paths, leaves, and external sources becomes the next paradigm for implementing effective content-level and application-level security. Consider the data structure defined by an object model as an organizing container. The contents within can be empty, or collections of containers, with more containers within. It is a security sieve with traditional encryption and the requisite inter-process work flows. The leafs and the security of the leaves does not secure a chain of evidence increasingly necessary in modern data processing activity.

Enhanced security must reflect this distributed requirement since the data sources are not single point sources, but complex relational, object-oriented, or hierarchical. In addition, data access and processing is approaching a worldwide distributed infrastructure, and completion transcends single places, times, and events. When the security problem is dispersed, the security solution cannot be monolithic either but must reflect the dispersed distribution and hierarchical complexity of the data and process. Location is not the problem, so metaphorical perimeter walls are not the answer. To treat security too as a monolithic, static, and walled solution when the security problem is granular and dispersed within a flexible time frame misses its true need. Effective data security must reflect five informational attributes in a newer paradigm for security. The five informational attributes are listed below and examples of the attributes are also listed. For each select content or SC sensitive organization, the data structure must be analyzed and the five attributes must be applied to each root, branch and leaf to ascertain the level of SC sensitivity for that item. For example applying a security schema to the SC knowledge expander problem, a TS level may be established by applying the five attributes that all audio files are "security safe" for that SC level but these audio files will not be downgraded or released to a lower SC level. Therefore the meta data representing the audio file is designated TS. Another example is that all machines at the SC level S ($3^{rd}$ level of the TS-S-C-UC schema) are 2004 machines and programs. The organization may set, as a policy, that all MS Office program meta data need not be backward compatible beyond 2004. This organizational protocol then reduces security issues relative to the backward compatibility issue.

```
        Informational Attributes for Security
           Purpose
           Sources and methods
           Ownership
           Date or timeliness
           Content
        Purpose Classification - Exemplary Table
     .backwards compatibility (purpose: communication across
     machine platforms
     .background color (purpose: visual presentation)
     .font size (purpose: visual presentation)
     .image
     .video
     .audio
     .version control (purpose: source identification)
     .etc.
        Sources and Methods Classification - Exemplary Table
           .origin plain text
           .origin entire document
           .image
           .video
           .audio
        Ownership Classification - Exemplary Table
           .source, author
           .security level initial document
           .security level generating modifications to initial document
           .hierarchical, orthogonal security classification
           Date or Time lines - Exemplary Table
           .version control
           .source identification (includes all contributing
           authors supplying modifications)
```

These five security attributes reflect not only the data content but also the point processes, embedded resources, and work flows. In a similar manner, SC sensitivity levels can be applied based upon time (temporal) issues, competitor or size of company, type of product (critical, sub-critical, or ancillary), etc.

This metaphor fractures complex data processing workflow. Traditional search methods point only to defined search terms, maybe with a simple truncating algorithm which deletes "s" and plural suffixes from the defined search terms. A monolithic approach to prior art searching ignores metadata, process, multi-tiered files, delivery, and storage. Data sources are not monolithic, and certainly data is not either. Distributed data, distributed processing, and widespread distribution defeats common search techniques. Access and search techniques need to be granular and multi-level, and represent the five informational attributes presented above.

Recognizing the Document Object Model (MS Office)

Every MS Office binary document contains confidential information, typically metadata. This ranges—from small amounts of information about authorship—to the editing history complete with deletions, reviewer comments, file attributes, and source and routing information—to extraneous baggage from documents previously edited during the same session.

A multi-faceted SC workflow process becomes an issue over control of distribution by document type, recognition and categorization of all user content defined by security exons (discussed later), removal of non-coding or non-activating security introns (discussed later), preparation and distribution by SC sensitive levels, content certification and accreditation (C&A) subject to conversion to primitive and certifiable file formats, distribution in print-representative-like packages, with guarded ingress and egress of Office files. Finally, implementation of a knowledge expander search through granularity of MS Office node elements by analysis for inclusion and exclusion is a far more effective method, permitting collaboration within a multiple-usage infrastructure.

Office Versions, Releases, and the Data Object Models (DOM)

Figure 10:
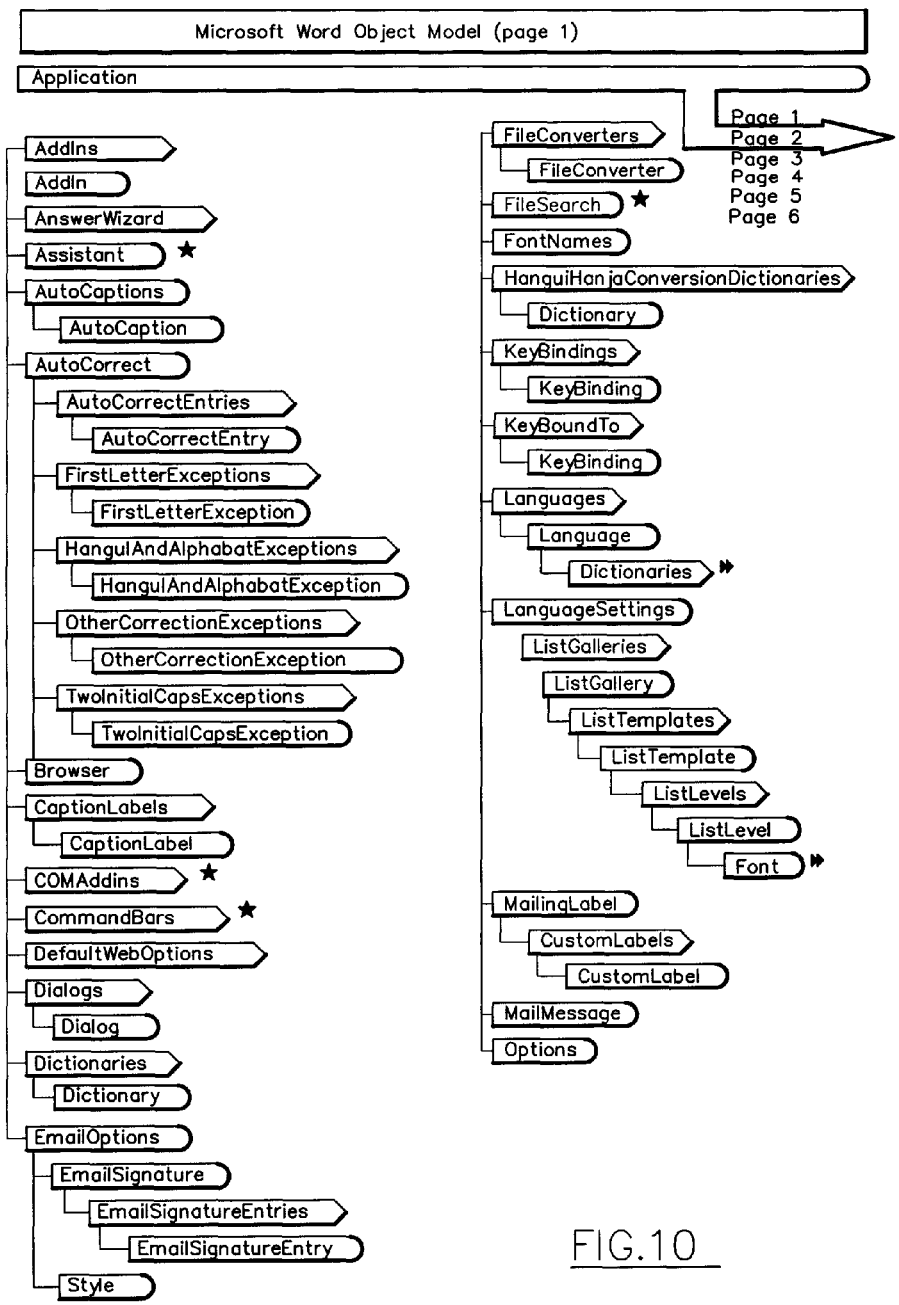
FIG. 10 diagrammatically illustrates varies metadata levels in the DOM.

MS Office is a complex document structure because of the interaction among the MS Office applications and documents, the creation of metadata in binary document file formats, and the shift from one of results to that of a reentrant and ongoing process. Document data has expanded from simple linear files to complex object-oriented structures. FIGS. 9, 10. MS documents are black holes in that what goes into them at any point usually stays there. Additions, deletions, system information, redlining, reviewer comments, and routing become indelible parts of each document as metadata. Many different versions of MS Windows, server extensions, and many releases of MS Office or its constituents complicate security. Application features, bug fixes, security patches, and $3^{rd}$ party add-ins complicate the nightmare when assessing and ascertaining the exact composition of the MS Office environment. Client-based applications, such as InfoPath, Outlook, Outlook Express, Internet Explorer, the various scripting languages, plus server-based applications including Exchange, SharePoint Server, Net Meeting and Live Meeting Whiteboard, Live Communications Server enhance the collaborative physical coverage of MS Office but also correspondingly increase security and privacy risks.

The MS Office document is forwards and backwards compatible across MS Office releases. Cut and paste among the Office applications adds non-native structures too. Therefore, results from file conversion, raw data, metadata, links, macro code, and structural elements can be hidden accidentally or purposefully. It also possible for a sophisticated user to create new and undefined covert structures ignored by all extant MS Office versions and tools, visible or activated only by complex steps, since MS Office does not validate the integrity and applicability of internal structures within a document binary file.

A typical commercial installation will include any, all, or additional components as listed in FIG. 10. This chart does not included ASCII file formats, printers, printer drivers, FAX drivers, HTML, XML, Adobe Postscript or Acrobat drivers, Outlook or Exchange databases, and OLE document objects, plus other COTS products that integrate with Office, expect Windows or Internet Explorer components, use dynamic data exchange (DDE), object linking and embedding (OLE), or exploit the kernels of Windows and Office. These all pertain to the process of implementing MS Office document metadata. The metadata, by its nature, defines a context within which the content of the words and terms in the doc file are employed.

It is important to recognize that there are many file types and document structures associated with MS Office, specifically defined by the formal MS Office documentation at msdn.microsoft.com but also those shared with other MS Windows applets and competing products. Each MS Office application, such as Word or Excel, create file binaries or binary files with different object structures but interchangeably read/write and import/export each other's file types, embed portions as formatted text or complete objects, or link through remote procedure calls to these other file types. These object model structures are generically called the Document Object Model (DOM). The DOM is another term for an object-oriented data storage package. The purpose for the DOM with hierarchical storage of metadata is three-fold. First, it is useful for backwards and forwards version compatibility. Second, metadata extends the document creation session from one-time event into an ongoing revisional process. Third, metadata provides order and structure otherwise notoriously difficult for inherently free-form and flexible documents.

Metadata provides backwards and forwards version compatibility, a problem that plagued the software market of the 1980s as upgrades were frequent and disruptive. This is specifically missing with Access and its .MDB table space/workspace metaphor. Frequently, software upgrades included old data upgrade routines to convert old formats to new. This was both risky and prevented reversion to the older software version once the converted data was used in the newer application. Metadata provides the necessary blueprint, format, and structure retention so documents can be revised in future editing sessions. Format information is part of the Office metadata, although style sheets and schemas maintained in a different storage channel are valuable in HTML and XML and might aid the future transition to a different MS Office DOM.

It is incorrect to assume a static basis for any MS Office application document structure, as a monolithic MS DOS-based file, or as an in-memory object. For example, the Excel DOM can be embedded inside a Word DOM, which selectively can then be pasted as a formatted object into a PowerPoint presentation. Another concern that arises in almost every Office document is imports, pastes, and OLE imbedding of other Office documents and aspects of the object model corresponding to that application type. For example, a base Word document with a spreadsheet and Project waterfall chart now includes editable components referencing a different Office applications with data in a structure referenced by that corresponding application object model, in this case Word, Excel, and Project.

FIG. 9 shows each branch or leaf can be replicated indefinitely until reaching the limits of Windows RAM or file size. Each MS Office application has a different DOM. Because of DOM evolution, with the MS Office assertion of backwards and forwards compatibility, realize that some nodes might exist in the binary document file but not every function appears within each published output because it is not used by the author.

A notepad text file in a corresponding word document has a 40 character file is stored by FAT32 in minimum 1 KB blocks, although its 1 KB storage block only uses 40 characters (use a hex editor). In contrast, the basic Word document file requires 18 KB on initial saving, but a full 28 KB with edits and deletions, metadata, and redlining, as shown. Footnotes, font changes, hidden text, additional changes, headers, and footers, table of content, indexing, an index, macros, .DLL add-ins, .OCX add-ins, and formulae could arbitrarily increase the file size indefinitely. This shows that MS Office security risks are reproducible at any user desktop. A hex editor used in conjunction with an initial raw ASCII file and the corresponding .DOC file also shows risks. ASCII text has only 40 characters despite the directory display of the 1 KB FAT32 block. The internal encoding of the .DOC file with initial content, the binary object structure and additional metadata are partially encoded in a padded form of ASCII. The metadata displays the source location of the document, removing possible doubts of file directory structures, security based on location obscurity, and other rational workflow techniques for securing user files within the context of a network infrastructure.

Microsoft has identified thirteen key categories of metadata: Name; Initials; Organization name; Name of originating computer (desktop); Name of network server and/or hard drive; File properties and summary information; Non-visible embedded documents; Names of previous authors; Document revisions; Document versions; Template; Hidden text; and Author comments. Some of this metadata is accessible through the Office application menu interface through menus and dialog boxes. The exploitation of this metadata in an knowledge expander search is useful. There are also the document file properties exposed by the Tools/Options pulldown menu and the User Information tab. This is not the complete list of metadata. Other visible metadata with potential search characteristics include: Footnotes; Cross-references; Table of Contents tags; Indexing tags; Hyperlinks; and Smart tags. Expect x-link and x-pointers plus style sheets and schemas within documents saved in the XML format. In addition, other undocumented structures are part of the extended and expanding Office document object models. Consider fields and mail-merge fields, which are markers for information automatically inserted by Office or by a user when opening, saving, printing, or emailing documents. These fields create a built-in facility for careless information disclosure or overt hacking. There are also the document file properties exposed by the File/Properties pulldown menu. This includes: File/properties; General; Summary; Statistics; Contents; and Custom.

The knowledge expander search also contemplates finding and using other items not specific to MS Office. Techniques for information camouflage can be used in an knowledge expander search. These are equally valid in most any desktop application, and are most relevant to presentation output rather than binary file delivery. Information camouflaged in a source document includes text set to small font sizes, such as 0 or 1, fonts set to type unlikely to be installed on the system which map to symbols or line drawing, PostScript or Unicode font sets with alternate encoding, and font color set to match the paper color or an applied background. White font on white paper hides text, black font on a black border or shading hides text too. Text can also be hidden with graphics when the graphics are anchored to a specific location congruent with the text. Color games with text and graphics also hides the text. Macros, VBA (Visual Basic Application) codes, VBA add-ins, and applets also represent a search asset. Anything than anyone can imagine as an application can run from within MS Office, productive or destructive. Usually, these bits of code are stored as part of the document metadata. However, they also can be out-of-channel files. Either way, they can be compromised by a new code that overwrites the original. They also can be inserted through fields, formulae, or menu add-ins. Collaborative tools are the most obvious entree.

New features in Windows and other Microsoft digital rights management (DRM) applications, such as ORAPI, ADSI, and MS IRM provide for collaboration, resiliency, and complex versioning and backup far beyond the capabilities of MS Office.

Content

The differentiation of content within an MS Office document based on initial owner and target distribution is important for search expansion. Some content will be strategic and some tactical. Content of MS Office documents transcends the actual presentation as a printed page, slide, spreadsheet, database report, email message, an index of documents, UML: or project waterfall, or organization chart. Microsoft Corporation is positioning Office as a platform for delivery of new services; it is not just about a PowerPoint presentation or a Word document printed to a facsimile. The DOM is a project plan, with a structure, with components that do things and are sensitive of their own.

For these reasons, it is important to explore the MS Office DOM factors: Content classification; Tagging; Clearance level; Data mining; Traffic analysis; Inference; Encryption; Digital Signature; Document access linked to Fortezza (an encryption program/system), PC Crypto cards, smartcards, and n-factor authentication; Granularity; Strategic information; Tactical information; Common Criteria or NIST analysis; Covert channels; and Bell-LaPadula model conformance.

Content classification with taxonomic classes occurs with tagging for formatting with bold, indexing, and paragraph marking, explicit element tagging for HTML and XML or database and spreadsheet table, field, ranges, row, and column designations, as well as authorship techniques. Formulae and macros define ranges with informational content (contextual algorithms which link content), as well as indicate purpose and intent of the process as well as the target data. When content is tagged at the sideline, as in "eyes-only," or within-the text with any label name for clearance level, as in "<1>," this attests to a SC sensitivity level with an importance factor. For example, a subtotal of employee salaries within a pro form a business plan matched against a list of employee names compared to a bank check ledger gives away each employee's salary level; each document in isolation does not give away information until several are merged and analyzed together. Direct analysis through record relationships and sorting is one type of data mining, human intelligence through inference or statistical inference with set theory or Bayesian methods is yet another. For example, because you know that 6 employees are traveling to a conference in D.C. and two others are not in the office, you can approach a particular person who by inference is manning the station desk with a very specific social engineering attack. OneNote, InfoShare, Net Meeting and/or Live Meeting, Outlook, and Exchange with MS Project also enable workflow routing, group editing, and acceptance signoff. This information becomes part of the document metadata so that traffic analysis shows where the document originated, what changes were made and by whom, how it was routed by username, network, and IP address, who has seen it and has access to it, and all process flow and comments. One of the secure prizes of organization information thus unintentionally published is the names of people within the organization and functional roles.

Designing a knowledge expander search engine through granularity of MS Office node elements by analysis for inclusion and exclusion is an effective method. Multiple source documents create structure and semiotic meaning not in evidence with subsets. This process breaks the context to prevent useful data mining, routing inferences, and the more powerful semiotic information methods. It allows for the separation of strategic information from the tactical, so that access is granular by role, user, and other discriminators. Many academic and implemented security models are in use today, both as a straw man and for certification processes.

DOM Process Editor

Document object model (DOM) source documents, and particularly Office document modules, comprise the blueprints, process, external data sources and linkages, and materials for building the resulting presentation; the presentation content is usually the ultimate end product. The blueprints and process often are immaterial to the presentation and represent proprietary and confidential material. This DOM object model complexity and diverse accessibility creates an opportunity for the knowledge expander search engine.

Effective DOM (Microsoft) and metadata searches use the object hierarchy structure as variously described as a binary tree, category structure, or hive. In any event, the entry point is the root or base, containing a potentially infinite number of subcategories, each with a potentially infinite number of leaf items. See FIG. 9. The structure can be pruned, deleted, or rearranged. The items represent object-oriented information, from entire subdocuments, to relational databases, layered graphics with vector elements, to simple plain-text, to a single binary numerical element.

The process requires a parse of all branches to each and every leaf. This process is not recursive, just extensive. Each path is examined for context, each leaf for content, all nodes for external references, and everything must be viewed within the context of sources and methods, not just obvious content. The obvious content is what the user created and sees, but as you now know, that is a minor portion of the data contained within the document object structure. This is a paradigm shift is shown in the hierarchy below:

---

Table for Processing DOM

For each document (the file and structure)
    Access the root
        For each limb
            For each branch
For each sub-branch
        For each leaf (item)
            Process each leaf

---

Preservation of the path to each leaf is important as it defines the access to that data element. The existence and/or null value of the leaf represents a security control point. The model defines, with supplemental external knowledge of the object model, potential search opportunities. The model and the content are not separate from external knowledge of sources and methods. The model and the content are part of a contextual analysis of the source document or data stream itself. The leaf the significant search control point. It is possible to review and alter the contents of the leaf within the context of the purpose of the leaf to retain functional access with multi-level SC sensitivity.

Five Informational Attributes

The five information attributes of SC sensitivity in context to processing include the leaf, purpose, sources and methods, ownership, date or timeliness, and content. The entity must establish protocols which rate or prioritize the five information attributes on each root, branch and leaf in the DOM source document. With the system initialized in this manner, the processing of the DOM document within the parameters of the knowledge expander search is accomplished.

Purpose

How does the purpose of the leaf provide context, purpose, or informational reference to the document as a whole or the individual leaf? Does it provide source, destination, authorship, viability, validity, verification, or integrity to the document as a whole or the individual leaf? Consider the value of processes imbedded in the document as cell formulae, a help file, or other complex routing wizard. Does it show linkages or references to other documents? What is its status or position within the document? What is its element position, as a headline, footnote, or redlined status? These seemingly minor details transcend actual content but provide clues to the following attributes.

Sources and Method

Intelligence agencies stress the confidentially of the sources and methods used to gather information. The information itself might or might not be important, but the ongoing care of the sources and methods is important for future information gathering activities and retention of any status quo until action is initiated. In addition, the viability, validity, verification, or integrity of the document is predicated by the viability, validity, verification, or integrity of the sources and methods used to create it. In terms of the Office document, this type of information is both contextual, leaf content, and metadata. To presume that the SC search uses only doc content at the leaf misses the value of metadata and the inherent value of the object-oriented document format. For example, authorship, source, source dates, editing dates, deletions, redlining, notes, footnotes, MS hidden text, links, and other structural elements in the source doc describe when, how, where, and who created the document. This speaks to the viability, validity, verification, or integrity of the document as a whole, and can compromise past, ongoing, or future data collection efforts and operations.

Ownership

Ownership is reflected both in leaf-level content—that is obvious when a document is presented or published—but also in the metadata. Ownership is also a characteristic of file storage properties, in ring rights, file storage position, linkages, SMB or network file access rights, and HTML references. Ownership, particular the number of links, the times access and edited, numbers of hits, and the level of churning, suggests the relative importance and merit in the document.

Date-Timeliness

Date or timeliness reflects currency. The dates, in terms of edit times, access times, and frequencies suggest the relative importance and merit in the document. Touch and other file-level commands can only mask the overt date and timestamp of a file, not its purpose or content, true timeliness, or merit. This information is spread through the metadata and leaf content. In some hierarchical structures, this information is stored in tables or other structures apart from the immediate document root. When a document is a relational data structure, as in Access or SQL, hidden system fields and hidden security data define edit and deletion times. It is also important to recognize that in databases, records which are deleted by the user are only marked as deleted but persist until the database is purged, packed, cleaned, compressed, or otherwise processed in a maintenance mode. When relational technology with transactional logs and rollback facilities are enabled, data can be recreated or dated despite many types or natural of instigated disasters. This supplemental metadata defines date and timeliness too.

Security

Security of content can be compared to erecting a barrier around that content and may be viewed as an important SC sensitivity issue. However, when content becomes a collection of simple data elements along with data objects, dispersed and distributed sources, effected by embedded events and triggered methods, a search which ignores the security content characteristic fails to acknowledge that the SC sensitivity may be impacted by such omission.

While content is king in most search systems, it is not the only critical aspect of a source document. In terms of the knowledge expander processing of an Office document, each leaf must be processed and assessed for its metadata. Note again that each leaf may be another object-oriented structure in its own right or a simple element. It will need to be processed and assessed accordingly.

Select Content Introns and Exons

Terminology employed in connection with the operation DNA (deoxyribonucleic acid) provides an appropriate metaphor for the MS Office document object model or any other DOM model. While the DOM is separate from an MS Office binary file, it defines the purpose of that file and maps its activation. The DOM "genes" are expressed into the file binaries only as specifically referenced, and frequently diverge from the pure MS Office application as genes from other OLE (object linking and embedding) applications are embedded into the document. The DOM and the expressed document can mutate for better or worse, and both backwards and forwards the document is adaptable just like DNA, with unforeseen consequences including the profound security flaws evident within the MS Office workflow.

In genetics, an intron is any non-coding or non-activating sequence of DNA initially copied into RNA but cut from the final RNA transcript or unknown as to singular or recombinant purposes. Introns are excluded or ignored in the DNA process. An exon is a coding or activating sequence with a known purpose that is actually used or one that is unknown as to purpose but nonetheless still used. DNA is, of course, the blueprint for life. RNA is the functional transcript of the DNA blueprint used for cell division and replication. Exons are the useful portions in the DNA cycle.

In the object model, the DOM is metaphorically the DNA blueprint for an MS Office document whereas the actual Word, Excel, or Outlook message is an expression of the RNA as a functional transcript. Correspondingly, the SC or select content intron is any document branch, leaf, or node element with a non-coding, non-activated, or even unknown control utility for the document. From a select content-search standpoint, each and every intron represents a non-qualified element that is a potential search term that may lead to an expanded knowledge expander supple doc compilation. Rather than ignoring SC introns as most common search engines do, the current knowledge expander search engine employs the SC introns to expand the scope of the search. A SC exon is any document branch, leaf, or node element serving an end purpose. Each SC exon in a MS Office document becomes a certifiable data element.

Unless each such SC intron and SC exon in the source document DOM is vetted for credentials, which vetting includes a prioritized taxonomic label or tag, the knowledge expander search, whether through conventional search engines or the novel search engines described herein, will be incomplete. This is effective for DOM, HTML. XML, databases, and any structured file binaries. The standard 2-phrase process transforms into a 3-phase process where DOM node elements are coded either as exons or introns, and thereafter processed accordingly for inclusion or exclusion.

The improved accuracy of 3-phase scanning of documents within the context of an object model is apparent. While the traditional 2-phase method find SC introns and SC extrons within a source document, it also miscodes several other sequences as introns. The accuracy of such process will always include statistically measurable false negatives and positives, thereby missing true threats and removing nonthreats. The 3-phase process improved on the 2-phase process with granular deconstruction of the document and subsequent recoding of both false positives and false negatives to yield a higher rate of accuracy. SC introns are added to the search term list in the knowledge expander search engine and are scalable numerically. Better DOM maps mean better intron handling.

Figure 11:
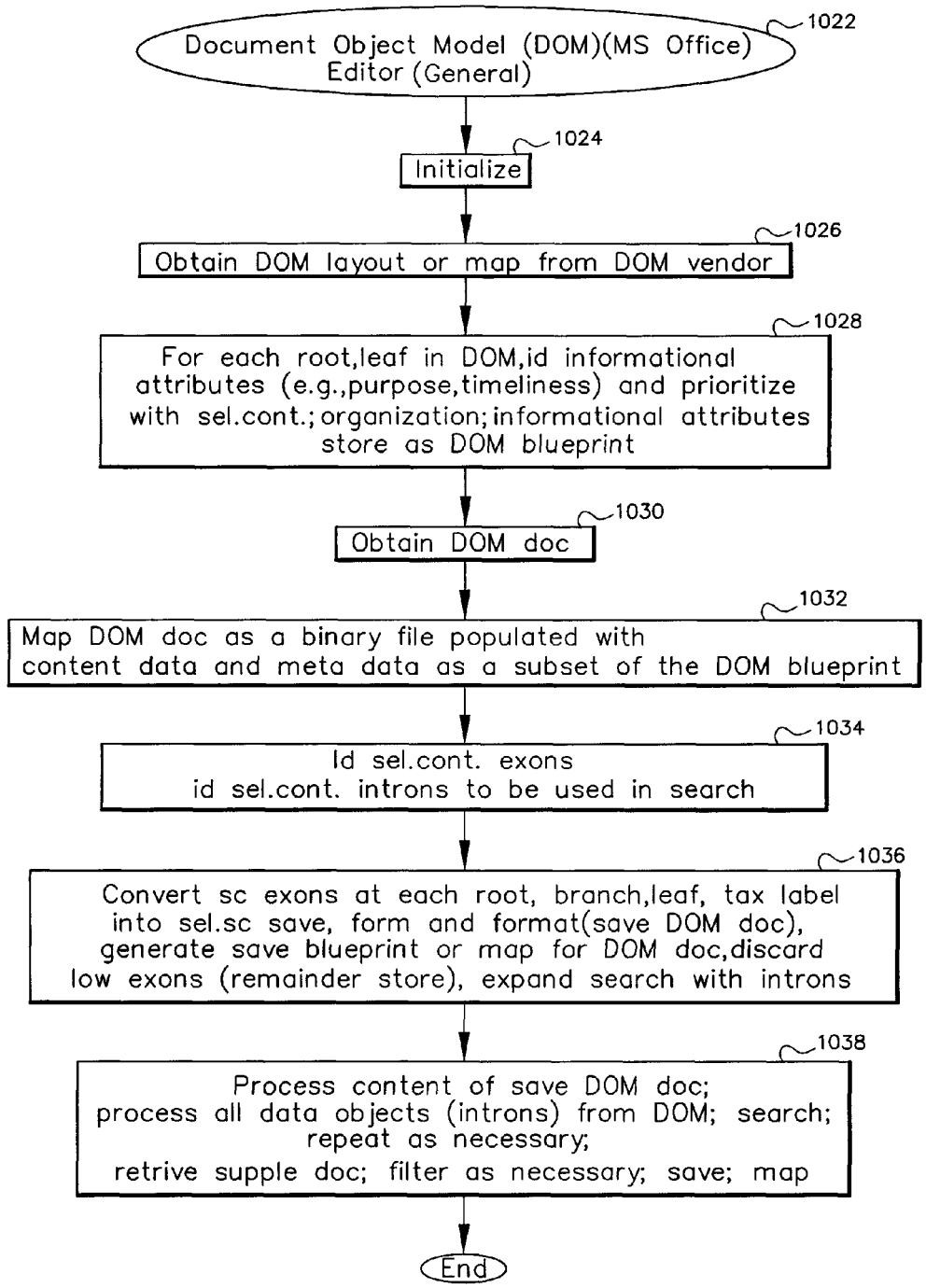
FIG. 11 diagrammatically illustrates a DOM editor process.

FIG. 11 shows the General DOM Editor program 1022 in a flow chart form. Step 1024 is the initialization that is employed by the security entity or SC sensitivity supervisor to set up the program. Step 1026 obtains the DOM layout or blueprint from the DOM vendor. Step 1028 notes that for each root, branch and leaf in the DOM, the information attributes must be prioritized with the SC or select content and organizational informational attributes (a taxonomic routine with prioritization). SC introns are identified and SC exons are classified, placed in a hierarchical structure and labeled. This step, of course, uses a content filter to identify the SC exons. A contextual filter or algorithm is used to taxonomically classify SC exons at a higher priority level. For example, when "Bin" is next to "Laden" the SC exon combination—Bin Laden—is classified TS or the top level for the SC H-tax class.

Step 1030 obtains the source document DOM. Step 1032 maps the DOM source document as a binary file populated with content data and meta data as a subset of the DOM blueprint. Step 1034 identifies SC exons and SC Introns. Step 1036 labels or tags SC exons per the tax class (taxonomic classification) and per priority, to be included in the further processing of the item and identifies SC introns to be used as search terms in the knowledge expander search. Multiple tags and overlapping tags are possible and a ruled-based system is employed to upcode multiple tags and overlapping tags to the next higher tax class—priority level. Step 1036 converts SC exons at each root, branch and leaf into SC level save doc, form and format (for example, a safe DOM template), and generates a save blueprint or map, drops (or alternatively stores in a remainder store) all low priority SC exons, and expands the search term list with the SC introns and the top group of the SC exons. Step 1038 processes the save DOM doc, that is, the top level SC exons and all SC introns as search terms through public and/or private databases, indices, search engines, etc. A divergent search uses SC intron. A convergent search uses SC exon. Supplemental documents are gathered form the search, the filter H— tax class priority tag process is repeated on the supple docs, the SC introns are identified and selected top priority SC exons are identified and the search and a second tier supple docs compilation is processed. Supple docs are stored and a relational map is generated both with the search terms and the supple docs.

DOM Template Editor

The following tables present the current collection of methods for offsetting MS Office security flaws. The same method are applied to deconstruct the MS Office document to locate, map and tag data elements and metadata therein.

Template - Editing - Publishing Table

1. Start with a clean template
2. Write-protect templates
    Attached template(s) or styles for other MS Office documents
        Normal .DOT
        Clean up .DOT Template - Editing - Publishing Table 3. Edit cleanly
    Disable Versioning
    Disable Change Tracking
    Periodically "Accept Changes" to purge change
    log and save or save as
    Disable Fast Save
    Install Patches for "Unwanted Data"
    Do use comments, not hidden text
    Do not use footnotes, end notes, table of contents, index, links,
4. Remove References - Convert into Safe Text and Function mode
    URL (covert to non-function form, such as "www and pto.gov")
    Hyperlinks
    Pointers
    References
    hidden text, headers, footers, footnotes, endnotes, tables
    of contents, index, links, can establish a context or cerate a
    semiotic inference to other documents or sources (copy
    content and paste into safe DOM, for example, all footnotes
    and endnotes are shown as [data here] where the footnote
    appears int eh text)
5. Paste... do not embed
6. Publish... do not send a file
    Print
    Fax as image (not as binary document in WinFax or eFax, etc)

Figure 12:
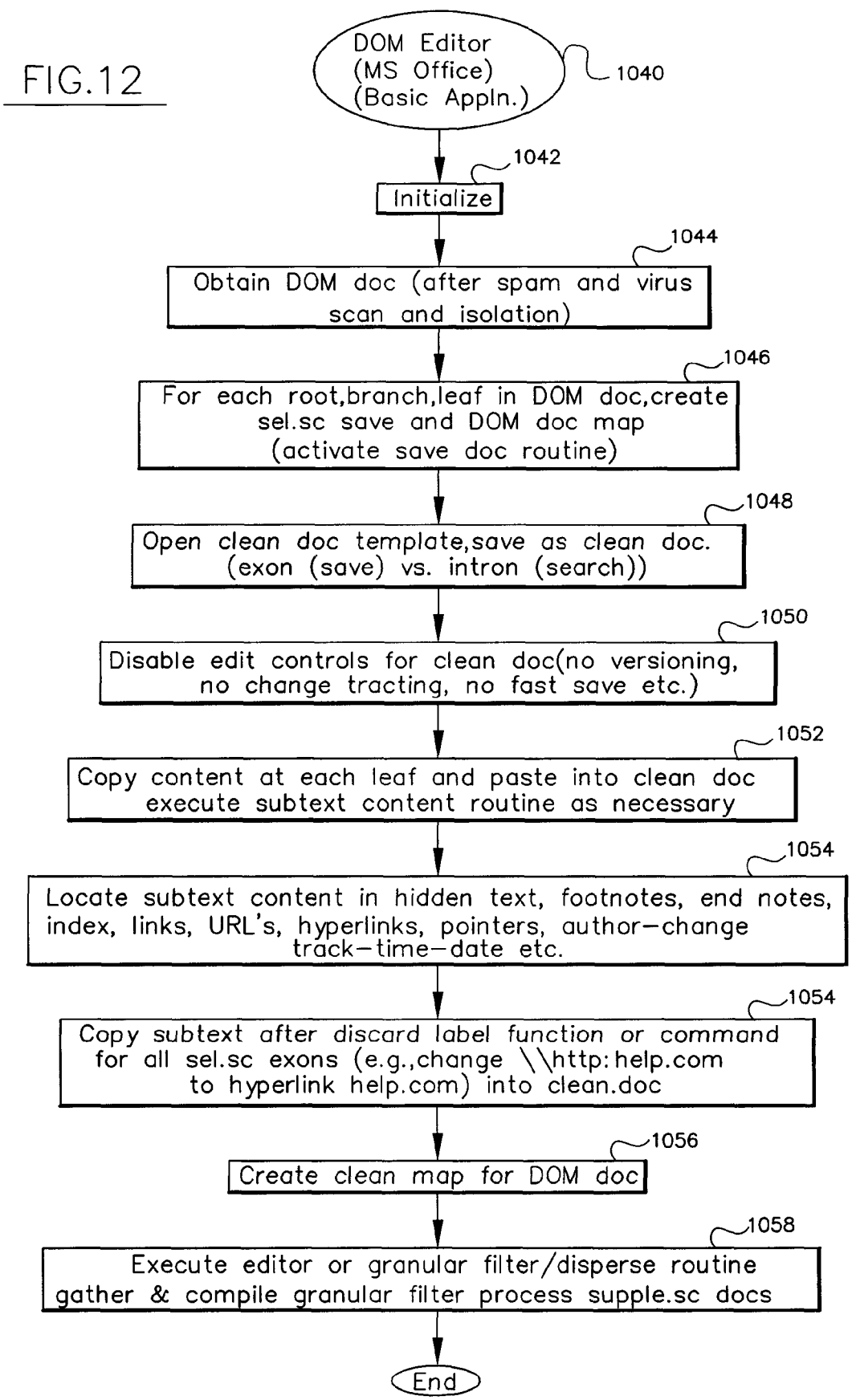
FIG. 12 diagrammatically illustrates another DOM editor process.

FIG. 12 shows a flow chart of a basic application for a DOM Editor—knowledge expander search for MS Office document. Step 1042 initializes the system. Step 1044 obtains the source DOM document and notes that all processing occurs after a spam and virus filter. Step 1046 notes that the program creates or is provided with a security safe or clean DOM document and map. All levels of SC are labeled or tagged and saved in the "save doc" routine. This hierarchical taxonomic (H-tax) tagging labels all SC words, terms, etc. and locates and maps exons and introns in the source doc. Step 1048 notes that a template is opened and SC exons and SC introns (non-standard SC and unknown terms, characters, words, etc.) are copied from the source doc into the clean DOC. A clean .DOC template (Word) or whatever the new document type is opened for the specific application. The Normal.DOC or New Spreadsheet.XLS on the MS Office distribution CD is safe. In Visio, for example, start with a new chart. Older documents saved as templates tend to accumulate unanticipated metadata. If one must use a non-standard template, clean it up. View it as both a printed document, as a binary file, and as a document object. Write protect the templates, or store the templates as non-modifiable networked volume. If the templates are used throughout the organization, create a network store for them and configure each user's installation of MS Office to look there for the templates. Search the network for duplicate copies of these templates and eliminate them.

If changes from any version of MS Office to another version are made—this can be a regularly upgrade or a even a downgrade—create new documents and cut-and-paste parts of prior documents into new ones. Lose the older files and templates. If you receive or open an Office document in either an older or newer version, create new documents and cut-and-paste parts of prior documents into new ones consistent with the MS Office version that you use.

Step 1050 disables edit controls and step 1052 copies SC exon and SC intron content. The point is one must edit cleanly. This is not a single step but rather a process, both one time and ongoing. Disable versioning in step 1050 to prevent a buildup of past versions of the document. With versioning, prior sessions will be stored as document.doc 1, document. doc 2, and so on. These tend to get entwined with the latest version. If workflow with InfoPath, Outlook, or other collaborative workflow tools creates duplicate copies of the source document file for each user. Step 1050 includes the concept that the system is configured to store a single network copy instead. Preserve an audit trail and backup with a system backup rather than versioning. Disable change tracking in step 1050 to curtail the buildup of additions, deletions, and changes that transcend the publishing intent of the document. If redlining is necessary, establish guidelines for periodically accepting changes to purge change log. Use the command to save the document without the change log with File/Save or File/Save As. Do not use nor rely on fast saves, timed saves, or file recovery after a MS Office crash to purge the dirty metadata. After a crash, reopen the document, save the document under a new name. Close the Office application. Delete the old file precipitating the crash. Rename the new file under the old name. Reopen the Office application.

Step 1054 locates text in footnotes, hidden text, etc and labels or tags that content as SC exons or SC introns and maps those data elements to the SC save doc and copies the elements into the Clean DOC. Use comments instead of hidden text. It is documented as a feature so it can be found rather than accidentally uncovered. Hidden text with a font color change or font size change looks like an artifact that most users will ignore or delete. Avoid the use of headers, footers, footnotes, endnotes, inserts for table of contents, index and the like. These appear only in the printed output unless specifically viewed from the View pulldown menu. Such links also create a lot of dirty metadata beyond what is visible even during editing that persists until changes are accepted. Remove references from the source document. This is subtle, but very important when documents are specifically posted or even inadvertently listed on web sites. References include other files, documents, hyperlinks, and other possible embedded formatted materials. These references create the ability to infer quite a lot about the purpose of the document from other related documents in the same directory, by the same authors, and the types of other documents. For example, a spreadsheet stored with a report that is not overtly included in the report suggests that is source material that has not been reviewed with an eye towards privacy, security, or client privilege.

Paste and copy images, cut text, formatted text, pie charts, record sets, slides, waterfalls, milestones, organizational charts as plain text or an image rather than formatted Office objects. If the embed commend is used, all the metadata baggage from the other Office application is now added to the metadata in the target document. Since that metadata baggage is not native to the target document application, it is inaccessible and truly hidden. Tools, such as Metadata Assistant will not find Excel metadata within a Word Document, Word metadata within an Excel spreadsheet, and none of them within an Outlook note or message.

Step 1056 notes that a clean map for the meta data cleared DOM document must be created.

Step 1058 executes the intron search and/or granular search routine, gathers and compiles supple. docs and the processes those supple docs through the granular filters discussed earlier to locate, with the hierarchical taxonomic filter process tags new words, terms, symbols, which are related to the original SC or select content, thereby expanding the knowledge base of the meaning of the SC source document.

Hierarchical Taxonomic Class Examples

Various type of classification systems (taxonomic systems) may be employed. For example, a dictionary classifies all words as nouns, verbs, adverbs, etc. This is one taxonomic system. A prioritized H-tax system classifies nouns into a name subclass and this name subclass may be priority or sensitivity level 1. Geographic locations (class nouns) may be priority 2. The operator of the present knowledge expander search process may place a high priority or sensitivity on "noun" class, thereby converting the simple taxonomic structure into a hierarchical taxonomic system. Identifying categories and subcategories for SC sensitive words, etc. or critical data, creating a compilation of pre-existing data, comparing the compiled pre-existing data to the target data and labeling or tagging the SC terms is one of many important aspects of the present invention. Table 1 which follows provides categorical identifiers for personal identity. These categories, which may be utilized to identify a person, are not meant to be all encompassing but are mainly provided as examples.

TABLE 1

Categorical Identifiers For Personal Identity

| | |
|---|---|
| name | association(s) |
| address(es) and variants | frequent flyer/buyer club info |
| telephone number(s) and variants | remittance advice |
| username | investigation evidence |
| biometrics | court evidence |
| gene typing | EDI/EDIFACT records |
| photograph | applications |
| date of birth | personal web sites |
| age | Chain of trust forms |
| marital status | Chain of custody forms |
| gender | skill set |
| sexual orientation | religion |
| sexual proclivities | personal interests |
| disabilities | travel log |
| tattoos | number of siblings |
| scars | business partners |
| visible or functional injuries | business name |
| age/age range | profession |
| hair color | account numbers (banking, services, suppliers) |
| eye color | service providers (physicians, insurers, hospitals, clinics, etc.) |
| race profile | |
| educational history | X-rays |
| employment history | surveillance |
| home price | dental charts |
| ethnicity | medical records |
| personal interests | account balances |

TABLE 1-continued

Categorical Identifiers For Personal Identity

| | |
|---|---|
| personal descriptive information (e.g., SWHM 38, Professional) | account transfer or transaction amounts |
| physical stigmata | income range |
| skill set | neighborhood/city/region/country |
| credit history | license (driver, occupational, professional) |
| credit reports (formal NCR, etc.) | vehicle registration (license, tag, plate, etc.) |
| social security number | vehicle identification |
| patient ID or other location- or process-specific user assignment | vehicle make, type, model, color, year |
| insurance number | date of life events |
| credit card numbers | incident reports (legal, criminal, health services, news) |
| birthplace | accident reports (auto, OSHA, EPA, EEOC, etc.) |
| heritage | criminal convictions |
| health history | court records |
| political party | abuse records |
| political beliefs | divorce proceedings |
| bankruptcy records | news reports |
| organization registrations | family history |
| Corporation officers and registrations | family relationships |
| tax records (chattel, land, local, state, Federal, and special use taxes) | family health history |
| property ownership | legal documents |
| permit applications | consent forms |
| donor lists | newsgroup postings |

After categories are identified for the critical data, it is important to create the hierarchical taxonomic system against which the target data is tested. Ranking or qualifying the categories at SC sensitivity levels is next. Table 2 which follows is a general attempt to quantify the categories for personal identification from a high risk value beginning with "name" to a low risk value ending with "personal interests". Again, the Ranked Identity Category Table 2 is not meant to be limiting but is meant to be an example. Individuals skilled in identifying a person may alter the ranking of the identity categories in Table 2.

TABLE 2

Ranked Identity Category

| | |
|---|---|
| name | disabilities |
| address | tattoos |
| telephone | scars |
| username | injuries |
| biometrics | age range |
| gene typing | hair color |
| photograph | eye color |
| date of birth | race profile |
| age | education |
| marital status | employment |
| sex | personal interests |
| sexual orientation | |
| sexual proclivities | |

The present invention can be employed to use a hierarchical taxonomic system for a business. Table 3 set forth below provides examples of categorical identifiers for a manufacturing business. Again, this list is not meant to be exhaustive or complete, but is only provided as an example of the types of categories and subcategories which a manufacturing business would employ in order to establish the risk monitor of the present invention.

TABLE 3

Categorical Identifiers for Manufacturing Business

Manufacturing
    product brand names
    product generic name
    drawings
    tools (brand names and generic names)
        hand tools
        software
        machines
    software, computer programs, etc.
    Research and Development
        competitors products, competitor names, patent numbers, patent titles, project names, project personnel
Sales
    personnel
    competitors
    sales data
        quantity
        geographic distribution
    customers
        names, addresses, contacts
    sales projections
Financial
    chart of accounts
    ledgers
    financial statements
    tax returns
Human Resources
    see categorical identifiers for personal identity With this list, the manufacturing business may assign a SC sensitivity level to each category (class, subclass and sub-subclass) thereby creating a prioritized hierarchical taxonomic system.

Knowledge Expander (KE) Basic Program

Figure 13:
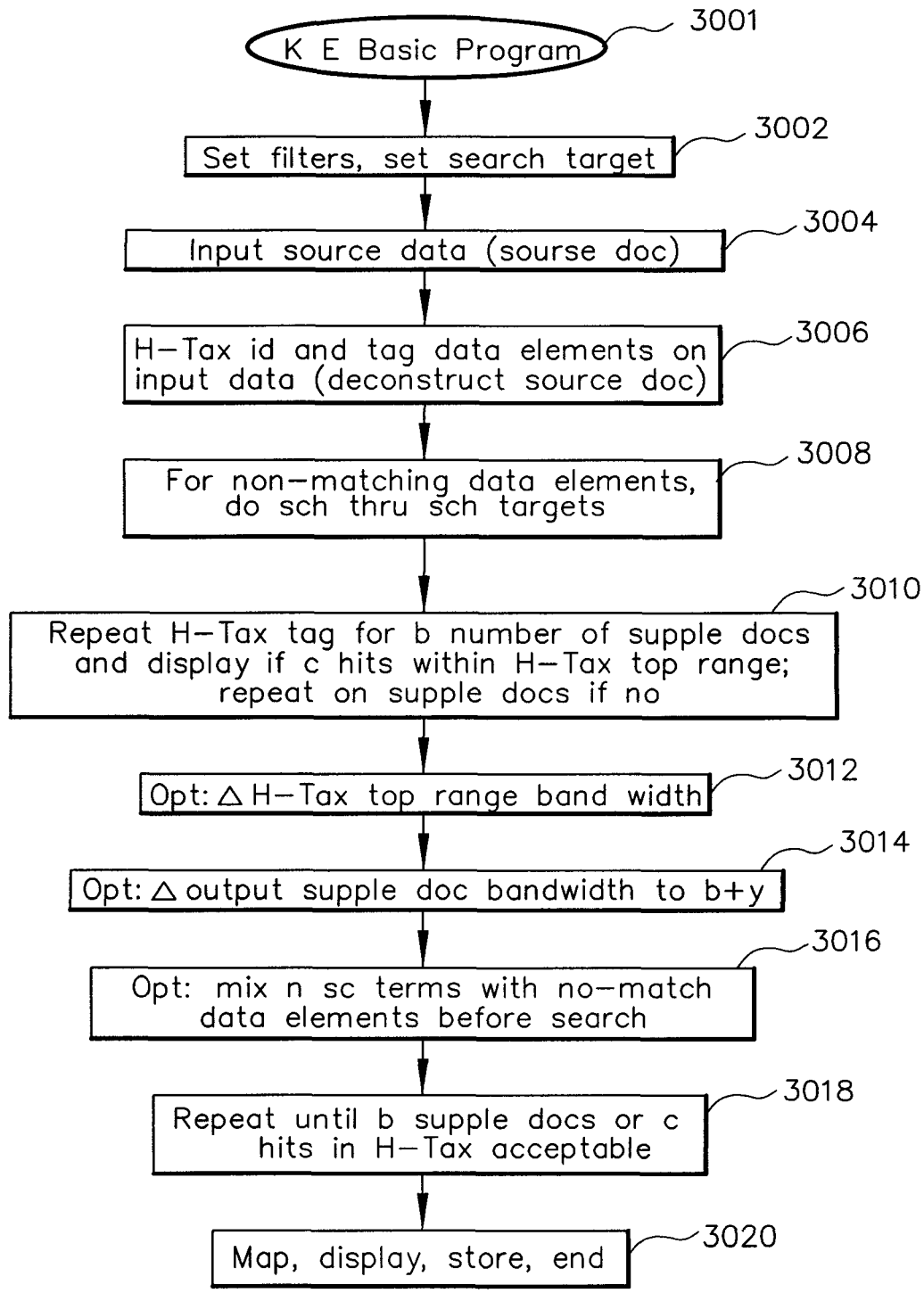
FIG. 13 diagrammatically illustrates a basic KE search process.

As discussed earlier, the information life cycle or knowledge expander search can be configured with many different modules in order to achieve the objective of the operator. The knowledge expander or KE basic program 3001 in FIG. 13 is one basic implementation of the expander search program. FIG. 13, In step 3002, the operator or user sets various filters and sets the search targets. The search targets may be publicly available search engines or private data bases, data collections, indices or any item that the user wants the KE search to access. Filters are described earlier as hierarchical taxonomic filters or taggers, content, contextual and other types of filters. Filters are used to identify class, subclass and priority in the hierarchical taxonomic or H-tax system, to apply contextual rules or algorithms ("bomb" within 10 words of "arab"), and content (select content or SC verses non-matching SC). Step 3004 obtains the source data or the source is input by the operator. Data input may be from a client computer in a server-client computer system. The source data may be a data stream, a source document or other item. Step 3004 contemplates that if a document is utilized, the document is deconstructed to its basic data elements and appropriately mapped. See the discussion above in connection with DOM branch, leaf and tree deconstruction. In step 3006, the hierarchical taxonomic classification (H-tax) occurs and each data element in the input document is tagged based upon the classification system which has been prioritized by the user (or the user uses a pre-set prioritized H-tax). A note to deconstruct the source document into data elements (see DOM deconstruction into its object hierarchical structure above) is found in step 3006. In step 3008, for non-matching data elements, a search is conducted through the search targets. Non-matching data elements form the input doc are those which do not match SC. In step 3010, the system gathers the documents from the search (supplemental documents) and repeats the H-tax tagging operation for b number of supple docs. A relationship mapping function and display function is activated if c number of hits occur within the H-tax top priority range. In other words, if the search for non-matching data elements returns 50 select content or SC terms and of those 50 SC terms in the supple docs, 20 SC terms fall within priority ranges 1-5 of the hierarchical taxonomic classification set by the user (n priority H-tax levels), then the system and process maps the results and displays the representations of the H-tax recovered from the supple docs. C is less than 20. If less than b number of H-tax tags are noted in the supplemental documents, the system repeats steps 3006 and 3008 and gathers a second tier of supplemental documents.

Steps 3012, 3014, 3016 are optional. As an option to be set by the user or as an option to be set by the system operator as a default, step 3012 changes the H-tax top range bandwidth from n priorities to be searched to m priorities. This change may be needed to expand the search bandwidth from b to b−10 to b+20. A reduction (m less than n) is needed if too many supple docs are recovered by the search. If too few are recovered, then m is made greater than n priorities in the H-tax. Option 3014 changes the output supplemental document bandwidth to b+y if too few supple docs are recovered. Of course, the output supplemental bandwidth could be reduced with b−y. Optional step 3016 mixes n number of select content search terms with the no-match data element before the search. This effectively is a convergent filter. By adding the known SC to the search terms (initially, search terms are generated from the input doc based upon priority H-tax), the search is biased or is set to converge on the known SC added to the search term group. By using the no-match (NOT AND) function, the KE search diverges to gather a wider range of docs. Of course, the user may always employ common search engines in addition to the search plans set forth herein. Step 3018 repeats the process until b supplement documents or c hits (SC sensitivity matches) are noted within the H-tax top range. Step 3020 maps, displays, stores and ends the program.

Figure 14:
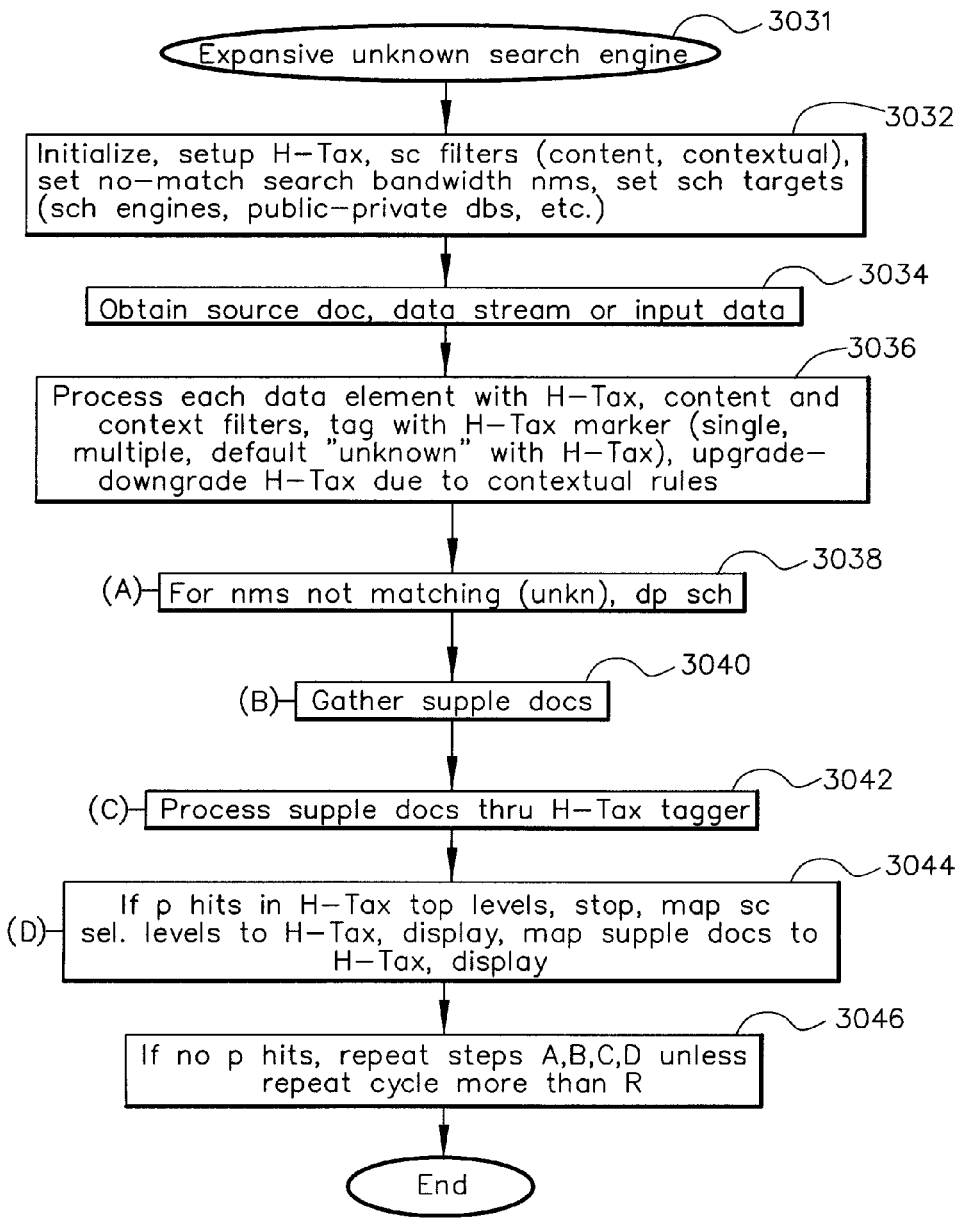
FIG. 14 diagrammatically illustrates an expanded KE search process.

FIG. 14 shows an expansive or expansion unknown search engine 3031. Step 3032 initializes the program with preferably user input, sets up the hierarchical taxonomic H-tax classification system along with a priority or sensitivity level assigned to each level and branch and leaf in the H-tax system. Select content or SC filter for content and contextual range or algorithm tests are also set. At least some select content should fall within the prioritized hierarchical taxonomic system. The select content SC encompasses words, terms and data objects that the user wants to expand his or her knowledge base with the search engine. The user sets a no-match search bandwidth nms and sets search targets such as search engines, public or private databases, data compilations, indices, data collections and data structures or whatever. Step 3034 obtains a source or data stream or input document. Step 3036 processes each data element (which may include a document deconstruction) with the H-tax, content and context filters, and tags each data element with an H-tax marker. Multiple, singular, and a default "unknown" H-tax classification indicators are linked or tagged on every data element. The system in step 3036 may upgrade or downgrade the priority or sensitivity H-tax level for a particular word, term, etc., due to contextual rules in the context filter. In step 3038, the system conducts a search for nms number of not matching or unknown data elements. If nms is 10, the system takes the top 10 priority H-tax supple SC terms obtained from the input doc and uses the top 10 supple SC as search terms in the target data collections. The search is conducted through search targets identified in the set-up step 3032. The no-match search 3038 is sometimes identified as step A herein. Step 3040 gathers supplemental documents. Sometimes, step 3040 is step B herein. In step 3042, the system processes the supplemental documents through the H-tax tagger. The supple docs are classified with the H-tax. This is sometimes step C. In step 3044, the system determines if p hits have been noted in the H-tax top range levels. If YES, the system stops and maps the select content SC sensitivity sel. levels to the H-tax mapping structure and displays that SC hierarchical representation map to the user. Further, the system in step 3044 maps the supplemental documents to the H-tax map structure and displays that to the user. Sometimes, step 3044 is step D herein. In step 3046, if p number of hits are NOT identified in step 3044, steps A,B,C,D are again executed and repeated unless the repeat cycle is more than R. The nms bandwidth may automatically change (increase) or the n priority H-tax may change to m H-tax levels to increase the supple docs or the hit count for supple SC. The same techniques may be used in reverse if too many supple docs are recovered. The system ends after step 3046.

Figure 15:
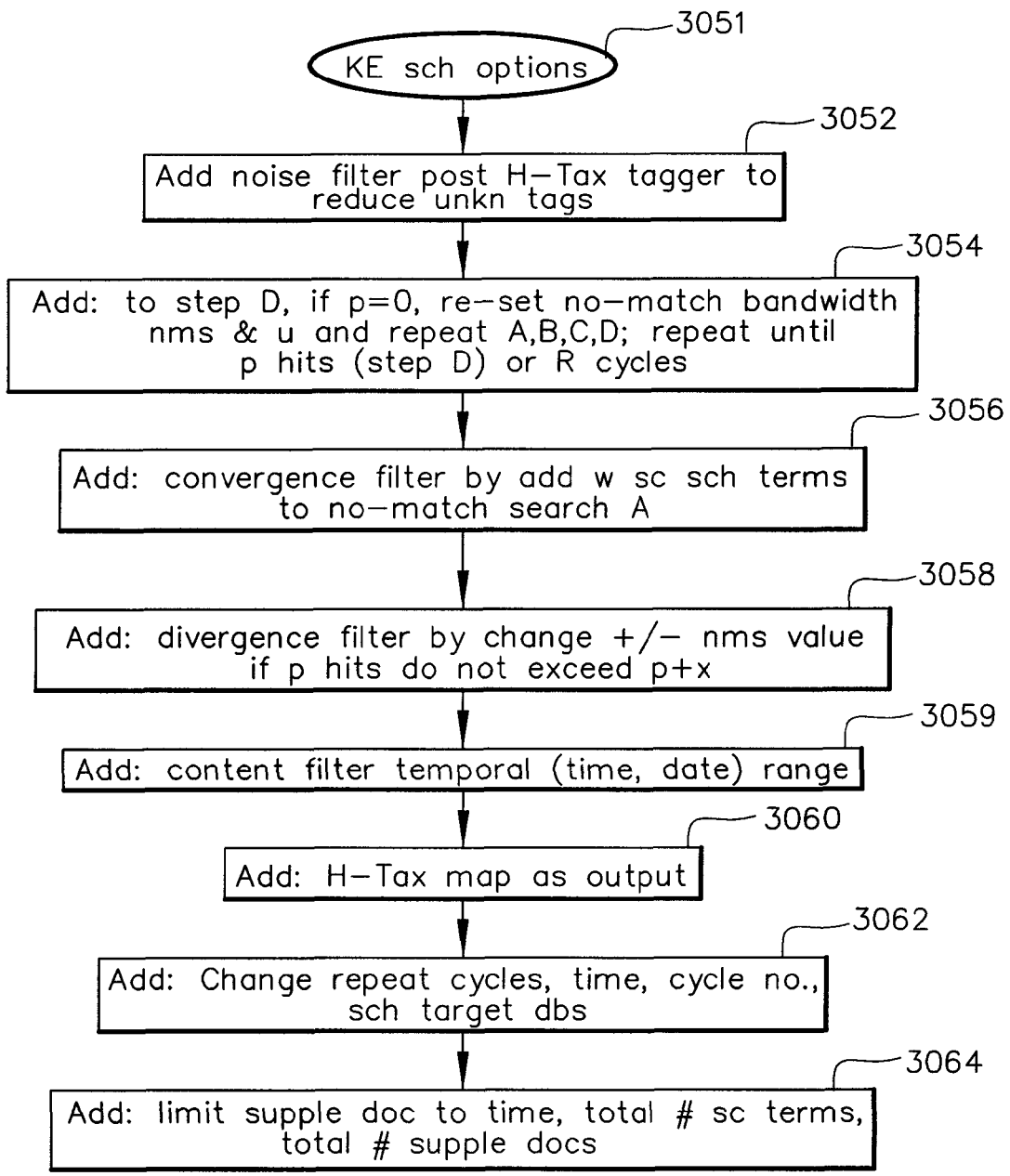
FIG. 15 diagrammatically illustrates KE search process options.

FIG. 15 shows knowledge expander KE search options 3051. Step 3052 is an option to add a noise filter after the H-tax tagger step 3036 in the expansive unknown search engine routine 3031. The noise filter reduces the number of unknown data element and operates on the unknown tags for those unknown data elements. For example, terms "and" and "or" and "the" may be deleted by the noise filter. Optional step 3054 adds to step D, if p hits is equal to zero, then the system resets the no-match bandwidth nms+u and repeats step A,B, C,D and repeats the entire process until p hits in step D or R iterative cycles have been noted (counted). In optional step 3056, a convergence filter is added to the expansive, unknown search engines 3031 by adding w select content SC search terms to the no-match search step A. In optional step 3058, a divergence filter is added by changing, either increasing or decreasing, nms value if p hits do not exceed p+x. In optional step 3059, a content filter is added to detect temporal relationships such as time and date ranges. Time may be time of length of search or time may be a time-date range limit on recovered supple docs. The temporal contextual filter (time and date is a matter of context) would be added to step 3036 the H-tax step. In optional step 3060, the H-tax map is output to the user so the user sees the classification and the prioritization of that classification. In step 3062 the operator can change the repeat cycle R, the time the search runs, the number of cycles, and the search target databases, data sets, spreadsheets or public or private search engines. In optional step 3064, the operator can limit the supplemental documents based upon a temporal factor such as time, the total number of SC terms located in the supplemental documents, and the total number of supplemental documents.

General System Comments

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views. The section titles are not meant to limit the detailed description of the system and process described therein.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| bd | board |
| CD-RW | compact disk drive with read/write feature for CD disk |
| comp | computer |
| CPU | central processing unit |
| DB or db | data base or structured data file |
| doc | document |
| dr | drive, e.g., computer hard drive |
| e | encryption |
| F | floppy computer drive or flash drive memory |
| H-tax | hierarchical taxonomic system, a prioritized classification system |
| I/O | input/output |
| KE | knowledge expander, such as a knowledge expander search |
| loc | location |
| mem | memory |
| opt | optional |
| PC | personal computer or any other type of general computer |
| recon | reconstruct |
| rel | release |
| req | request |
| SC | select content - e.g., words, terms, images, sound that is of particular interest to the user |
| sec | security |
| sec. level | TS top secret, S secret, C classified, UC unclassified |
| sel | SC sensitivity level, sometimes SC sel. level |
| sel cont | select content |
| sel levels | SC levels, hierarchical taxonomic classification levels of SC |
| sch | search |
| supple | supplemental |
| supple doc | supplemental document of data object |
| sys | system |
| t | time |
| tax | taxonomic or classification system |
| tele-com | telecommunications system or network |
| unkn | unknown item or data element or data object |

"Data," as used herein, includes any data object, e.g., text, image, icons, audio, video, still images, etc. and data is sometimes referred to herein as a "data object." A source document is either a document, any data structure, or a data stream. Since a data stream has a start bit or term and an end bit or term, the data stream is structured data, and reference to a "document" refers to any document, data structure, or data stream. Likewise a "supplemental document" is any document, data structure, or data stream. The select content (SC) is any critical or security sensitive word, character, image, or data object as pre-defined or as established by the user. The user may specifically design the filter, begin with a dictionary to define common terms, identify any additional SC words, letters, images, icons, partial versions of the foregoing or any other granular aspect of the source document.

Figure 16:
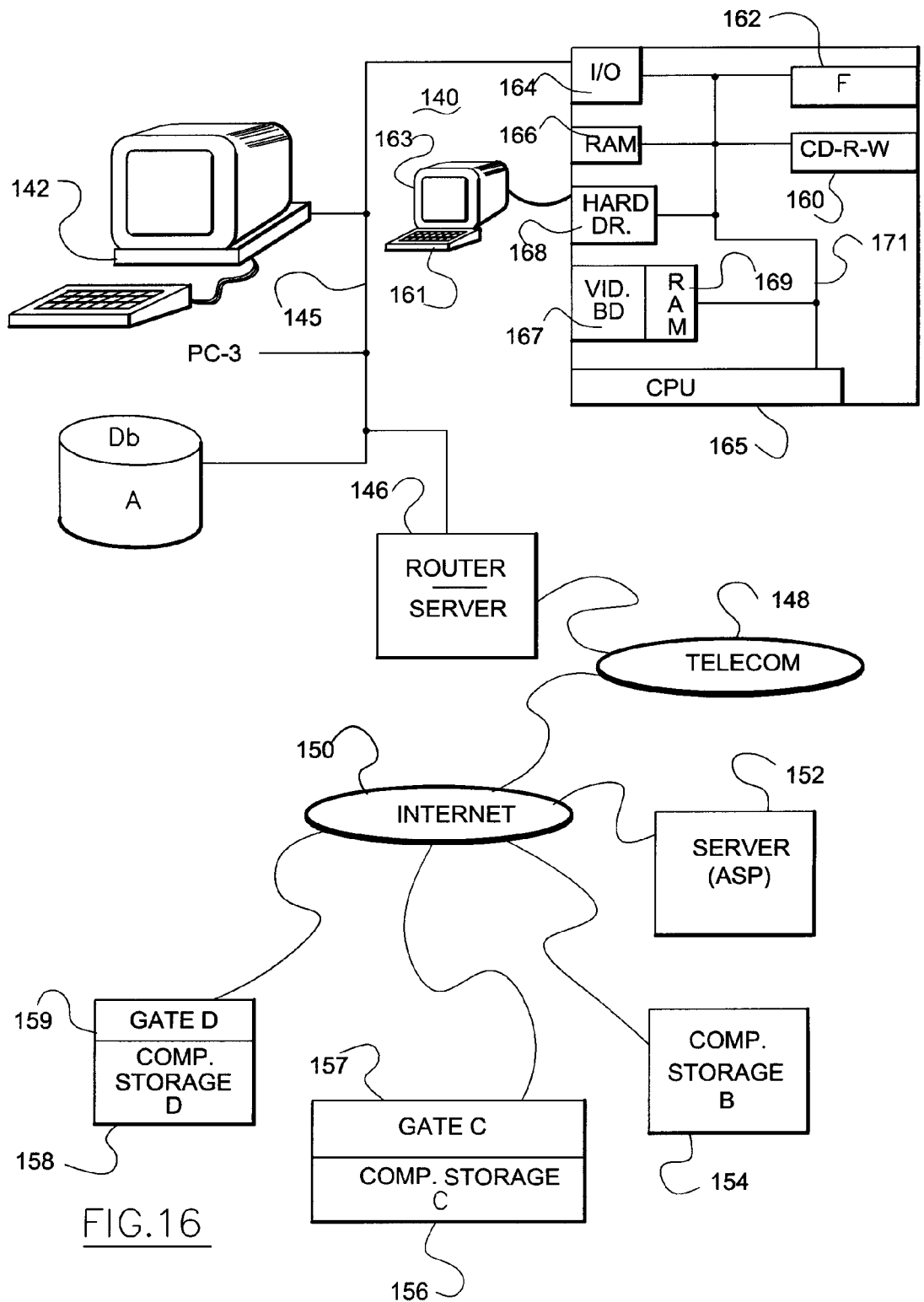
FIG. 16 diagrammatically illustrates a hardware implementation for the KE search system.

FIG. 16 diagrammatically illustrates a personal computer or PC computer system 140, a second PC or computer 142, and a third PC-3. PCs 140, 142 and PC-3 are connected together via a network 145 (LAN or WAN) and connected to one or more private databases or data structures which are represented by Db A. The LAN 145 is also connected to an input/output device 146 that may be generally described as a router or an I/O device to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. The ASP provides various tools to the user on computer 142 such a Google search through other data bases, indices and data structures. Internet 150 also includes various computer memory storage devices such as computer storage B 154, computer storage C 156 accessible through Gate C 157 (via password or other control device) and computer storage D 158 accessible via Gate D 159. Access to computer storage C and D is permitted via, in one instance, security level clearance modules or Gate C and D 157, 159. Maps to the computer stores C and D may require security level clearance.

Typically, PCs include a keyboard or data input device 161, a display 163, a central processing unit CPU 165, a video board 167 having video board memory 169, a fixed disc hard drive 168, a RAM 166, and input/output device 164, a removable memory F media (flash or floppy) drive 162 and a removable compact disk (CD) read-write (CD-RW) device or drive 160. The system may include other removable disk drives, tape drives, or flash memory units. Internal units CPU 165, video board 167, hard drive 168, RAM 166 input/output device 164, floppy drive 162 and CD-ROM device 160 are all coupled together via an internal bus 171. Bus 171 represents a plurality of buses as is known to persons of ordinary skill in the art.

One methodology of implementing the present invention utilizes filters on the PC or on removable memory F. The present invention may also be embodied utilizing an Application Service Provider (ASP) on server 152 and in a client-server network. The user or operator on the PC 142 calls up an ASP on system 152 and operates the KE process on the computer system 152. Filters and rules may be located with a uniform research locator or URL to find filters, data collections, target files from computer store B, C and D. In a client-server environment, server 152 acts as a server generally cooperating with data operations with client computer 140. Of course, persons of ordinary skill in the art recognize that the server may be located on the local area network 145 rather than being interconnected with Internet 150 as shown in FIG. 16. The claims appended hereto are meant to cover the alternative embodiments.

As an example of a client-server or web-based implementation of the present invention, the user at computer 140 may define the SC 2018 as described above, and input data via keyboard 161 or load source data from F drive 162 or CD-ROM drive 160 into RAM 166. Alternatively, the data stream on LAN 145 may be monitored by PC 140. In any event, whether the source data is input via keyboard 161 or copied or accessed in or from F drive 162 or CD-RW drive 160, the source data is filtered as discussed above in connection with FIGS. 1-2. Prior to filtering, it is appropriate for the user at computer 140 to identify the hierarchical taxonomic system and the location of SC filters and My Group Profiles. Off site data storage and processes are available permitting activation of server 152 and enabling the server to take over the process directly from user 140. In other words, the user at computer 140 could call up the URL of the server 152, the server could request certain user information (user name, password), and would request data from the client computer to establish the SC filter and H-tax classes pursuant to input selected by the user. The client compute may (a) filter the source doc thereat or (b) send the data to the server for filtering. The server could store data either locally on computer 140 or remotely at computer memories 154, 156. Either the PC or the server could conduct the knowledge expander search and return the compiled data, supple does, and map results to the PC.

The claims appended hereto are meant to cover modifications and changes within the scope and spirit of the present invention.

What is claimed is:

1. A method of computerized searching through electronic data collections, represented by databases or data structures in a distributed computer system, to expand a user's knowledge about select content represented by one or more predetermined words, characters, images or data objects, with a prioritized hierarchical taxonomic system encompassing some select content, comprising:

engaging user-selected filters including one or more contextual filters, one or more semiotic filters, and at least one hierarchical taxonomic filter in said taxonomic system;

engaging a user-selected first plurality of priorities from said at least one prioritized hierarchical taxonomic filter;

gathering input data represented by a source document or a data stream, said input data having data elements therein;

identifying all data elements in said input data with said hierarchical taxonomic system and further identifying data elements representing supplemental select content corresponding to said first plurality of priorities therefrom;

identifying all data elements in said input data matching said contextual filters and said semiotic filters as further supplemental select content;

engaging a user-selected divergence search function;

said divergence search function including identifying unknown words, characters, images or data objects in said source document or data stream with the use of one or more of said contextual filters and said semiotic filters, tagging said unknown words, characters, images or data objects for one of contextual relevancy and hierarchical priority, said unknown words, characters, images or data objects used as negative content filters used to discover said unknown words, characters, images or data objects; and searching said data collections with both said supplemental select content data elements and said further supplemental select content and said negative content filters, and gathering supplemental documents based on said divergence function.

2. A method of searching as claimed in claim 1 including:

identifying non-matching data elements from said input data which do not match said select content;

searching said data collections with said non-matching data elements and gathering additional supplemental documents based thereon.

3. A method of searching as claimed in claim 2 including:

identifying said select content from said contextual filter and said semiotic filter with said hierarchical taxonomic filter;

identifying data elements in said input data which match said filters;

identifying matching select content within said first plurality of priorities in said hierarchical taxonomic system and searching said data collections with said non-matching data elements and said matching data elements and said supplemental select content data elements;

gathering further supplemental documents based thereon.

4. A method of searching as claimed in claim 3 including:
identifying data elements in said supplemental documents and said additional supplemental documents and said further supplemental documents within said hierarchical taxonomic system; and
compiling at least one representation from the group of representations including the data elements from all supplemental documents grouped based upon said first plurality of priorities hierarchical taxonomic system, all supplemental documents grouped based upon said hierarchical taxonomic system, and supplemental select content grouped based upon said hierarchical taxonomic system.

5. A method of searching as claimed in claim 4 wherein identifying data elements in said input data with tags based upon priorities and classes in said hierarchical taxonomic system.

6. A method of searching as claimed in claim 3 including ending said searching of said data collections upon an end search event from the group of end search events which include:
a predetermined time, a predetermined number of supplemental documents, a predetermined number of further supplemental documents, a predetermined number of additional supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of data elements from said additional supplemental documents which fulfill a predetermined number of priorities in said hierarchical taxonomic system, a predetermined number of matches of select content in said supplemental documents, a predetermined number of matches of select content in said additional supplemental documents and a predetermined number of matches of select content in said further supplemental documents.

7. A method of searching as claimed in claim 6 including resetting said first plurality of priorities in said hierarchical taxonomic system to a second plurality of priorities in said hierarchical taxonomic system and repeating the step of gathering supplemental documents if one expanding search parameter is not met from the group of expanding search parameters including said supplemental documents do not exceed a predetermined number, a predetermined number of data elements from said further supplemental documents which do not fulfill a predetermined number of priorities in said hierarchical taxonomic system, said supplemental documents do not include a data elements matching a predetermined number of select content therein, and data elements in said supplemental documents do not met predetermined contextual rules or algorithms related to said select content.

8. A method of searching as claimed in claim 3 including:
identifying data elements in said input data which match said select content in said contextual filter and further identifying the matching select content data elements with said hierarchical taxonomic system;
identifying matching data elements which fulfill predetermined contextual rules or algorithms in said input data and incrementing, decrementing or otherwise tagging contextually matching data elements;
wherein contextually matching data elements occurs prior to said identifying data elements with the first plurality of priorities in said hierarchical taxonomic system and said searching said data collections with said non-matching data elements and said matching data elements.

9. A method of searching as claimed in claim 3 including increasing the bandwidth of said searching said data collections by adding a select plurality of select content to said search in addition to said non-matching data elements.

10. A method of searching as claimed in claim 3 including filtering out noise data elements from said non-matching data elements prior to searching said data collections.

11. A method of searching as claimed in claim 3 including providing a client computer and a server computer, communicatively coupled together, in a web-based server-client computer system and the method includes gathering input data using said client computer in said web-based server-client computer system; forwarding input data to said server computer; compiling all supplemental documents on said server computer and permitting access thereto via said client computer; and, employing said server computer to:
identify input data elements with said hierarchical taxonomic system, identify non-matching data elements, identify matching data elements, search said data collections, and gather supplemental documents.

12. A method of computerized searching through electronic data collections, represented by databases or data structures in a distributed computer system, to expand a user's knowledge about select content represented by one or more predetermined words, characters, images or data objects, with a prioritized hierarchical taxonomic system encompassing some select content, comprising:
gathering input data represented by a source document or a data stream, said input data having data elements therein;
identifying data elements in said input data with said hierarchical taxonomic system and identifying non-matching data elements which do not match said select content;
engaging a user-selected divergence search function; and
searching said data collections with said non-matching data elements, and gathering supplemental documents based on said divergence function; and
said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
supplementally searching said data collections with said negative content filters, and gathering additional supplemental documents based on said divergence function.

13. A method of searching as claimed in claim 12 including:
identifying data elements in said supplemental documents with said hierarchical taxonomic system; and
compiling either the data elements from said supplemental documents or the supplemental documents into a representation of said hierarchical taxonomic system in some predetermined order.

14. A method of searching as claimed in claim 12 wherein identifying data elements in said input data tags said input data elements with priorities and classes based upon said hierarchical taxonomic system.

15. A method of searching as claimed in claim 12 including:
- identifying said select content with said hierarchical taxonomic system;
- identifying data elements in said input data which match said select content;
- identifying data elements with a first plurality of priorities in said hierarchical taxonomic system and searching said data collections with said non-matching data elements and said matching data elements for said first plurality of priorities;
- gathering further supplemental documents based thereon.

16. A method of searching as claimed in claim 12 including
- identifying data elements in said supplemental documents with said hierarchical taxonomic system; and
- ending said searching of said data collections upon an end search event from the group of end search events which include a predetermined time, a predetermined number of supplemental documents, a predetermined number of data elements from said supplemental documents which fulfill a predetermined number of priorities in said hierarchical taxonomic system, and a predetermined number of matches of select content in said supplemental documents.

17. A method of searching as claimed in claim 15 including
- identifying data elements in all said supplemental documents with said hierarchical taxonomic system; and
- ending said searching of said data collections upon an end search event from the group of end search events which include a predetermined time, a predetermined number of supplemental documents, a predetermined number of further supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of matches of select content in said supplemental documents and a predetermined number of matches of select content in said further supplemental documents.

18. A method of searching as claimed in claim 17 including resetting said first plurality of priorities in said hierarchical taxonomic system to a second plurality of priorities in said hierarchical taxonomic system and repeating the step of gathering further supplemental documents if one expanding search parameter is not met from the group of expanding search parameters including said further supplemental documents do not exceed a predetermined number, said further supplemental documents do not include a data elements matching a predetermined number of select content, a predetermined number of data elements from said further supplemental documents which do not fulfill a predetermined number of priorities in said hierarchical taxonomic system, and data elements in said further supplemental documents do not met predetermined contextual rules or algorithms related to said select content.

19. A method of searching as claimed in claim 18 wherein said second plurality of priorities is greater than said first plurality of priorities.

20. A method of searching as claimed in claim 15 including:
- identifying data elements in said input data which match said select content and further identifying the matching select content data elements with said hierarchical taxonomic system;
- identifying matching data elements which fulfill predetermined contextual rules or algorithms in said input data and incrementing, decrementing or otherwise tagging contextually matching data elements;
- wherein contextually matching data elements occurs prior to said identifying data elements with the first plurality of priorities in said hierarchical taxonomic system and said searching said data collections with said non-matching data elements and said matching data elements.

21. A method of searching as claimed in claim 12 including:
- identifying data elements in said supplemental documents with said hierarchical taxonomic system;
- compiling either the data elements from said supplemental documents or the supplemental documents into a map, display or tree representation of said hierarchical taxonomic system.

22. A method of searching as claimed in claim 21 including compiling said map or tree and changing said prioritized hierarchical taxonomic when said map or tree representations of supplemental document data elements or supplemental documents exceeds a certain map or tree parameter.

23. A method of searching as claimed in claim 22 wherein said map or tree parameter is a number of branches.

24. A method of searching as claimed in claim 12 including increasing the bandwidth of said searching said data collections by adding a select plurality of select content to said search in addition to said non-matching data elements.

25. A method of searching as claimed in claim 12 including filtering out noise data elements from said non-matching data elements prior to searching said data collections.

26. A method of searching as claimed in claim 12 including providing a client computer and a server computer, communicatively coupled together, in a web-based server-client computer system and the method includes gathering input data using said client computer in said web-based server-client computer system.

27. A method of searching as claimed in claim 26 includes compiling said data elements from said supplemental documents and said supplemental documents on said server computer in said web-based server-client computer system and permitting access thereto via said client computer.

28. A method of searching as claimed in claim 26 including forwarding input data to said server computer and, employing said server computer to:
- identify input data elements with said hierarchical taxonomic system, identify non-matching data elements, search said data collections, and gather supplemental documents.

29. A method of searching as claimed in claim 15 including:
- identifying data elements in all said supplemental documents with said hierarchical taxonomic system;
- compiling either the data elements from said supplemental documents or the supplemental documents into a map, display or tree representation of said hierarchical taxonomic system.

30. A method of searching as claimed in claim 29 wherein identifying data elements in said input data tags said input data elements with priorities and classes based upon said hierarchical taxonomic system.

31. A method of searching as claimed in claim 30 including ending said searching of said data collections upon an end search event from the group of end search events which include a predetermined time, a predetermined number of supplemental documents, a predetermined number of further supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of matches of select content in said supplemental documents and a predetermined number of matches of select content in said further supplemental documents.

32. A method of searching as claimed in claim 31 including resetting said first plurality of priorities in said hierarchical taxonomic system to a second plurality of priorities in said hierarchical taxonomic system and repeating the step of gathering further supplemental documents if one expanding search parameter is not met from the group of expanding search parameters including said further supplemental documents do not exceed a predetermined number, said further supplemental documents do not include a data elements matching a predetermined number of select content, a predetermined number of data elements from said further supplemental documents which do not fulfill a predetermined number of priorities in said hierarchical taxonomic system, and data elements in said further supplemental documents do not met predetermined contextual rules or algorithms related to said select content.

33. A method of searching as claimed in claim 32 including:
identifying data elements in said input data which match said select content and further identifying the matching select content data elements with said hierarchical taxonomic system;
identifying matching data elements which fulfill predetermined contextual rules or algorithms in said input data and incrementing, decrementing or otherwise tagging contextually matching data elements;
wherein contextually matching data elements occurs prior to said identifying data elements with said first plurality of priorities in said hierarchical taxonomic system and said searching said data collections with said non-matching data elements and said matching data elements.

34. A method of searching as claimed in claim 33 including increasing the bandwidth of said searching said data collections by adding a select plurality of select content to said search in addition to said non-matching data elements.

35. A method of searching as claimed in claim 34 including filtering out noise data elements from said non-matching data elements prior to searching said data collections.

36. A method of searching as claimed in claim 35 including providing a client computer and a server computer, communicatively coupled together, in a web-based server-client computer system and the method includes gathering input data using said client computer in said web-based server-client computer system; forwarding input data to said server computer; compiling said data elements from said supplemental documents and said supplemental documents on said server computer and permitting access thereto via said client computer; and, employing said server computer to:
identify input data elements with said hierarchical taxonomic system, identify non-matching data elements, search said data collections, gather supplemental documents, identify supplemental document data elements with said hierarchical taxonomic system, and compile supplemental document data elements and supplemental documents into said hierarchical taxonomic system.

37. A method of computerized searching through electronic data collections, represented by databases or data structures in a distributed computer system, to expand a user's knowledge about select content represented by one or more predetermined words, characters, images or data objects therein, comprising:
employing a prioritized hierarchical taxonomic system which encompasses some select content;
gathering input data represented by a source document or a data stream, said input data having data elements therein;
tagging each data element in said input data based upon said hierarchical taxonomic system;
engaging a user-selected divergence search function;
searching through said data collections and gathering supplemental documents having non-matching data elements from said data input which do not match said select content based upon said divergence function;
tagging each data element in said supplemental documents based upon said hierarchical taxonomic system; and
compiling either the data elements from said supplemental documents or the supplemental documents into a representation of said hierarchical taxonomic system; and
said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
supplementally searching said data collections with said negative content filters, and gathering additional supplemental documents based on said divergence function.

38. A method of searching as claimed in claim 37 including:
identifying and tagging said select content based upon said hierarchical taxonomic system;
identifying and tagging data elements in said input data which match said select content;
identifying and tagging data elements with a first plurality of priorities in said hierarchical taxonomic system and searching said data collections with said non-matching data elements and said matching data elements for said first plurality of priorities;
gathering further supplemental documents based thereon;
identifying and tagging data elements in said further supplemental documents with said hierarchical taxonomic system; and
compiling either the data elements from said further supplemental documents or the further supplemental documents into said representation of said hierarchical taxonomic system.

39. A method of searching as claimed in claim 38 said compiling is listing of supplemental document data elements or the supplemental documents themselves, from a higher to a lower priority based upon said hierarchical taxonomic system.

40. A method of searching as claimed in claim 38 wherein identifying and tagging data elements in said input data tags elements with priorities and classes based upon said hierarchical taxonomic system.

41. A method of searching as claimed in claim 38 including ending said searching of said data collections upon an end search event from the group of end search events which include a predetermined time, a predetermined number of supplemental documents, a predetermined number of further supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of matches of select content in said supplemental documents and a predetermined number of matches of select content in said further supplemental documents.

42. A method of searching as claimed in claim 41 including resetting said first plurality of priorities in said hierarchical taxonomic system to a second plurality of priorities in said hierarchical taxonomic system and repeating the step of gathering further supplemental documents if one expanding search parameter is not met from the group of expanding search parameters including said further supplemental documents do not exceed a predetermined number, said further supplemental documents do not include a data elements matching a predetermined number of select content, a predetermined number of data elements from said further supplemental documents which do not fulfill a predetermined number of priorities in said hierarchical taxonomic system, and data elements in said further supplemental documents do not met predetermined contextual rules or algorithms related to said select content.

43. A method of searching as claimed in claim 42 including:
    identifying and tagging data elements in said input data which match said select content and further identifying and tagging the matching select content data elements with said hierarchical taxonomic system;
    identifying matching data elements which fulfill predetermined contextual rules or algorithms in said input data and incrementing, decrementing or otherwise tagging contextually matching data elements;
    wherein contextually matching data elements occurs prior to said identifying data elements with said first plurality of priorities in said hierarchical taxonomic system and said searching said data collections with said non-matching data elements and said matching data elements.

44. A method of searching as claimed in claim 38 including increasing the bandwidth of said searching said data collections by adding a select plurality of select content to said search in addition to said non-matching data elements.

45. A method of searching as claimed in claim 38 including filtering out noise data elements from said non-matching data elements prior to searching said data collections.

46. A method of searching as claimed in claim 38 including providing a client computer and a server computer, communicatively coupled together, in a web-based server-client computer system and the method includes gathering input data using said client computer in said web-based server-client computer system; forwarding input data to said server computer; compiling said data elements from said supplemental documents and said supplemental documents on said server computer and permitting access thereto via said client computer; and, employing said server computer to:
    identify input data elements with said hierarchical taxonomic system, identify non-matching data elements, search said data collections, gather supplemental documents, identify supplemental document data elements with said hierarchical taxonomic system, and compile supplemental document data elements and supplemental documents into said hierarchical taxonomic system.

47. A non-transitory computer readable medium containing programming instructions for computerized searching through electronic datacollections, represented by databases or data structures, to expand a user's knowledge about select content represented by one or more predetermined words, characters, images or data objects, with a prioritized hierarchical taxonomic system encompassing some select content, comprising:
    gathering input data represented by a source document or a data stream, said input data having data elements therein;
    identifying data elements in said input data with said hierarchical taxonomic system and identifying non-matching data elements which do not match said select content;
    engaging a user-selected divergence search function; and
    searching said data collections with said non-matching data elements, and gathering supplemental documents based on said divergence function; and
    said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
    supplementally searching said data collections with said negative content filters, and gathering additional supplemental documents based on said divergence function.

48. A computer readable medium containing programming instructions for searching as claimed in claim 47 including identifying data elements in said supplemental documents with said hierarchical taxonomic system; and
    compiling either the data elements from said supplemental documents or the supplemental documents into a representation of said hierarchical taxonomic system in some predetermined order.

49. A computer readable medium containing programming instructions for searching as claimed in claim 47 wherein identifying data elements in said input data tags said input data elements with priorities and classes based upon said hierarchical taxonomic system.

50. A computer readable medium containing programming instructions for searching as claimed in claim 47 including:
    identifying said select content with said hierarchical taxonomic system;
    identifying data elements in said input data which match said select content;
    identifying data elements with a first plurality priorities in said hierarchical taxonomic system and searching said data collections with said non-matching data elements and said matching data elements for said first plurality of priorities;
    gathering further supplemental documents based thereon.

51. A computer readable medium containing programming instructions for searching as claimed in claim 47 including
    identifying data elements in said supplemental documents with said hierarchical taxonomic system; and
    ending said searching of said data collections upon an end search event from the group of end search events which include a predetermined time, a predetermined number of supplemental documents, a predetermined number of data elements from said supplemental documents which fulfill a predetermined number of priorities in said hierarchical taxonomic system, and a predetermined number of matches of select content in said supplemental documents.

52. A computer readable medium containing programming instructions for searching as claimed in claim 50 including
identifying data elements in all said supplemental documents with said hierarchical taxonomic system; and
ending said searching of said data collections upon an end search event from the group of end search events which include a predetermined time, a predetermined number of supplemental documents, a predetermined number of further supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of matches of select content in said supplemental documents and a predetermined number of matches of select content in said further supplemental documents.

53. A computer readable medium containing programming instructions for searching as claimed in claim 52 including resetting said first plurality of priorities in said hierarchical taxonomic system to a second plurality of priorities in said hierarchical taxonomic system and repeating the programming step of gathering further supplemental documents if one expanding search parameter is not met from the group of expanding search parameters including said further supplemental documents do not exceed a predetermined number, said further supplemental documents do not include a data elements matching a predetermined number of select content, a predetermined number of data elements from said further supplemental documents which do not fulfill a predetermined number of priorities in said hierarchical taxonomic system, and data elements in said further supplemental documents do not met predetermined contextual rules or algorithms related to said select content.

54. A computer readable medium containing programming instructions for searching as claimed in claim 53 wherein said second plurality of priorities is greater than said first plurality of priorities.

55. A computer readable medium containing programming instructions for searching as claimed in claim 50 including:
identifying data elements in said input data which match said select content and further identifying the matching select content data elements with said hierarchical taxonomic system;
identifying matching data elements which fulfill predetermined contextual rules or algorithms in said input data and incrementing, decrementing or otherwise tagging contextually matching data elements;
wherein contextually matching data elements occurs prior to said identifying data elements with the first plurality of priorities in said hierarchical taxonomic system and said searching said data collections with said non-matching data elements and said matching data elements.

56. A computer readable medium containing programming instructions for searching as claimed in claim 47 including:
identifying data elements in said supplemental documents with said hierarchical taxonomic system;
compiling either the data elements from said supplemental documents or the supplemental documents into a map, display or tree representation of said hierarchical taxonomic system.

57. A computer readable medium containing programming instructions for searching as claimed in claim 56 including compiling said map or tree and changing said prioritized hierarchical taxonomic when said map or tree representations of supplemental document data elements or supplemental documents exceeds a certain map or tree parameter.

58. A computer readable medium containing programming instructions for searching as claimed in claim 57 wherein said map or tree parameter is a number of branches.

59. A computer readable medium containing programming instructions for searching as claimed in claim 47 including increasing the bandwidth of said searching said data collections by adding a select plurality of select content to said search in addition to said non-matching data elements.

60. A computer readable medium containing programming instructions for searching as claimed in claim 47 including filtering out noise data elements from said non-matching data elements prior to searching said data collections.

61. A computer readable medium containing programming instructions for searching as claimed in claim 47 including providing a client computer and a server computer, communicatively coupled together, in a web-based server-client computer system and the method includes gathering input data using said client computer in said web-based server-client computer system.

62. A computer readable medium containing programming instructions for searching as claimed in claim 61 includes compiling said data elements from said supplemental documents and said supplemental documents on said server computer in said web-based server-client computer system and permitting access thereto via said client computer.

63. A computer readable medium containing programming instructions for searching as claimed in claim 61 including forwarding input data to said server computer and, employing said server computer to:
identify input data elements with said hierarchical taxonomic system, identify non-matching data elements, search said data collections, and gather supplemental documents.

64. A computer readable medium containing programming instructions for searching as claimed in claim 50 including:
identifying data elements in all said supplemental documents with said hierarchical taxonomic system;
compiling either the data elements from said supplemental documents or the supplemental documents into a map, display or tree representation of said hierarchical taxonomic system.

65. A computer readable medium containing programming instructions for searching as claimed in claim 64 wherein identifying data elements in said input data tags said input data elements with priorities and classes based upon said hierarchical taxonomic system.

66. A computer readable medium containing programming instructions for searching as claimed in claim 65 including ending said searching of said data collections upon an end search event from the group of end search events which include a predetermined time, a predetermined number of supplemental documents, a predetermined number of further supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of matches of select content in said supplemental documents and a predetermined number of matches of select content in said further supplemental documents.

67. A computer readable medium containing programming instructions for searching as claimed in claim 66 including resetting said first plurality of priorities in said hierarchical taxonomic system to a second plurality of priorities in said hierarchical taxonomic system and repeating the programming step of gathering further supplemental documents if one expanding search parameter is not met from the group of expanding search parameters including said further supplemental documents do not exceed a predetermined number, said further supplemental documents do not include a data elements matching a predetermined number of select content, a predetermined number of data elements from said further supplemental documents which do not fulfill a predetermined number of priorities in said hierarchical taxonomic system, and data elements in said further supplemental documents do not met predetermined contextual rules or algorithms related to said select content.

68. A computer readable medium containing programming instructions for searching as claimed in claim 67 including:
identifying data elements in said input data which match said select content and further identifying the matching select content data elements with said hierarchical taxonomic system;
identifying matching data elements which fulfill predetermined contextual rules or algorithms in said input data and incrementing, decrementing or otherwise tagging contextually matching data elements;
wherein contextually matching data elements occurs prior to said identifying data elements with said first plurality of priorities in said hierarchical taxonomic system and said searching said data collections with said non-matching data elements and said matching data elements.

69. A computer readable medium containing programming instructions for searching as claimed in claim 68 including increasing the bandwidth of said searching said data collections by adding a select plurality of select content to said search in addition to said non-matching data elements.

70. A computer readable medium containing programming instructions for searching as claimed in claim 69 including filtering out noise data elements from said non-matching data elements prior to searching said data collections.

71. A computer readable medium containing programming instructions for searching as claimed in claim 70 including providing a client computer and a server computer, communicatively coupled together, in a web-based server-client computer system and the method includes gathering input data using said client computer in said web-based server-client computer system; forwarding input data to said server computer; compiling said data elements from said supplemental documents and said supplemental documents on said server computer and permitting access thereto via said client computer; and, employing said server computer to:
identify input data elements with said hierarchical taxonomic system, identify non-matching data elements, search said data collections, gather supplemental documents, identify supplemental document data elements with said hierarchical taxonomic system, and compile supplemental document data elements and supplemental documents into said hierarchical taxonomic system.

72. A non-transitory computer readable medium containing programming instructions for computerized searching through electronic data collections, represented by databases or data structures, to expand a user's knowledge about select content represented by one or more predetermined words, characters, images or data objects therein, comprising:
employing a prioritized hierarchical taxonomic system which encompasses some select content;
gathering input data represented by a source document or a data stream, said input data having data elements therein;
tagging each data element in said input data based upon said hierarchical taxonomic system;
engaging a user-selected divergence search function;
searching through said data collections and gathering supplemental documents having non-matching data elements from said data input which do not match said select content based upon said divergence function;
tagging each data element in said supplemental documents based upon said hierarchical taxonomic system; and
compiling either the data elements from said supplemental documents or the supplemental documents into a representation of said hierarchical taxonomic system; and
said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
supplementally searching said data collections with said negative content filters, and gathering additional supplemental documents based on said divergence function.

73. A computer readable medium containing programming instructions for searching as claimed in claim 72 including:
identifying and tagging said select content based upon said hierarchical taxonomic system;
identifying and tagging data elements in said input data which match said select content;
identifying and tagging data elements with a first plurality of priorities in said hierarchical taxonomic system and searching said data collections with said non-matching data elements and said matching data elements for said first plurality of priorities;
gathering further supplemental documents based thereon;
identifying and tagging data elements in said further supplemental documents with said hierarchical taxonomic system; and
compiling either the data elements from said further supplemental documents or the further supplemental documents into said representation of said hierarchical taxonomic system.

74. A computer readable medium containing programming instructions for searching as claimed in claim 73 said compiling is listing of supplemental document data elements or the supplemental documents themselves, from a higher to a lower priority based upon said hierarchical taxonomic system.

75. A computer readable medium containing programming instructions for searching as claimed in claim 73 wherein identifying and tagging data elements in said input data tags elements with priorities and classes based upon said hierarchical taxonomic system.

76. A computer readable medium containing programming instructions for searching as claimed in claim 73 including ending said searching of said data collections upon an end search event from the group of end search events which include a predetermined time, a predetermined number of supplemental documents, a predetermined number of further supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of matches of select content in said supplemental documents and a predetermined number of matches of select content in said further supplemental documents.

77. A computer readable medium containing programming instructions for searching as claimed in claim 76 including resetting said first plurality of priorities in said hierarchical taxonomic system to a second plurality of priorities in said hierarchical taxonomic system and repeating the programming step of gathering further supplemental documents if one expanding search parameter is not met from the group of expanding search parameters including said further supplemental documents do not exceed a predetermined number, said further supplemental documents do not include a data elements matching a predetermined number of select content, a predetermined number of data elements from said further supplemental documents which do not fulfill a predetermined number of priorities in said hierarchical taxonomic system, and data elements in said further supplemental documents do not met predetermined contextual rules or algorithms related to said select content.

78. A computer readable medium containing programming instructions for searching as claimed in claim 77 including:
    identifying and tagging data elements in said input data which match said select content and further identifying and tagging the matching select content data elements with said hierarchical taxonomic system;
    identifying matching data elements which fulfill predetermined contextual rules or algorithms in said input data and incrementing, decrementing or otherwise tagging contextually matching data elements;
    wherein contextually matching data elements occurs prior to said identifying data elements with said first plurality of priorities in said hierarchical taxonomic system and said searching said data collections with said non-matching data elements and said matching data elements.

79. A computer readable medium containing programming instructions for searching as claimed in claim 73 including increasing the bandwidth of said searching said data collections by adding a select plurality of select content to said search in addition to said non-matching data elements.

80. A computer readable medium containing programming instructions for searching as claimed in claim 73 including filtering out noise data elements from said non-matching data elements prior to searching said data collections.

81. A computer readable medium containing programming instructions for searching as claimed in claim 73 including providing a client computer and a server computer, communicatively coupled together, in a web-based server-client computer system and the method includes gathering input data using said client computer in said web-based server-client computer system; forwarding input data to said server computer; compiling said data elements from said supplemental documents and said supplemental documents on said server computer and permitting access thereto via said client computer; and, employing said server computer to:
    identify input data elements with said hierarchical taxonomic system, identify non-matching data elements, search said data collections, gather supplemental documents, identify supplemental document data elements with said hierarchical taxonomic system, and compile supplemental document data elements and supplemental documents into said hierarchical taxonomic system.

82. A non-transitory computer readable medium containing programming instructions for computerized searching through electronic data collections, represented by databases or data structures, to expand a user's knowledge about select content represented by one or more predetermined words, characters, images or data objects, with a prioritized hierarchical taxonomic system encompassing some select content, comprising:
    engaging user-selected filters including one or more contextual filters, one or more semiotic filters, and at least one hierarchical taxonomic filter in said taxonomic system;
    engaging a user-selected first plurality of priorities from said prioritized hierarchical taxonomic system;
    gathering input data represented by a source document or a data stream, said input data having data elements therein;
    identifying data elements in said input data with said hierarchical taxonomic system and identifying data elements representing supplemental select content corresponding to said first plurality of priorities therefrom;
    identifying data elements in said input data matching said contextual filters and said semiotic filters as further supplemental select content;
    engaging a user-selected divergence search function; and said divergence search function including identifying unknown words, characters, images or data objects in said source document or data stream with the use of one or more of said contextual filters and said semiotic filters, tagging said unknown words, characters, images or data objects for one of contextual relevancy and hierarchical priority, said unknown words, characters, images or data objects used as negative content filters used to discover said unknown words, characters, images or data objects; and
    searching said data collections with both said supplemental select content data elements and said further supplemental select content and said negative content filters, and gathering supplemental documents based on said divergence function.

83. A computer readable medium containing programming instructions for searching as claimed in claim 82 including:
    identifying non-matching data elements from said input data which do not match said select content;
    searching said data collections with said non-matching data elements and gathering additional supplemental documents based thereon.

84. A computer readable medium containing programming instructions for searching as claimed in claim 82 including:
    identifying said select content with said hierarchical taxonomic system;
    identifying data elements in said input data which match said select content;
    identifying select content with said first plurality of priorities in said hierarchical taxonomic system and searching said data collections with said non-matching data elements and said matching data elements for said first plurality of priorities and said supplemental select content data elements;
    gathering further supplemental documents based thereon.

85. A computer readable medium containing programming instructions for searching as claimed in claim 84 said compiling is listing of all supplemental document data elements or all supplemental documents themselves, from a higher to a lower priority based upon said hierarchical taxonomic system.

86. A computer readable medium containing programming instructions for searching as claimed in claim 85 including:
   identifying data elements in said supplemental documents and said additional supplemental documents and said further supplemental documents with said hierarchical taxonomic system; and
   compiling at least one representation from the group of representations including the data elements from all supplemental documents grouped based upon said hierarchical taxonomic system, all supplemental documents grouped based upon said hierarchical taxonomic system and supplemental select content grouped based upon said hierarchical taxonomic system.

87. A computer readable medium containing programming instructions for searching as claimed in claim 84 including ending said searching of said data collections upon an end search event from the group of end search events which include a predetermined time, a predetermined number of supplemental documents, a predetermined number of further supplemental documents, a predetermined number of additional supplemental documents, a predetermined number of data elements from said supplemental documents which fulfill a predetermined number of priorities in said hierarchical taxonomic system, a predetermined number of data elements from said further supplemental documents which fulfill a predetermined number of priorities in said hierarchical taxonomic system, a predetermined number of data elements from said additional supplemental documents which fulfill a predetermined number of priorities in said hierarchical taxonomic system, a predetermined number of matches of select content in said supplemental documents, a predetermined number of matches of select content in said additional supplemental documents and a predetermined number of matches of select content in said further supplemental documents.

88. A computer readable medium containing programming instructions for searching as claimed in claim 87 including resetting said first plurality of priorities in said hierarchical taxonomic system to a second plurality of priorities in said hierarchical taxonomic system and repeating the programming step of gathering supplemental documents if one expanding search parameter is not met from the group of expanding search parameters including said supplemental documents do not exceed a predetermined number, said supplemental documents do not include a data elements matching a predetermined number of select content therein, a predetermined number of data elements from said supplemental documents which do not fulfill a predetermined number of priorities in said hierarchical taxonomic system, and data elements in said supplemental documents do not met predetermined contextual rules or algorithms related to said select content.

89. A computer readable medium containing programming instructions for searching as claimed in claim 84 including:
   identifying data elements in said input data which match said select content and further identifying the matching select content data elements with said hierarchical taxonomic system;
   identifying matching data elements which fulfill predetermined contextual rules or algorithms in said input data and incrementing, decrementing or otherwise tagging contextually matching data elements;
   wherein contextually matching data elements occurs prior to said identifying data elements with the first plurality of priorities in said hierarchical taxonomic system and said searching said data collections with said non-matching data elements and said matching data elements.

90. A computer readable medium containing programming instructions for searching as claimed in claim 84 including increasing the bandwidth of said searching said data collections by adding a select plurality of select content to said search in addition to said non-matching data elements.

91. A computer readable medium containing programming instructions for searching as claimed in claim 84 including filtering out noise data elements from said non-matching data elements prior to searching said data collections.

92. A computer readable medium containing programming instructions for searching as claimed in claim 84 including providing a client computer and a server computer, communicatively coupled together, in a web-based server-client computer system and the method includes gathering input data using said client computer in said web-based server-client computer system; forwarding input data to said server computer; compiling all supplemental documents on said server computer and permitting access thereto via said client computer; and, employing said server computer to:
   identify input data elements with said hierarchical taxonomic system, identify non-matching data elements, identify matching data elements, search said data collections, and gather supplemental documents.

93. A method of computerized searching through electronic data collections in a distributed computer system to expand a user's knowledge about select content represented by one or more predetermined words, characters, images or data objects, with a ranked categorical classification system encompassing some select content, comprising:
   selecting a plurality of classifications from said classification system;
   gathering input data represented by a source document or a data stream, said input data having data elements therein;
   identifying input data elements corresponding to said plurality of classifications to derive supplemental select content;
   engaging a user-selected divergence search function; and
   searching said data collections with said supplemental select content and gathering supplemental documents based on said divergence function; and
   compiling said supplemental documents based upon said classification system;
   searching said data collections with both said supplemental select content data elements and said further supplemental select content, and gathering supplemental documents based said divergence function; and
   said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
   supplementally searching said data collections with said negative content filters, and gathering additional supplemental documents based on said divergence function.

94. A method of searching as claimed in claim 93 including:
filtering non-matching input data elements which do not match said select content;
searching said data collections with said non-matching data elements and gathering additional supplemental documents based thereon; and
compiling the additional supplemental document with said classification system.

95. A method of searching as claimed in claim 94 including:
searching said data collections with some select content and gathering further supplemental documents based thereon; and
compiling said further supplemental documents with said classification system.

96. A method of searching as claimed in claim 93 including one or expanding and contracting a bandwidth of said search by adding select content, altering the identification of input data elements corresponding to said plurality of classifications, and applying contextual filters to said supplemental select content.

97. A method of searching as claimed in claim 93 wherein the number and classification of said supplemental documents adaptively effects the identification of supplemental select content with said input data elements and said plurality of classifications.

98. A method of searching as claimed in claim 97 including one of a feedback attenuation filter to narrow said searching said data collections and a feedback expansion filter to broaden said searching said data collections, said feedback controlled by one of:
said supplemental documents exceed or do not exceed a predetermined number,
said supplemental documents include or do not include a data elements matching a predetermined number of select content therein,
a predetermined number of data elements from said supplemental documents which do or do not fulfill a predetermined number of priorities in said hierarchical taxonomic system, and
data elements in said supplemental documents which do or do not met predetermined contextual rules or algorithms related to said select content.

99. A method of computerized searching through electronic data collections in a distributed computer system to expand a user's knowledge about select content represented by one or more predetermined words, characters, images or data objects, with a ranked categorical classification system encompassing some select content, comprising:
selecting a plurality of classifications from said classification system;
gathering input data represented by a source document or a data stream, said input data having data elements therein;
identifying input data elements corresponding to said plurality of classifications to derive supplemental select content;
searching said data collections with said supplemental select content and gathering supplemental documents based thereon;
compiling said supplemental documents based upon said classification system;
and one or more of the following expansion and attenuation functions including:
filtering non-matching input data elements which do not match said select content and searching said data collections with said non-matching data elements and gathering supplemental documents based thereon;
searching said data collections with some select content and gathering supplemental documents based thereon;
expanding a bandwidth of said search by adding select content, altering the identification of input data elements corresponding to said plurality of classifications, and applying contextual filters to said supplemental select content;
contracting a bandwidth of said search by adding select content, altering the identification of input data elements corresponding to said plurality of classifications, and applying contextual filters to said supplemental select content;
engaging a user-selected divergence search function; and
narrowing said searching said data collections with said divergence function and with a feedback attenuation filter controlled by one of: said supplemental documents exceed a predetermined number, said supplemental documents exceed data elements matching a predetermined number of select content therein, a predetermined number of data elements from said supplemental documents exceed a predetermined number of priorities in said classification system, and data elements in said supplemental documents exceed predetermined contextual rules or algorithms related to said select content; and
expanding said searching said data collections with said divergence function and with a feedback expansion filter controlled by one of: said supplemental documents do not exceed a predetermined number, said supplemental documents do not include a data elements matching a predetermined number of select content therein, a predetermined number of data elements from said supplemental documents do not fulfill a predetermined number of priorities in said hierarchical taxonomic system, and data elements in said supplemental documents do not met predetermined contextual rules or algorithms related to said select content; and
said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
supplementally searching said data collections with said negative content filters, and gathering additional supplemental documents based on said divergence function.

100. A method of searching as claimed in claim 99 including ending said searching upon an end search event from the group of end search events which include a predetermined time, a predetermined number of supplemental documents, a predetermined number of data elements from said supplemental documents which fulfill a predetermined number of priorities in said classification system, a predetermined number of matches of select content in said supplemental documents.

101. A method of searching as claimed in claim 93 including providing a client computer and a server computer, communicatively coupled together, in a web-based server-client computer system and the method includes gathering input data using said client computer in said web-based server-client computer system; forwarding input data to said server computer; compiling said supplemental documents on said server computer and permitting access thereto via said client computer.

102. A method of searching as claimed in claim 99 including providing a client computer and a server computer, communicatively coupled together, in a web-based server-client computer system and the method includes gathering input data using said client computer in said web-based server-client computer system; forwarding input data to said server computer; compiling said supplemental documents on said server computer and permitting access thereto via said client computer.

103. A method of searching as claimed in claim 99 wherein said expansion and attenuation functions are modules selected upon initialization.

104. A method of computerized searching through electronic data collections, represented by databases or data structures in a distributed computer system, utilizing a prioritized hierarchical classification system comprising:
 selecting a first plurality of priorities from said prioritized hierarchical classification system;
 extracting search terms from input data represented by a source document or a data stream, by identifying data elements in said input data with said classification system corresponding to said first plurality of priorities therefrom;
 searching said data collections with said search terms and gathering supplemental documents based thereon;
 resetting said first plurality of priorities in said classification system to a second plurality of priorities in said classification system;
 extracting secondary search terms from input data elements with said classification system corresponding to said second plurality of priorities and repeating the search of said data collections with said secondary search terms and gathering secondary supplemental documents; and,
 determining whether said supplemental documents and said secondary supplemental documents exhibit convergent or divergent characteristics; and
 engaging a user-selected divergence search function and searching said data collections; and
 said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
 supplementally searching said data collections with said negative content filters, and gathering additional supplemental documents based on said divergence function.

105. A method of searching as claimed in claim 104 wherein extracting secondary search terms and repeating resetting priorities is based upon a convergent or divergent search command.

106. A method of searching as claimed in claim 104 including repeating extracting search terms and searching if one search end parameter is not met from the group of search end parameters including:
 all supplemental documents do not exceed a predetermined number,
 a predetermined number of data elements from all supplemental documents do not fulfill a predetermined number of priorities in said classification system,
 a lapse of a predetermined time,
 a predetermined number of data elements from all supplemental documents do not fulfill a predetermined number of priorities in said classification system.

107. A method of searching as claimed in claim 106 including filtering out noise data elements from said input data represented by a source document or a data stream prior to searching said data collections.

108. A method of searching as claimed in claim 107 including providing a client computer and a server computer, communicatively coupled together, in a web-based server-client computer system and the method includes
 gathering said input data using said client computer in said web-based server-client computer system;
 forwarding said input data to said server computer;
 compiling all supplemental documents on said server computer and permitting access thereto via said client computer; and,
 employing said server computer to:
 extract search terms and gather supplemental documents.

109. A method of searching as claimed in claim 108 wherein said prioritized hierarchical classification system is a hierarchical taxonomic system.

110. A method of computerized searching through electronic data collections, represented by databases or data structures in a distributed computer system, utilizing a prioritized hierarchical classification system comprising:
 selecting a first plurality of priorities from said prioritized hierarchical classification system;
 extracting search terms from input data represented by a source document or a data stream, by identifying data elements in said input data with said classification system corresponding to said first plurality of priorities therefrom;
 engaging a user-selected divergence search function; and
 searching said data collections with said search terms and gathering supplemental documents based on said divergence function; and,
 extracting secondary search terms as data elements from said supplemental documents with said classification system corresponding to said first plurality of priorities and repeating the search of said data collections with said secondary search terms and gathering secondary supplemental documents; and
 said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and
 supplementally searching said data collections with said negative content filters, and gathering additional supplemental documents based on said divergence function.

111. A method of searching as claimed in claim 110 including repeating extracting search terms and searching if one search end parameter is not met from the group of search end parameters including
 all supplemental documents do not exceed a predetermined number, a predetermined number of data elements from all supplemental documents do not fulfill a predetermined number of priorities in said classification system, a lapse of a predetermined time, a predetermined number of data elements from all supplemental documents do not fulfill a predetermined number of priorities in said classification system.

112. A method of searching as claimed in claim 111 including filtering out noise data elements from said input data represented by said source document or data stream prior to searching said data collections.

113. A method of searching as claimed in claim 112 including providing a client computer and a server computer, communicatively coupled together, in a web-based server-client computer system and the method includes gathering said input data using said client computer in said web-based server-client computer system;

forwarding said input data to said server computer;

compiling all supplemental documents on said server computer and permitting access thereto via said client computer; and, employing said server computer to:

extract search terms and gather supplemental documents.

114. A method of searching as claimed in claim 113 wherein said prioritized hierarchical classification system is a hierarchical taxonomic system.

115. A method of computerized searching through electronic data collections, represented by databases or data structures in a distributed computer system, utilizing a prioritized hierarchical classification system comprising:

selecting a first plurality of priorities from said prioritized hierarchical classification system;

extracting search terms from input data represented by a source document or a data stream, by identifying data elements in said input data with said classification system corresponding to said first plurality of priorities therefrom;

engaging a user-selected divergence search function; and searching said data collections with said search terms and gathering supplemental documents based on said divergence function; and said divergence search function including identifying unknown words, characters, images or data objects in said source document or data stream with the use of one or more contextual filters and semiotic filters, tagging said unknown words, characters, images or data objects for one of a contextual relevancy and a hierarchical priority, said unknown words, characters, images or data objects used as negative content filters used to discover said unknown words, characters, images or data objects; and supplementally searching said data collections with said negative content filters, and gathering additional supplemental documents based on said divergence function.

116. A method of searching as claimed in claim 115 including determining whether supplemental documents for said first plurality of priorities and a second search for a second plurality of priorities with extracted search terms exhibit convergent or divergent characteristics.

117. A method of searching as claimed in claim 115 including extracting secondary search terms and resetting said first plurality of priorities to a second plurality of priorities is based upon a convergent or divergent search command.

118. A method of searching as claimed in claim 117 including repeating extracting search terms and searching if one search end parameter is not met from the group of search end parameters including:

all supplemental documents do not exceed a predetermined number, a predetermined number of data elements from all supplemental documents do not fulfill a predetermined number of priorities in said classification system, a lapse of a predetermined time, a predetermined number of data elements from all supplemental documents do not fulfill a predetermined number of priorities in said classification system.

119. A method of searching as claimed in claim 118 including filtering out noise data elements from said input data represented by a source document or a data stream prior to searching said data collections.

* * * * *